(12) United States Patent
Wang

(10) Patent No.: US 12,301,792 B2
(45) Date of Patent: May 13, 2025

(54) INTRA-FRAME PREDICTION METHODS, ENCODER, DECODER AND STORAGE MEDIUM

(71) Applicant: GUANGDONG OPPO MOBILE TELECOMMUNICATIONS CORP., LTD., Dongguan (CN)

(72) Inventor: Fan Wang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 0 days.

(21) Appl. No.: 18/205,348

(22) Filed: Jun. 2, 2023

(65) Prior Publication Data

US 2023/0308645 A1    Sep. 28, 2023

Related U.S. Application Data

(63) Continuation of application No. PCT/CN2020/139178, filed on Dec. 24, 2020.

(30) Foreign Application Priority Data

Dec. 24, 2020   (WO) ............... PCT/CN2020/139178

(51) Int. Cl.
   *H04N 19/105*   (2014.01)
   *H04N 19/11*    (2014.01)
   (Continued)

(52) U.S. Cl.
   CPC ......... *H04N 19/105* (2014.11); *H04N 19/11* (2014.11); *H04N 19/159* (2014.11);
   (Continued)

(58) Field of Classification Search
   CPC .... H04N 19/105; H04N 19/11; H04N 19/159; H04N 19/176; H04N 19/46;
   (Continued)

(56) References Cited

U.S. PATENT DOCUMENTS 9,083,974 B2   7/2015   Jeon
9,344,715 B2   5/2016   Liu
(Continued)

FOREIGN PATENT DOCUMENTS

CN   102972028 A    3/2013
CN   104247422 A    12/2014
(Continued)

OTHER PUBLICATIONS

Blasi, S. et al. "Non-CE4: CIIP Using Triangular Partitions", Joint Video Experts Team (JVET) of ITU-T SG 16 WP 3 and ISO/IEC JTC 1/SC 29/WG 11 15th Meeting: Gothenburg, SE, Jul. 3-12, 2019, JVET-O0522, Jul. 12, 2019 (Jul. 12, 2019), entire document.
(Continued)

*Primary Examiner* — Francis Geroleo
(74) *Attorney, Agent, or Firm* — BAYES PLLC

(57) ABSTRACT

Disclosed are intra-frame prediction methods, an encoder, and a decoder. A method includes: determining, when an intra predicted value of a current block is determined using an SAWP mode, a weight matrix derivation mode of the current block; determining, according to the weight matrix derivation mode, a first intra prediction mode and a second intra prediction mode of the current block; determining a weight matrix of the current block according to the weight matrix derivation mode; and determining a predicted value of the current block based on the first intra prediction mode, the second intra prediction mode and the weight matrix.

11 Claims, 17 Drawing Sheets

---

501 — When a current block determines an intra predicted value of the current block using an SAWP mode, a mode list of the current block is determined 502 — A first intra prediction mode and a second intra prediction mode of the current block are determined according to the mode list 503 — A predicted value of the current block is determined based on the first intra prediction mode and the second intra prediction mode

(51) Int. Cl.
*H04N 19/159* (2014.01)
*H04N 19/176* (2014.01)
*H04N 19/46* (2014.01)
*H04N 19/593* (2014.01)

(52) U.S. Cl.
CPC .......... *H04N 19/176* (2014.11); *H04N 19/46* (2014.11); *H04N 19/593* (2014.11)

(58) Field of Classification Search
CPC .. H04N 19/593; H04N 19/107; H04N 19/119; H04N 19/42; H04N 19/70
See application file for complete search history.

(56) References Cited

U.S. PATENT DOCUMENTS

| | | | |
|---|---|---|---|
| 10,575,023 | B2 | 2/2020 | Panusopone |
| 10,623,736 | B2 | 4/2020 | Phillips |
| 10,645,395 | B2 | 5/2020 | Yu |
| 10,694,179 | B2 | 6/2020 | Hermansson |
| 10,785,479 | B2* | 9/2020 | Zhang .................. H04N 19/176 |
| 10,992,934 | B2 | 4/2021 | Panusopone |
| 11,140,387 | B2 | 10/2021 | Lee |
| 11,949,888 | B2 | 4/2024 | Liao |
| 2011/0280304 | A1 | 11/2011 | Jeon |
| 2013/0114696 | A1 | 5/2013 | Liu |
| 2017/0347103 | A1 | 11/2017 | Yu et al. |
| 2018/0376149 | A1 | 12/2018 | Zhang et al. |
| 2019/0014316 | A1 | 1/2019 | Panusopone et al. |
| 2019/0037213 | A1 | 1/2019 | Hermansson et al. |
| 2019/0110083 | A1 | 4/2019 | Panusopone et al. |
| 2019/0387224 | A1 | 12/2019 | Phillips et al. |
| 2020/0077089 | A1 | 3/2020 | Lee |
| 2020/0221102 | A1 | 7/2020 | Yu et al. |
| 2020/0336734 | A1 | 10/2020 | Panusopone et al. |
| 2020/0366900 | A1* | 11/2020 | Jun ........................ H04N 19/11 |
| 2021/0250581 | A1 | 8/2021 | Xu et al. |
| 2021/0297672 | A1 | 9/2021 | Deng et al. |
| 2021/0385485 | A1 | 12/2021 | Liao et al. |
| 2021/0409697 | A1 | 12/2021 | Lee |
| 2022/0124349 | A1 | 4/2022 | Liu et al. |
| 2023/0052940 | A1 | 2/2023 | Ma et al. |
| 2023/0115074 | A1 | 4/2023 | Ltd |
| 2023/0300325 | A1* | 9/2023 | Ahn ..................... H04N 19/105 375/240.12 |
| 2024/0291972 | A1 | 8/2024 | Liao et al. |

FOREIGN PATENT DOCUMENTS

| | | |
|---|---|---|
| CN | 108781283 A | 11/2018 |
| CN | 110063056 A | 7/2019 |
| CN | 111107356 A | 5/2020 |
| CN | 111279703 A | 6/2020 |
| JP | 2006287315 A | 10/2006 |
| JP | 2019216294 A | 12/2019 |
| WO | 2020098782 A1 | 5/2020 |
| WO | 2020141816 A1 | 7/2020 |
| WO | 2020185004 A1 | 9/2020 |

OTHER PUBLICATIONS

International Search Report in the international application No. PCT/CN2021/135491, mailed on Mar. 1, 2022. 7 pages with English translation.
Written Opinion of the International Search Authority in the international application No. PCT/CN2021/135491, mailed on Mar. 1, 2022. 11 pages with English translation.
Benjamin Bross et al, "Versatile Video Coding Editorial Refinements on Draft 10", Joint Video Experts Team (JVET) of ITU-T SG 16 WP 3 and ISO/IEC JTC 1/SC 29 JVET-T2001-v1, 20th Meeting, by teleconference, Oct. 7-16, 2020, section 8.5.7.
Non Final Office Action of the U.S. Appl. No. 18/324,123, issued on Sep. 5, 2024. 29 pages.
International Search Report in the international application No. PCT/CN2020/139178, mailed on Aug. 30, 2021.
Written Opinion of the International Search Authority in the international application No. PCT/CN2020/139178, mailed on Aug. 30, 2021.
Joint Video Exploration Team (JVET) of ITU-T SG 16 WP 3 and ISO/IEC JTC 1/SC 29/WG 11, Document: JVET-F0104, Title: Weighted Angular Prediction, Author: Krit Panusopone, Yue Yu and Limin Wang, 6th Meeting: Hobart, AU, Mar. 3-Apr. 7, 2017.
Joint Video Experts Team (JVET) of ITU-T SG 16 WP 3 and ISO/IEC JTC 1/SC 29, Document: JVET-T2001-v2, Title: Versatile Video Coding Editorial Refinements on Draft 10, Author(s) or Contact(s): Benjamin Bross, Jianle Chen, Shan Liu, Ye-Kui Wang, 20th Meeting, by teleconference, Oct. 7-16, 2020.
AVS N2865 "AVS-P2 Phase 2 (WD5.0)" Section 9.26 "Export of Weight Arrays for Angle Weighted Prediction Modes", Liang Fan, Jun. 8-12, 2020, http://www.avs.org.cn/index/meetlist.html?catid=56&docid=105.
AVS N2865 "AVS-P2 Phase 2 (WD5.0)" Section 9.25 "Export of Motion Storage Method for Angle Weighted Prediction Mode", Liang Fan, Jun. 8-12, 2020, http://www.avs.org.cn/index/meetlist.html?catid=56&docid=105.
Chen J et al: "Algorithm description for Versatile Video Coding and Test Model 8 (VTM 8)", 17. JVET Meeting; Oct. 7, 2020-Jan. 17, 2020; Brussels; (The Joint Video Exploration Team of ISO/IEC JTC1/SC29/WG11 and ITU-T SG.16 ), No. JVET-Q2002-v3, Mar. 24, 2020 (Mar. 24, 2020 ), XP030288001, p. 35, paragraph 3.4.1—p. 37, paragraph 3.4.1.5; p. 53, paragraph 3.4.11—p. 55, paragraph 3.4.11.3; figure 37; p. 55, paragraph 3.4.12—p. 56; figures 39-40.
Supplementary European Search Report in the European application No. 21900113.8, mailed on Oct. 7, 2024. 12 pages.
Takeshi Chujoh et al., "Description of video coding technology proposal by TOSHIBA", Joint Collaborative Team on Video Coding (JCT-VC) of ITU-T SG16 WP3 and ISO/IEC JTC1/SC29/WG11 JCTVC-A117r1, 1st Meeting: Dresden, DE, Apr. 15-23, 2010, pp. 6-8.
First Office Action of the Japanese application No. 2023-533982, issued on Jan. 28, 2025. 8 pages with English translation.

* cited by examiner

INTRA-FRAME PREDICTION METHODS, ENCODER, DECODER AND STORAGE MEDIUM

CROSS-REFERENCE TO RELATED APPLICATIONS

This is a continuation of International Application No. PCT/CN2020/139178 filed on Dec. 24, 2020, which claims the benefit of priority to International Patent Application No. PCT/CN2020/133708 filed on Dec. 3, 2020, both of which are hereby incorporated by reference in their entireties.

BACKGROUND

In order to capture a finer edge direction presented in a natural video, 33 luma intra prediction angular modes defined in a video compression standard (High Efficiency Video Coding (HEVC)) are expanded to 65 in Versatile Video Coding (VVC). In addition, there are also two non-angular modes, that is, a Planar mode with the number of 0 and a Direct Current (DC) mode with the number of 1.

Although common intra predictions include a DC mode, a Planar mode, a Bilinear filtering mode and the like, all of them can only process prediction of simple textures; and even though there are more and more angular modes, predictions of the angular modes can only follow a straight line at one angle. Therefore, an existing intra prediction mode can only process the prediction of simple textures. With regard to complex textures, the textures need to be partitioned into smaller blocks during prediction with higher complexity, and accordingly, a storage space and overall time required during coding and decoding are greatly increased, resulting in reduction of the efficiency of coding and decoding.

SUMMARY

Embodiments of the present disclosure relate to the technical field of picture processing, and provide intra prediction methods, an encoder, a decoder and a storage medium, which can reduce complexity while improving the quality of intra prediction, thereby improving compression performance.

The technical solutions of the embodiments of the present disclosure may be implemented as follows.

According to a first aspect, an embodiment of the present disclosure provides an intra prediction method applicable to an encoder. The method includes the following operations.

When an intra predicted value of a current block is determined using a Spatial Angular Weighted Prediction (SAWP) mode, a weight matrix derivation mode of the current block is determined.

A first intra prediction mode and a second intra prediction mode of the current block are determined according to the weight matrix derivation mode, and a weight matrix of the current block is determined according to the weight matrix derivation mode.

A predicted value of the current block is determined based on the first intra prediction mode, the second intra prediction mode and the weight matrix.

According to a second aspect, an embodiment of the present disclosure provides an intra prediction method applicable to an encoder. The method includes the following operations.

When an intra predicted value of a current block is determined using an SAWP mode, a mode list of the current block is determined.

A first intra prediction mode and a second intra prediction mode of the current block are determined according to the mode list.

A predicted value of the current block is determined based on the first intra prediction mode and the second intra prediction mode.

According to a third aspect, an embodiment of the present disclosure provides an intra prediction method, applicable to a decoder. The method includes the following operations.

A bitstream is parsed, and an intra prediction mode parameter of a current block is determined.

When the intra prediction mode parameter indicates that the current block determines an intra predicted value of the current block using an SAWP mode, a weight matrix derivation mode of the current block is determined.

A first intra prediction mode and a second intra prediction mode of the current block are determined according to the weight matrix derivation mode, and a weight matrix of the current block is determined according to the weight matrix derivation mode.

A predicted value of the current block is determined based on the first intra prediction mode, the second intra prediction mode and the weight matrix.

According to a fourth aspect, an embodiment of the present disclosure provides an intra prediction method, applicable to a decoder. The method includes the following operations.

A bitstream is parsed, and an intra prediction mode parameter of a current block is determined.

When the intra prediction mode parameter indicates that the current block determines an intra predicted value of the current block using an SAWP mode, a mode list of the current block is determined.

A first intra prediction mode and a second intra prediction mode of the current block are determined according to the mode list.

A predicted value of the current block is determined based on the first intra prediction mode and the second intra prediction mode.

According to a fifth aspect, an embodiment of the present disclosure provides an encoder. The encoder includes a first determination portion.

The first determination portion is configured to: determine, when a current block determines an intra predicted value of the current block using an SAWP mode, a weight matrix derivation mode of the current block; determine, according to the weight matrix derivation mode, a first intra prediction mode and a second intra prediction mode of the current block, and determine a weight matrix of the current block according to the weight matrix derivation mode; and determine a predicted value of the current block based on the first intra prediction mode, the second intra prediction mode and the weight matrix.

Or, the first determination portion is configured to: determine, when a current block determines an intra predicted value of the current block using an SAWP mode, a mode list of the current block; determine a first intra prediction mode and a second intra prediction mode of the current block according to the mode list; and determine a predicted value of the current block based on the first intra prediction mode and the second intra prediction mode.

According to a sixth aspect, an embodiment of the present disclosure provides an encoder. The encoder includes a first processor, and a first memory for storing an instruction executable by the first processor. When the instruction is executed by the first processor, the intra prediction method described above is implemented.

According to a seventh aspect, an embodiment of the present disclosure provides a decoder. The decoder includes a decoding portion and a second determination portion.

The decoding portion is configured to parse a bitstream.

The second determination portion is configured to: determine an intra prediction mode parameter of the current block; determine, when the intra prediction mode parameter indicates that the current block determines an intra predicted value of the current block using an SAWP mode, a weight matrix derivation mode of the current block; determine, according to the weight matrix derivation mode, a first intra prediction mode and a second intra prediction mode of the current block; determine a weight matrix of the current block according to the weight matrix derivation mode; and determine a predicted value of the current block based on the first intra prediction mode, the second intra prediction mode and the weight matrix.

Or, the second determination portion is configured to: determine an intra prediction mode parameter of the current block; determine, when the intra prediction mode parameter indicates that the current block determines an intra predicted value of the current block using an SAWP mode, a mode list of the current block; determine a first intra prediction mode and a second intra prediction mode of the current block according to the mode list; and determine a predicted value of the current block based on the first intra prediction mode and the second intra prediction mode.

According to an eighth aspect, an embodiment of the present disclosure provides a decoder. The decoder includes a second processor, and a second memory for storing an instruction executable by the first processor. When the instruction is executed by the second processor, the intra prediction method described above is implemented.

According to a ninth aspect, an embodiment of the present disclosure provides a computer storage medium. The computer storage medium stores a computer program. The computer program, when executed by a first processor and a second processor, implements the intra prediction method described above.

According to the intra prediction methods, the encoder, the decoder and the storage medium provided in the embodiments of the present disclosure, on the one hand, when the current block determines the intra predicted value of the current block by using the SAWP mode, the weight matrix derivation mode of the current block is determined; the first intra prediction mode and the second intra prediction mode of the current block are determined according to the weight matrix derivation mode, and the weight matrix of the current block is determined according to the weight matrix derivation mode; and the predicted value of the current block is determined based on the first intra prediction mode, the second intra prediction mode and the weight matrix. On the other hand, when the current block determines the intra predicted value of the current block by using the SAWP mode, the mode list of the current block is determined; the first intra prediction mode and the second intra prediction mode are determined according to the mode list; and the predicted value of the current block is determined based on the first intra prediction mode and the second intra prediction mode. That is to say, in the embodiments of the present disclosure, the encoder and the decoder may determine two different prediction blocks of the current block by means of two different intra prediction modes, and finally obtain a more complex prediction block by combining the prediction blocks using various weight matrices, such that the accuracy of prediction is improved. In addition, the encoder and the decoder may also construct a Most Probable Mode (MPM) list by using a correlation between the weight matrices and the prediction modes, such that the complexity can be greatly reduced. That is to say, by means of the intra prediction methods provided in the present disclosure, the complexity can be reduced while the quality of intra prediction is improved, thereby improving compression performance.

BRIEF DESCRIPTION OF THE DRAWINGS

Figures 5F, 5G, 5H, 5I:
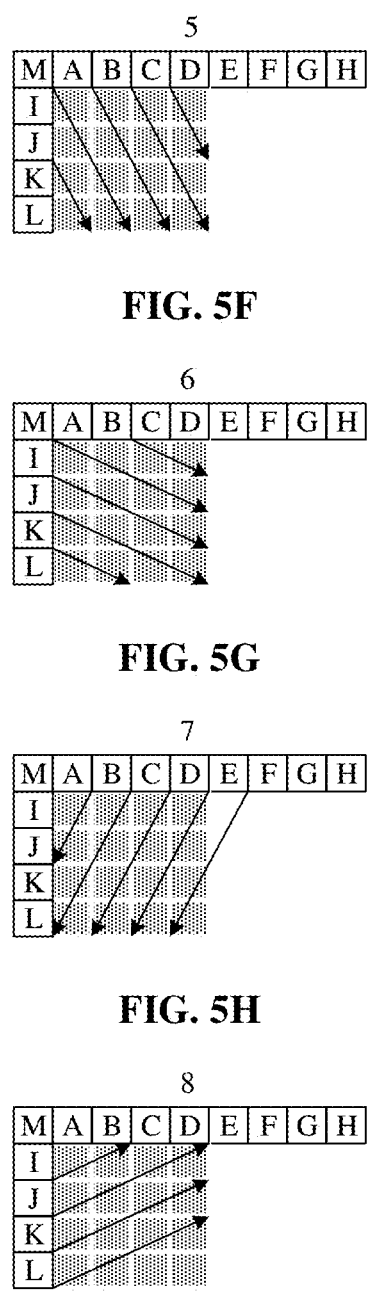

FIG. 5A to FIG. 5I are third schematic diagrams of intra prediction.

DETAILED DESCRIPTION

Figure 1:
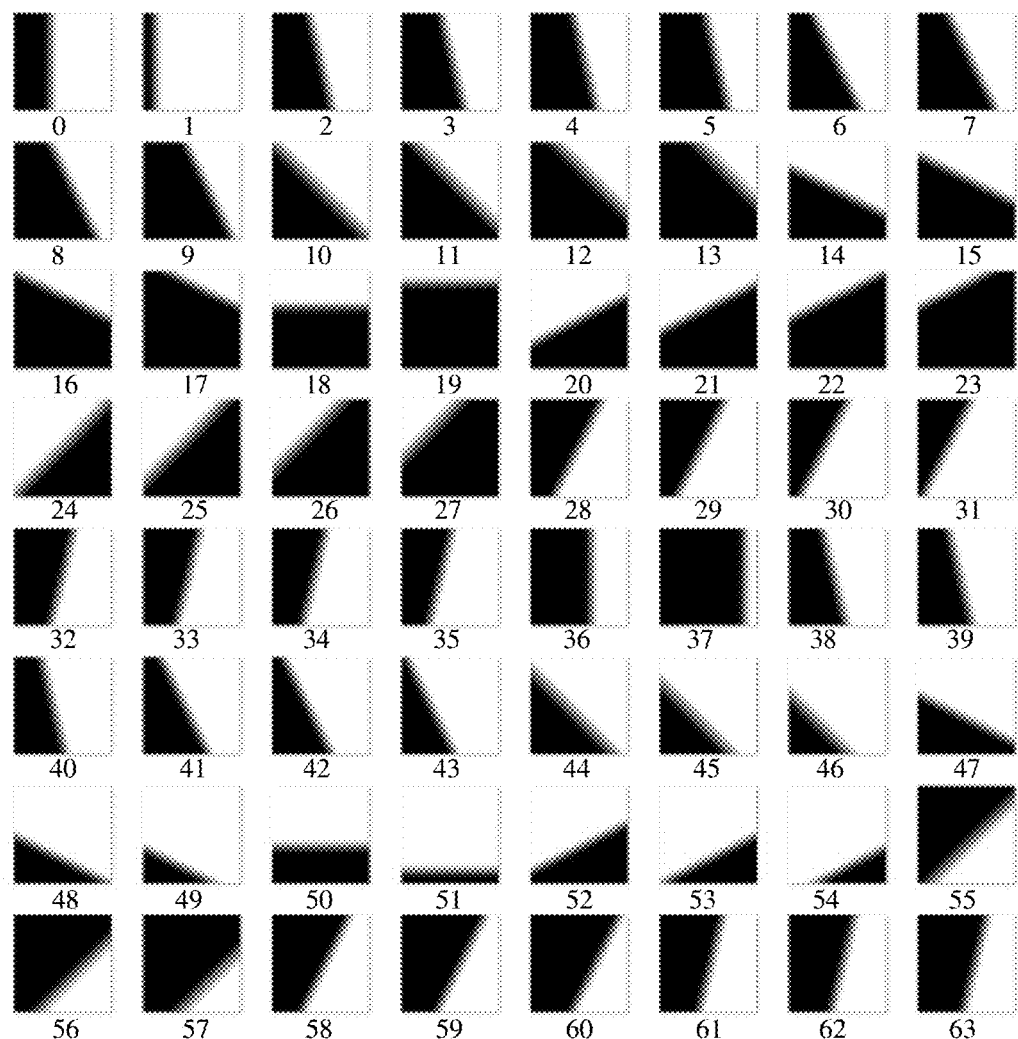
FIG. 1 is a first schematic diagram of weight allocation.

The technical solutions in the embodiments of the present disclosure are clearly and completely described below with reference to the drawings in the embodiments of the present disclosure. It is to be understood that, the specific embodiments described here are merely used for explaining related applications rather than limiting the present disclosure. In addition, it is further to be noted that, for ease of description, only the parts related to the present disclosure are illustrated in the drawings.

Currently, a general video coding/decoding standard is based on a block-based hybrid coding framework. Each picture in the video is partitioned into square Largest Coding Units (LCU) with a same size (for example, 128×128, 64×64, or the like). Each LCU may further be partitioned into rectangular Coding Units (CU) according to rules. In addition, the CU may further be partitioned into smaller Prediction Units (PU). Specifically, the hybrid coding framework may include modules, such as a prediction module, a transform module, a quantization module, an entropy coding module, an in-loop filter module, and the like. The prediction module may include intra prediction and inter prediction. The intra prediction may include motion estimation and motion compensation. Since there is a strong correlation between adjacent pixels in a picture of the video, spatial redundancy between the adjacent pixels can be eliminated by using an intra prediction manner in a video coding/decoding technology. However, since there is also a strong similarity between adjacent pictures in the video, time redundancy between the adjacent pictures is eliminated by using an inter prediction manner in the video coding/decoding technology, such that the efficiency of coding and decoding can be improved.

A basic process of a video codec includes: on a coding end, dividing a picture into blocks, performing intra prediction or inter prediction on the current block to generate a prediction block of the current block, subtracting the prediction block from an original block of the current block to obtain a residual block, performing transform and quantization on the residual block to obtain a quantization coefficient matrix, and performing entropy coding on the quantization coefficient matrix to output the quantization coefficient matrix to a bitstream; on a decoding end, performing intra prediction or inter prediction on the current block to generate a prediction block of the current block, on the other hand, parsing the bitstream to obtain a quantization coefficient matrix, performing inverse quantization and inverse transform on the quantization coefficient matrix to obtain a residual block, and adding the prediction block and the residual block to obtain a reconstructed block. The reconstructed blocks form a reconstructed picture, loop filtering is performed on the reconstructed picture based on a picture or block, so as to obtain a decoded picture. On the coding end, the operations similar to those on the decoding end are also needed to obtain the decoded picture. The decoded picture may be used as a reference picture of inter prediction for a subsequent picture. Block partitioning information, mode information such as prediction, transform, quantization, entropy coding and loop filtering, or parameter information, which are determined on the coding end, need to be outputted to the bitstream if necessary. On the decoding end, block partitioning information, mode information such as prediction, transform, quantization, entropy coding and loop filtering, or parameter information, which are same as that on the coding end, are determined by parsing and analysis according to existing information, so as to ensure that the decoded picture obtained on the coding end is the same as the decoded picture obtained on the decoding end. The decoded picture obtained on the coding end is generally called the reconstructed picture. During prediction, the current block may be partitioned into Prediction Units (PUs); during transform, the current block may be partitioned into Transform Units (TUs); and the partitioning of the PUs and the TUs may be different. The above is the basic process of the video codec under a block-based hybrid coding framework. With the development of technologies, some modules or operations of the framework or process may be optimized. The embodiments of the present disclosure are suitable for the basic process of the video codec under the block-based hybrid coding framework, but are not limited to the framework or the process.

The current block may be the current CU or the current PU.

For inter prediction, a decoded or reconstructed picture or information called a reference picture is used to predict the current block. During inter prediction, a reference block is found from the reference picture by using motion information, and a prediction block is generated according to the reference block. The motion information includes a reference picture list including the reference picture, a reference picture index and a motion vector. The motion vector may belong to an integral pixel or a sub-pixel. If the motion vector is a sub-pixel, the block of the required sub-pixel needs to be made in the reference picture by means of interpolation filtering. Herein, the block of the integral pixel or the sub-pixel in the reference picture that is found according to the motion vector is called a reference block. The reference block is directly used as the prediction block in some technologies; and in some technologies, reprocessing is performed based on the reference block to generate the prediction block. Performing reprocessing based on the reference block to generate the prediction block may also be understood as that the reference block is used as the prediction block, and then a new prediction block is generated by processing based on the prediction block.

Currently, in a Versatile Video Coding (VVC) video coding and decoding standard under development, there is an inter prediction mode called a Geometric Partitioning Mode (GPM). Currently, in an Audio Video coding Standard (AVS) under development, there is an inter prediction mode called an Angular Weighted Prediction (AWP) mode. Although these two modes have different names and different specific implementation forms, there are similarities in principle.

It is to be noted that, traditional unidirectional prediction simply looks for a reference block of the same size as the current block; however, traditional bi-directional prediction uses two reference blocks of the same size as the current block, and a pixel value of each point in the prediction block is an average value of corresponding positions of the two reference blocks, that is, all points of each reference block account for 50% of the total. Bi-directional weighted prediction allows the two reference blocks to be scaled differently. For example, all points in the first reference block account for 75% of the total, and all points in the second reference block account for 25% of the total. However, all points in the same reference block have the same scale. Some other optimization methods such as a Decoder side Motion Vector Refinement (DMVR) technology and Bi-directional Optical Flow (BIO) cause some changes in a reference pixel or a prediction pixel, and GPM or AWP also uses two reference blocks of the same size as the current block. However, some pixel positions completely (100%) use the pixel value of the corresponding position of the first reference block, and some pixel positions completely (100%) use the pixel value of the corresponding position of the second reference block, and in a blending area, the pixel values of the corresponding positions of the two reference blocks are used according to a scale. The specific way of allocating these weights is determined based on the prediction mode of the GPM or the AWP. Alternatively, it may also be considered that the GPM or the AWP uses two reference blocks of different sizes from the current block, that is, the GPM or the AWP takes a required portion as the reference block. That is, the portion with the non-zero weight is used as the reference block, and the portion with the weight of 0 is removed.

Figure 2:
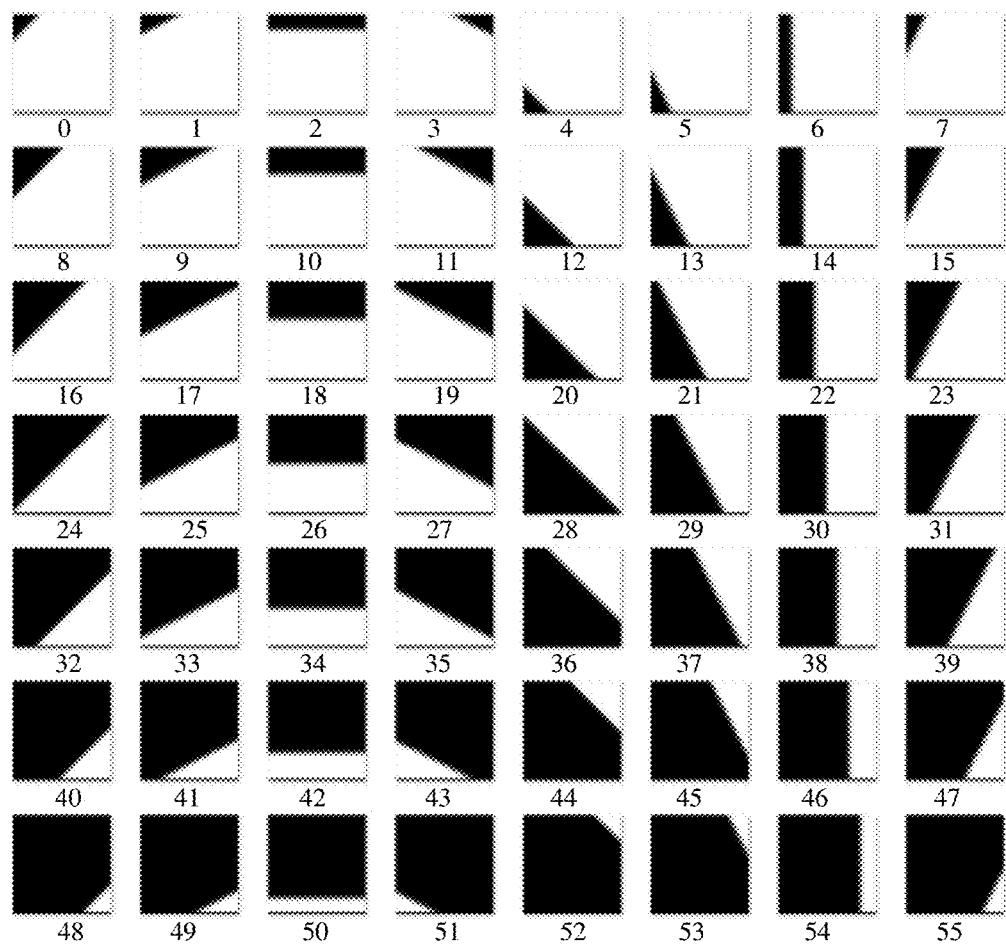
FIG. 2 is a second schematic diagram of weight allocation.

Exemplarily, FIG. 1 is a first schematic diagram of weight allocation. FIG. 1 illustrates a schematic diagram of weight allocation of various partitioning modes of a GPM on the current block of 64×64 according to an embodiment of the present disclosure. The GPM has 64 partitioning modes. FIG. 2 is a second schematic diagram of weight allocation. FIG. 2 illustrates a schematic diagram of weight allocation of various partitioning modes of AWP on the current block of 64×64 according to an embodiment of the present disclosure. The AWP has 56 partitioning modes. Either in FIG. 2 or FIG. 3, under each partitioning mode, Area 2 indicates that a weight value of the corresponding position of the first reference block is 0%; Area 1 indicates that the weight value of the corresponding position of the first reference block is 100%; and gray areas, according to the shade of color, indicate that the weight value of the corresponding position of the first reference block is a weight value greater than 0% and less than 100%, and a weight value of the corresponding position of the second reference block is a weight value, which is obtained by subtracting the weight value of the corresponding position of the first reference block from 100%.

The GPM and the AWP have different weight derivation methods. The GPM determines an angle and an offset according to each mode, and then calculates a weight matrix of each mode. The AWP first makes a one-dimensional weighted line, and then spreads the one-dimensional weighted line over an entire matrix by using a method similar to the angle intra prediction.

It should be understood that, an early coding and decoding technology only has a rectangular partitioning method, regardless of whether it is the partitioning of a CU, a PU or a TU. The GPM or the AWP achieves a predicted non-rectangular partitioning effect without partitioning. The GPM and the AWP use a mask, that is, a weighted graph described above, of weights of the two reference blocks. The mask determines the weights of the two reference blocks when the prediction block is generated. Alternatively, it may be simply understood that part of the positions of the prediction block are from the first reference block, and part of the positions are from the second reference block. A blending area is obtained by weighting the corresponding positions of the two reference blocks, such that smoother transition is achieved. The GPM and the AWP do not partition the current block into two CUs or Pus according to a partitioning line, and then for the transform, quantization, inverse transform and inverse quantization of residuals after prediction, the current block is processed as an integral.

The motion information used by the current block may be stored. A subsequent coding/decoding block of the current picture may use, according to an adjacent position relationship, motion information of a block that has been coded/decoded previously, such as a neighbouring block. Since correlation in space domain is used, the motion information, which has been coded/decoded, is called motion information in the space domain. The motion information used by each block of the current picture may be stored. A subsequent coding/decoding picture may use, according to a reference relationship, motion information of the picture that has been coded/decoded previously. Since correlation in time domain is used, the motion information of the picture, which has been coded/decoded, is called motion information in the time domain. A method for storing the motion information used by each block of the current picture generally includes using a matrix with a constant size, such as a matrix of 4×4, as a minimum unit, where each minimum unit separately stores a group of motion information. In this way, when each block is coded/decoded, the minimum units corresponding to the position of the block may store the motion information of the block. Therefore, when the motion information in the space domain or the motion information in the time domain is used, the motion information corresponding to the position may be directly found according to the position. For example, if a block of 16×16 uses traditional unidirectional prediction, all minimum units of 4×4 corresponding to the block store motion information of this unidirectional prediction. If a block uses the GPM or the AWP, all minimum units corresponding to the block determine, according to the GPM or the AWP, first motion information, second motion information and the position of each minimum unit, the motion information stored in each minimum unit. In one method, if 4×4 pixels corresponding to one minimum unit are all from the first motion information, the minimum unit stores the first motion information; if the 4×4 pixels corresponding to the minimum unit are all from the second motion information, the minimum unit stores the second motion information; and if the 4×4 pixels corresponding to the minimum unit are from both the first motion information and the second motion information, the AWP selects one of the motion information for storage. The method of the GPM is that, if the two motion information point to different reference picture lists, the two motion information are combined into bi-directional motion information for storage, otherwise only the second motion information is stored.

It is to be noted that, in an embodiment of the present disclosure, the GPM or the AWP belongs to an inter prediction technology. The GPM or the AWP needs to transmit, in a bitstream, a flag of whether the GPM or the AWP is used. The flag may indicate whether the current block uses the GPM or the AWP. If the GPM or the AWP is used, an encoder needs to transmit, in the bitstream, a mode specifically used, which is one of 64 partitioning modes of the GPM or one of 56 partitioning modes of the AWP, and index values of two pieces of unidirectional motion information. That is to say, for the current block, a decoder may obtain, by parsing the bitstream, information on whether the GPM or the AWP is used. If it is determined that the GPM or the AWP is used, the decoder may parse a prediction mode parameter of the GPM or the AWP, and index values of two pieces of motion information. For example, the current block may be partitioned into two partitions, and then a first index value corresponding to a first partitioning and a second index value corresponding to a second partitioning may be parsed.

Specifically, for the GPM, if the GPM is used, the prediction mode parameter under the GPM is transmitted in the bitstream, for example, a specific partitioning mode of the GPM. Usually, the GPM includes 64 partitioning modes. For the AWP mode, if the AWP is used, the prediction mode parameter under the AWP is transmitted in the bitstream, for example, a specific partitioning mode of the AWP. Usually, the AWP includes 56 partitioning modes.

At an inter prediction mode, for example, both the GPM and the AWP need to use the two pieces of unidirectional motion information to look for two reference blocks. An existing implementation is to construct a unidirectional motion information candidate list on an encoder side by using related information of the portion of the current block that has been coded/decoded previously, select unidirectional motion information from the unidirectional motion information candidate list, and write, into the bitstream, index values of two pieces of unidirectional motion information in the unidirectional motion information candidate list. The same method is used on a decoder side, that is, the related information of the portion of the current block that has been decoded previously is used to construct a unidirectional motion information candidate list, and the unidirectional motion information candidate list must be the same candidate list constructed on the encoder side. Therefore, the index values of the two pieces of unidirectional motion information are parsed from the bitstream; and then the two pieces of unidirectional motion information are found from the unidirectional motion information candidate list, which are the two pieces of unidirectional motion information that need to be used by the current block.

That is to say, the unidirectional motion information described in the present disclosure may include: motion vector information, that is, the value of (x, y); and corresponding reference picture information, that is, a reference picture list and a reference picture index value in the reference picture list. One method is to record the reference picture index values of two reference picture lists, in which the reference picture index value corresponding to one of the reference picture lists is valid, for example, 0, 1, 2, and the like; and the reference picture index value corresponding to the other reference picture list is invalid, that is, −1. The reference picture list with the valid reference picture index value is the reference picture list used by the motion information of the current block, and a corresponding reference picture may be found from the reference picture list according to the reference picture index value. Each reference picture list has a corresponding motion vector. A motion vector corresponding to a valid reference picture list is valid, and a motion vector corresponding to an invalid reference picture list is invalid. The decoder may find a required reference picture by means of reference picture information in the unidirectional motion information, and may find a reference block in the reference picture according to the position of the current block and the motion vector, that is, the value of (x, y), so as to determine an inter predicted value of the current block.

Figure 3:
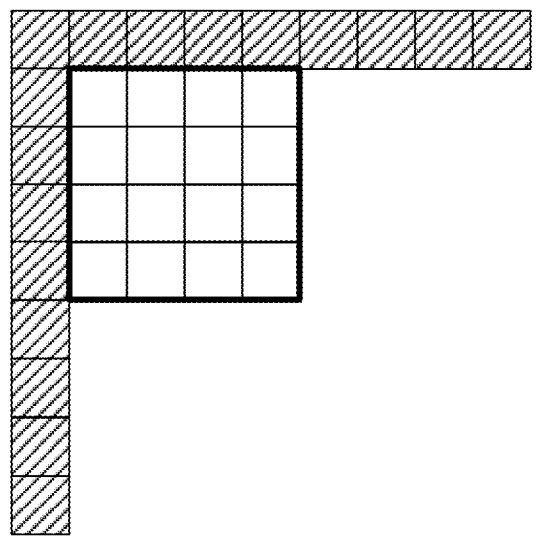
FIG. 3 is a first schematic diagram of intra prediction.

The intra prediction method is to predict the current block by using reconstructed pixels around the current block that have been coded/decoded as reference pixels. FIG. 3 is a first schematic diagram of intra prediction. As illustrated in FIG. 3, the size of the current block is 4×4; pixels at the left line and upper column of the current block are reference pixels of the current block; and these reference pixels are used for predicting the current block during intra prediction. These reference pixels may already be available, that is, all have been coded and decoded. Or, some of the reference pixels are not available, for example, if the current block is on the leftmost side of the entire picture, the reference pixels on the left side of the current block are not available. Or, when the current block is coded and decoded, the bottom-left part of the current block has not been coded and decoded yet, the reference pixels at the bottom-left part are also not available. In case that the reference pixels are not available, the available reference pixels or certain values or certain methods may be used for filling or without filling.

Figure 4:
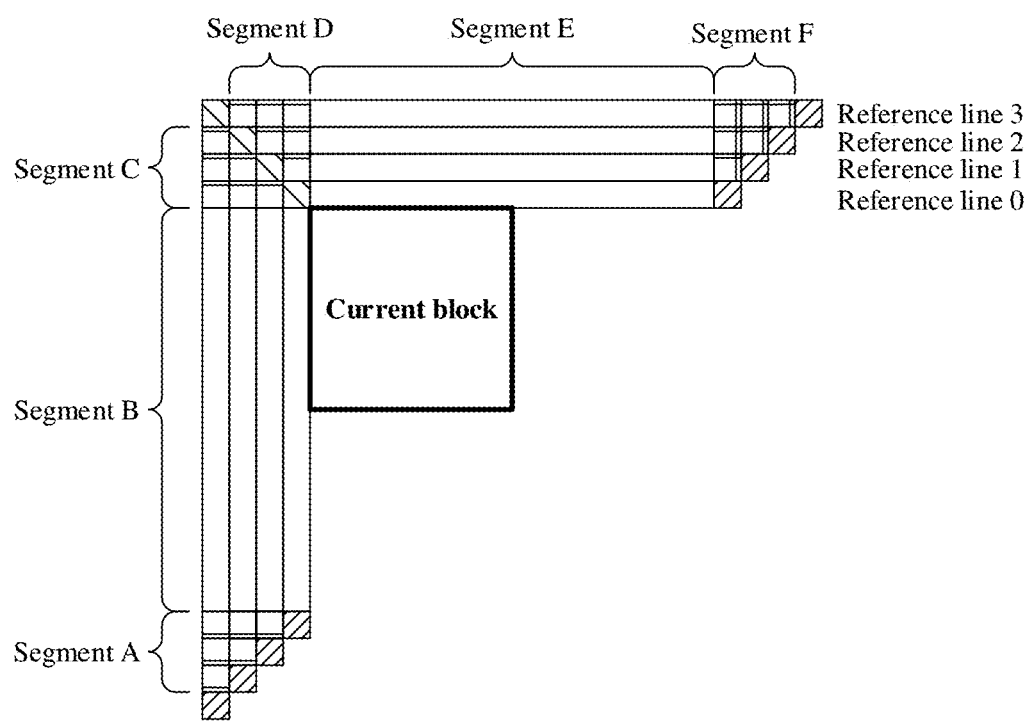
FIG. 4 is a second schematic diagram of intra prediction.
Figure 5A:
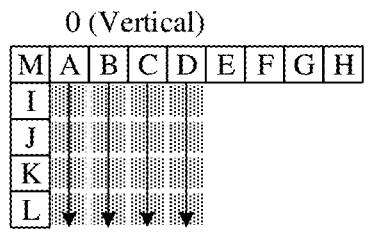
Figure 5B:
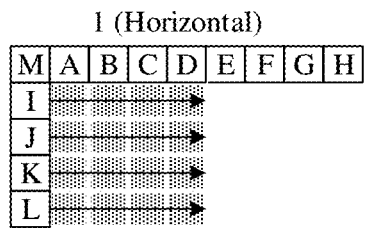
Figure 5C:
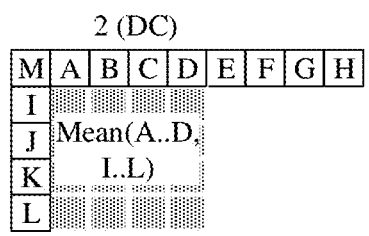
Figure 5D:
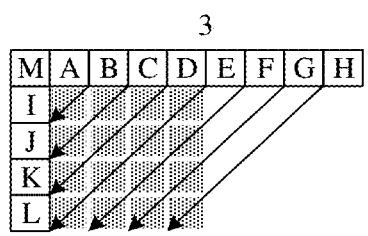
Figure 5E:
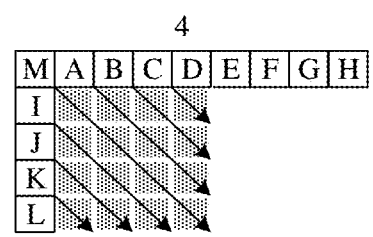

FIG. 4 is a second schematic diagram of intra prediction. As illustrated in FIG. 4, a Multiple Reference Line (MRL) intra prediction method may use more reference pixels to improve the efficiency of coding and decoding, for example, 4 reference lines/columns are used as the reference pixels of the current block.

Further, there are various prediction modes for intra prediction. FIG. 5A to FIG. 5I are third schematic diagrams of intra prediction. As illustrated in FIG. 5A to FIG. 5I, intra prediction performed on a 4×4 block in H.264 may mainly include 9 modes. In a Mode 0 illustrated in FIG. 5A, the pixels above the current block are copied to the current block in a vertical direction as predicted values; in a Mode 1 illustrated in FIG. 5B, the reference pixels on the left side are copied to the current block in a horizontal direction as predicted values; in a Mode 2 (DC) illustrated in FIG. 5C, the average value of 8 points A-D and I-L is used as predicted values of all points; and in Modes 3-8 illustrated in FIGS. 5D-5I, the reference pixels are respectively copied, at a certain angle, to the corresponding positions of the current block. As some positions of the current block cannot exactly correspond to the reference pixels, it may be necessary to use a weighted average value of the reference pixels, or sub-pixels of interpolated reference pixels.

Figure 6:
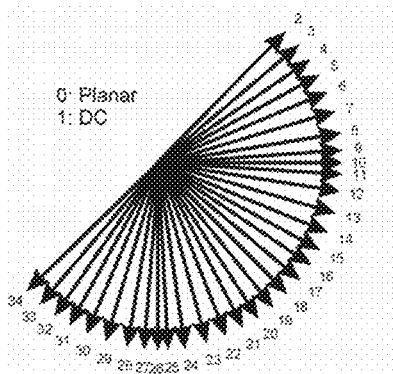
FIG. 6 is a first schematic diagram of an intra prediction mode.
Figure 7:
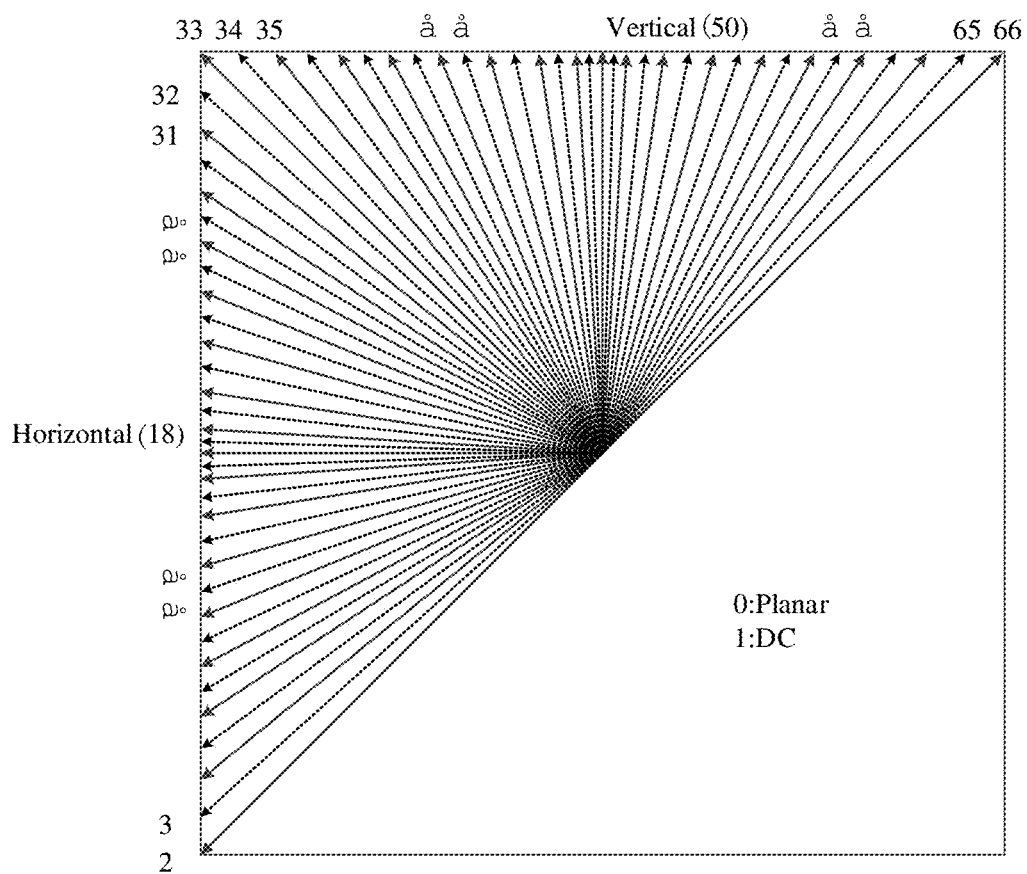
FIG. 7 is a second schematic diagram of an intra prediction mode.
Figure 8:
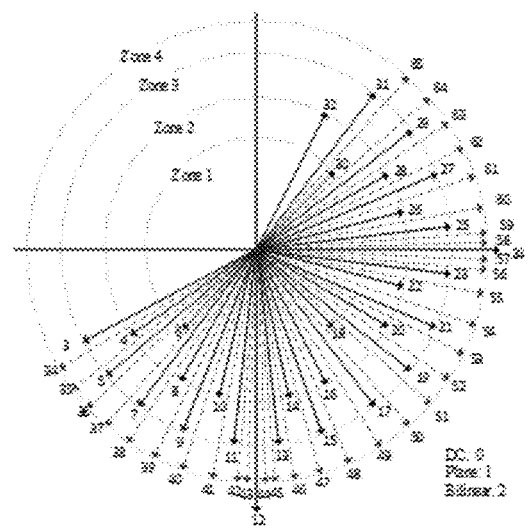
FIG. 8 is a third schematic diagram of an intra prediction mode.

In addition to this, there is still a Planar mode. With the development of technologies and the expansion of blocks, there are more and more angular prediction modes. FIG. 6 is a first schematic diagram of an intra prediction mode. As illustrated in FIG. 6, for example, intra prediction modes used by HEVC include Planar, DC and 33 angular modes, with a total of 35 prediction modes. FIG. 7 is a second schematic diagram of an intra prediction mode. As illustrated in FIG. 7, intra modes used by VVC include Planar, DC and 65 angular modes, with a total of 67 prediction modes. FIG. 8 is a third schematic diagram of an intra prediction mode. As illustrated in FIG. 8, AVS3 uses DC, Planar, Bilinear and 63 angular modes, with a total of 66 prediction modes.

There are also some other technologies to improve prediction, such as improving sub-pixel interpolation of the reference pixels and filtering prediction pixels. For example, Multiple Intra Prediction Filter (MIPF) in the AVS3 uses different filters for different block sizes to generate predicted values. For pixels at different positions in the same block, the pixel closer to the reference pixel uses one filter to generate the predicted value, and the pixel far from the reference pixel uses the other filter to generate the predicted value. A technology for filtering a prediction pixel, such as Intra Prediction Filter (IPF) in the AVS3, may use the reference pixel to filter the predicted value.

An intra mode coding technology such as a Most probable Modes List (MPM) may be used in intra prediction, so as to improve the efficiency of coding and decoding. A mode list is constructed by using intra prediction modes of blocks around the current block which have been coded and decoded, intra prediction modes, such as adjacent modes, which are derived according to the intra prediction modes of the blocks around the current block which have been coded and decoded, and some commonly used intra prediction modes or intra prediction modes with high use probability, such as a DC mode, a Planar mode and a Bilinear mode. With reference to intra prediction modes of the blocks around the current block which have been coded and decoded, the spatial correlation is used since textures have a certain continuity in space. The MPM may serve as the prediction of the intra prediction modes. That is to say, it is considered that the probability of using the MPM for the current block is higher than the probability of not using the MPM. Thus, during binaryzation, fewer code words are used for the MPM, thereby saving overhead and improving the efficiency of coding and decoding.

A variable predIntraPredMode (a predicted value of a prediction mode) is used in text of the AVS3 to represent the MPM, such as predIntraPredMode0 and predIntraPredMode1. In the present disclosure, it is considered that the predicted value of the prediction mode predIntraPredMode may be used as another name of the MPM, or the content of the present disclosure for the MPM is also applicable to predIntraPredMode.

A construction method of predIntraPredMode0 and predIntraPredMode1 in the AVS3 includes the following operations.

The predicted value of the prediction mode predIntraPredMode of the current prediction block is calculated according to the following steps.

If a left-side prediction block A "exists" and is a common intra prediction block, the IntraLumaPredMode of the A is assigned to intraPredModeA; otherwise, the intraPredModeA is equal to 0.

If an upper prediction block B "exists" and is a common intra prediction block, the IntraLumaPredMode of the B is assigned to intraPredModeB; otherwise, the intraPredModeB is equal to 0.

If the intraPredModeA is not equal to the intraPredModeB, predIntraPredMode0 is equal to Min (intraPredModeA, intraPredModeB), and predIntraPredMode1 is equal to Max (intraPredModeA, intraPredModeB); otherwise:
  if the intraPredModeA is equal to 0, the predIntraPredMode0 is equal to 0, and the predIntraPredMode1 is equal to 2; and
  if the intraPredModeA is not equal to 0, the predIntraPredMode0 is equal to 0, and the predIntraPredMode1 is equal to the intraPredModeA, where 0 represents a DC mode, and 2 represents a Bilinear mode.

Although the existing intra predictions include a DC mode, a Planar mode, a Bilinear mode and the like, all of them can only process prediction of simple textures; and even though there are more and more angular modes, predictions of the angular modes can only follow a straight line at one angle. It can be seen that, an existing intra prediction mode can only process the prediction of simple textures. With regard to complex textures, the textures need to be partitioned into smaller blocks during prediction, or more residuals are coded, or larger distortion is caused.

In view of the above problems, in the embodiments of the present disclosure, the encoder and the decoder may determine two different prediction blocks of the current block by means of two different intra prediction modes, and finally obtain a more complex prediction block by combining the prediction blocks using various weight matrices, such that the accuracy of prediction is improved. In addition, the encoder and the decoder may also construct an MPM list by using a correlation between the weight matrices and the prediction modes, such that the complexity can be greatly reduced. That is to say, by means of the intra prediction methods provided in the present disclosure, the complexity can be reduced while the quality of intra prediction is improved, thereby improving compression performance.

Figure 9:
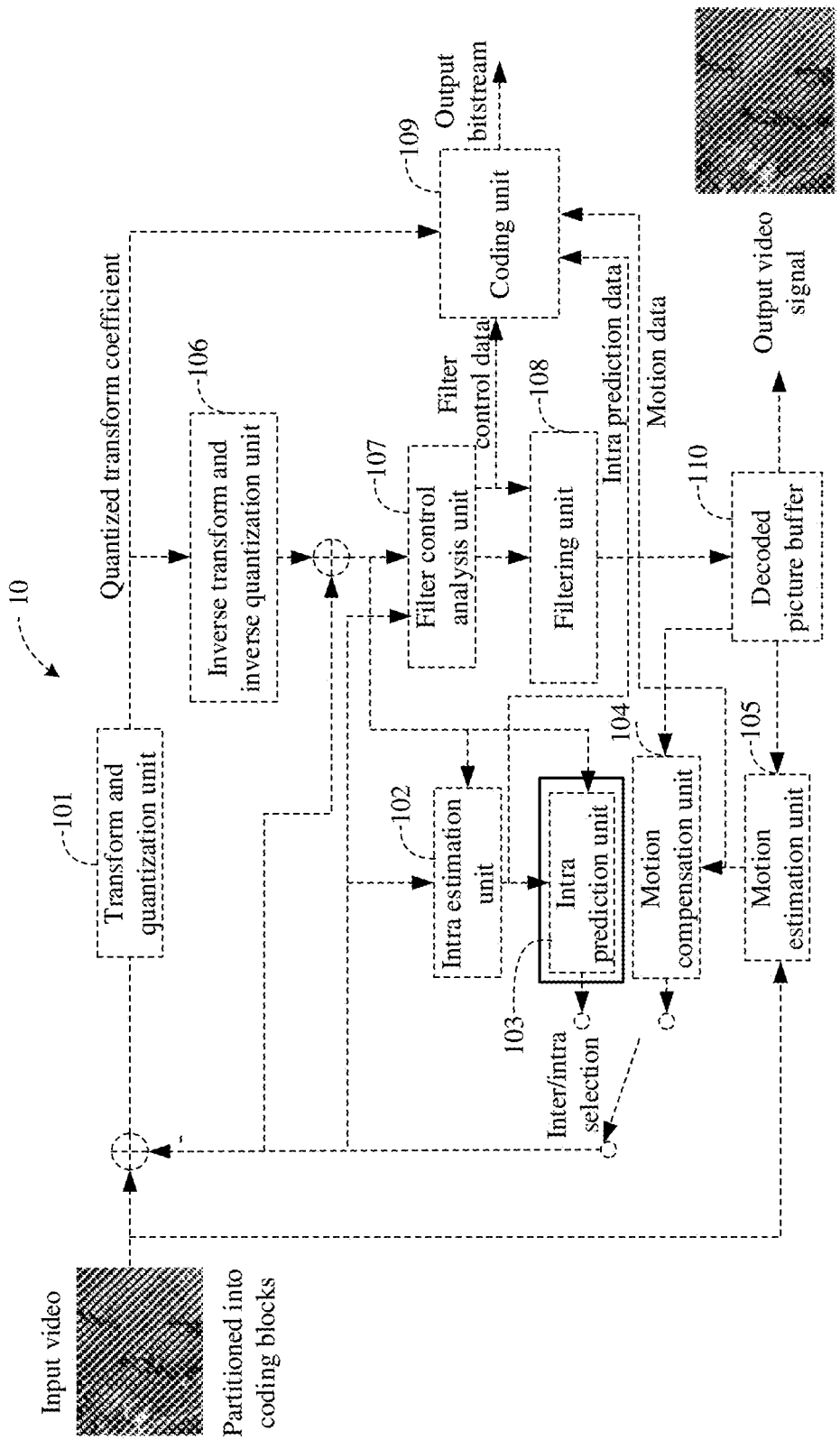
FIG. 9 is a block diagram of compositions of a video coding system.

FIG. 9 illustrates an example of a block diagram of compositions of a video coding system according to an embodiment of the present disclosure. As illustrated in FIG. 9, the video coding system 10 includes a transform and quantization unit 101, an intra estimation unit 102, an intra prediction unit 103, a motion compensation unit 104, a motion estimation unit 105, an inverse transform and inverse quantization unit 106, a filter control analysis unit 107, a filtering unit 108, a CU 109 and a decoded picture buffer 110. The filtering unit 108 may implement deblocking filter and Sample Adaptive offset (SAO) filter; and the CU 109 may implement header information coding and Context-based Adaptive Binary Arithmetic Coding (CABAC). For an input original video signal, a video Coding Block (CB) may be obtained by means of partitioning of a Coding Tree Unit (CTU). Then, for residual pixel information obtained via intra or inter prediction, the video CB is transformed by means of the transform and quantization unit 101, including transforming the residual information from a pixel domain to a transform domain, and quantizing an obtained transform coefficient, so as to further reduce a bit rate. The intra estimation unit 102 and the intra prediction unit 103 are configured to perform intra prediction on the video CB. Specifically, the intra estimation unit 102 and the intra prediction unit 103 are configured to determine an intra prediction mode to be used for coding the video CB. The motion compensation unit 104 and the motion estimation unit 105 are configured to perform inter prediction coding of the received video CB relative to one or more blocks in one or more reference pictures, so as to provide time prediction information. Motion estimation performed by the motion estimation unit 105 is a process of generating a motion vector, the motion vector may estimate motion of the video CB, and then the motion compensation unit 104 performs motion compensation based on the motion vector determined by the motion estimation unit 105. After the inter prediction mode is determined, the intra prediction unit 103 is further configured to provide selected intra prediction data to the CU 109, and the motion estimation unit 105 also sends motion vector data determined by means of calculation to the CU 109. In addition, the inverse transform and inverse quantization unit 106 is configured to reconstruct the video CB. A residual block is reconstructed in the pixel domain, and the reconstructed residual block removes blocking artifacts by the filter control analysis unit 107 and the filtering unit 108. Then, the reconstructed residual block is added to a predictive block in a picture of the decoded picture buffer 110 for generating a reconstructed video CB. The CU 109 is configured to encode various coding parameters and quantized transform coefficients, where in a CABAC-based coding algorithm, context content may be based on neighbouring CBs, and may be configured to encode information indicating the determined intra prediction mode, and output a bitstream of a video signal. The decoded picture buffer 110 is configured to store the reconstructed video CB for prediction reference. As video coding proceeds, new reconstructed video CBs are continuously generated, and these reconstructed video CBs are stored in the decoded picture buffer 110.

Figure 10:
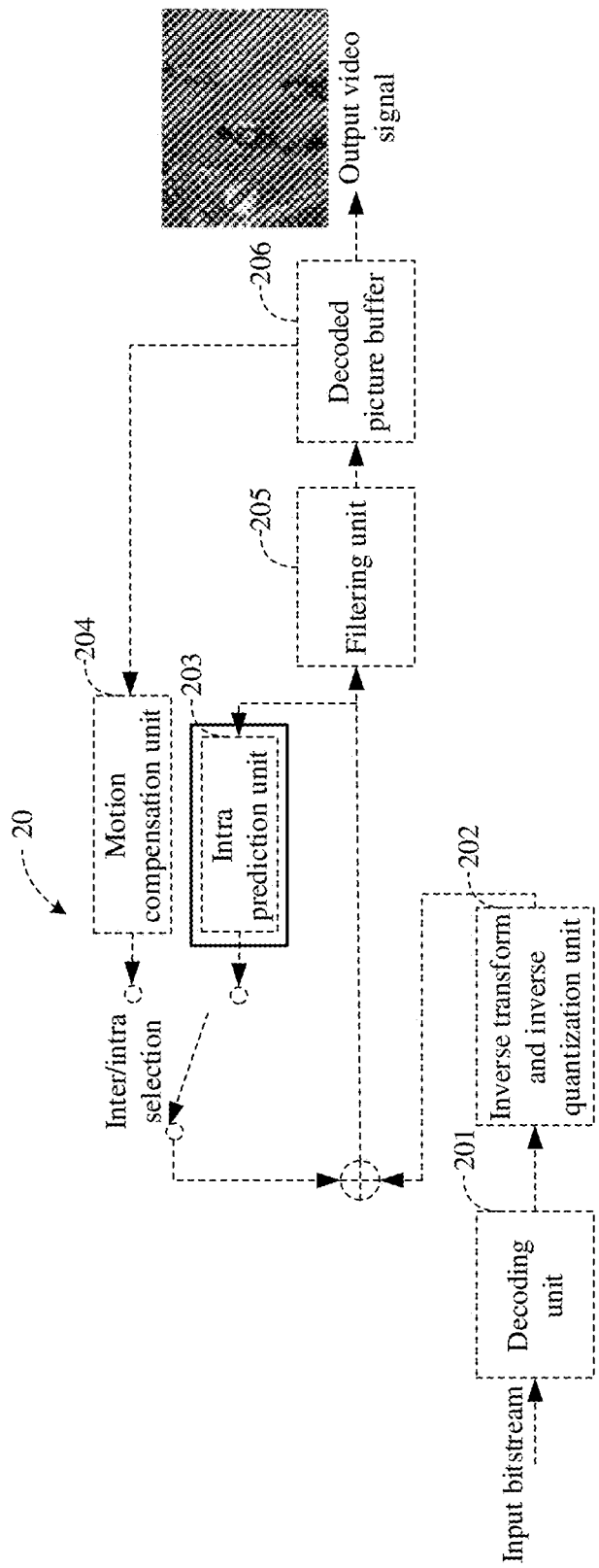
FIG. 10 is a block diagram of compositions of a video decoding system.

FIG. 10 illustrates an example of a block diagram of compositions of a video decoding system according to an embodiment of the present disclosure. As illustrated in FIG. 10, the video decoding system 20 includes a decoding unit 201, an inverse transform and inverse quantization unit 202, an intra prediction unit 203, a motion compensation unit 204, a filtering unit 205, and a decoded picture buffer 206. The decoding unit 201 may implement header information decoding and CABAC decoding; and the filtering unit 205 may implement deblocking filter and SAO filter. After an input video signal is subjected to coding processing in FIG. 9, the bitstream of the video signal is output. The bitstream is input into the video decoding system 20, and first passes through the decoding unit 201 to obtain a decoded transform coefficient. The transform coefficient is processed by the inverse transform and inverse quantization unit 202, so as to generate a residual block in a pixel domain. The intra prediction unit 203 may be configured to generate prediction data of a current video decoding block based on the determined intra prediction mode and data of a previous decoding block from a current picture. The motion compensation unit 204 is configured to determine prediction information for the video decoding block by analyzing the motion vector and other associated syntactic elements, and use the prediction information to generate a predictive block of the video decoding block that is being decoded. The residual block from the inverse transform and inverse quantization unit 202 and the corresponding predictive block generated by the intra prediction unit 203 or the motion compensation unit 204 are summed to form a decoded video block. The decoded video signal passes through the filtering unit 205 to remove blocking artifacts, so as to improve the video quality. Then, the decoded video block is stored in the decoded picture buffer 206, and the decoded picture buffer 206 stores a reference picture for subsequent intra prediction or motion compensation, and is also configured to output the video signal to obtain a recovered original video signal.

The intra prediction method in the embodiments of the present disclosure is mainly applied to the intra prediction unit 103 illustrated in FIG. 9 and the intra prediction unit 203 illustrated in FIG. 10. That is to say, the intra prediction method in the embodiments of the present disclosure may be applied to both the video coding system and the video decoding system, or may even be simultaneously applied to the video coding system and the video decoding system. However, the embodiments of the present disclosure are not specifically limited thereto. It is to be further noted that, when the intra prediction method is applied to the intra prediction unit 103, "the current block" specifically is the current coding block in intra prediction; and when the intra prediction method is applied to the intra prediction unit 203, "the current block" specifically is the current decoding block in intra prediction.

The technical solutions in the embodiments of the present disclosure are clearly and completely described below with reference to the drawings in the embodiments of the present disclosure.

Figure 11:
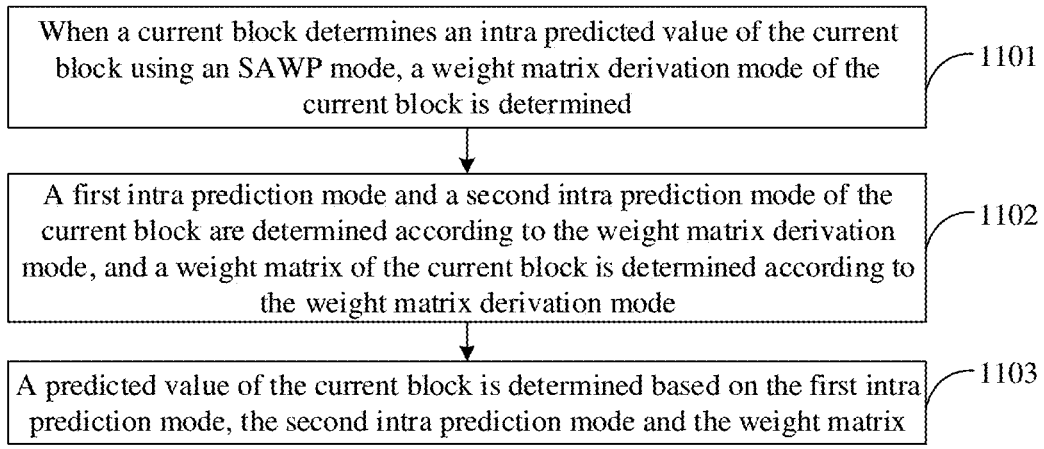
FIG. 11 is a first schematic diagram of implementation processes of an intra prediction method.

An embodiment of the present disclosure provides an intra prediction method, which is applied to an encoder. FIG. 11 is a first schematic diagram of implementation processes of an intra prediction method. As illustrated in FIG. 11, the intra prediction method performed by the encoder may include the following operations.

In 1101, when a current block determines an intra predicted value of the current block by using an SAWP mode, a weight matrix derivation mode of the current block is determined.

In this embodiment of the present disclosure, the encoder may first determine an intra prediction mode parameter of the current block.

It is to be noted that, in this embodiment of the present disclosure, the intra prediction mode parameter may indicate whether the current block may use the SAWP coding mode, that is, indicating whether the current block may use two different prediction modes for prediction.

It is to be understood that, in this embodiment of the present disclosure, the intra prediction mode parameter may be understood as a flag for indicating whether the SAWP mode is used. Specifically, the encoder may use a variable as the intra prediction mode parameter, such that the intra prediction mode parameter may be set by setting the value of the variable.

Exemplarily, in the present disclosure, if the current block uses the SAWP mode, the encoder may set the value of the intra prediction mode parameter to indicate that the current block uses the SAWP mode. Specifically, the encoder may set the value of the variable to 1.

Exemplarily, in the present disclosure, if the current block does not use the SAWP mode, the encoder may set the value of the intra prediction mode parameter to indicate that the current block does not use the SAWP mode. Specifically, the encoder may set the value of the variable to 0.

Further, in this embodiment of the present disclosure, after completing the setting of the intra prediction mode parameter, the encoder may write the intra prediction mode parameter into a bitstream and transmit the intra prediction mode parameter to a decoder, such that the decoder may obtain the intra prediction mode parameter after parsing the bitstream.

That is to say, in this embodiment of the present disclosure, on the encoder side, prediction coding is performed for the current block, the intra prediction mode parameter of the current block may be determined during this process, and then the corresponding intra prediction mode parameter is written into the bitstream and transmitted by the encoder to the decoder.

It is to be noted that, in this embodiment of the present disclosure, the SAWP mode is an intra prediction method. Specifically, the SAWP mode is to determine two different intra prediction modes for the current block; then two prediction blocks are respectively determined according to the two different intra prediction modes; next, a weight matrix may be determined, and the two prediction blocks are combined according to the weight matrix; and finally, a new prediction block may be obtained, i.e., the prediction block of the current block is obtained.

Figure 12:
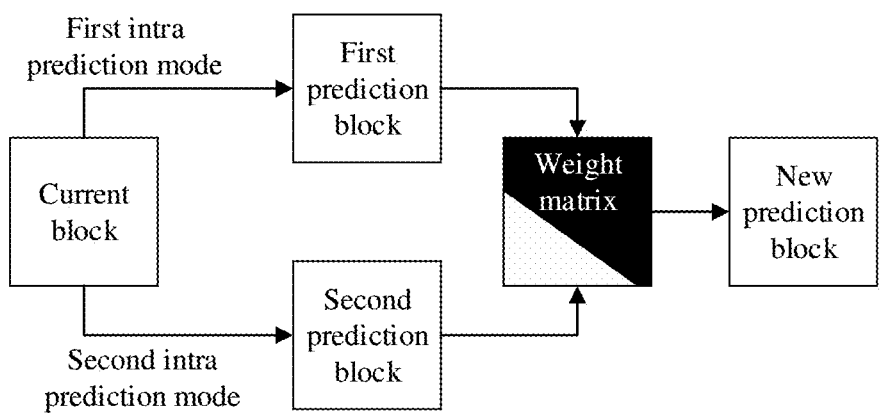
FIG. 12 is a schematic diagram of an SAWP mode.

FIG. 12 is a schematic diagram of an SAWP mode. As illustrated in FIG. 12, when intra prediction is performed on the current block, a first intra prediction mode may be used to determine a first prediction block of the current block, and at the same time, a second intra prediction mode is used to determine a second prediction block of the current block; then the first prediction block and the second prediction block may be combined by using the weight matrix, to obtain a new prediction block finally.

It is to be noted that, in this embodiment of the present disclosure, a video may be partitioned into a plurality of picture blocks; and the current block is each picture block to be currently coded, which may be called a CB. Herein, each CB may include a first colour component, a second colour component and a third colour component. Specifically, in the present disclosure, assuming that the first intra prediction is performed and the first colour component is a luma component, that is, a colour component to be predicted is the luma component, a CB to be predicted may also be called a luma block. Alternatively, assuming that the second intra prediction is performed and the second colour component is a chroma component, that is, the colour component to be predicted is the chroma component, the CB to be predicted may be called a chroma block.

Further, in this embodiment of the present disclosure, when the SAWP mode is applied, the size of the current block may be limited.

It is to be understood that, since the intra prediction method provided in this embodiment of the present disclosure needs to generate two prediction blocks by using two different intra prediction modes respectively, and then perform weighting according to the weight matrix to obtain the new prediction block, in order to reduce complexity and consider the tradeoff between compression performance and complexity at the same time, some prediction blocks with certain sizes may be restricted to not use the SAWP mode in the embodiments of the present disclosure. Therefore, in the present disclosure, the encoder may first determine a dimension parameter of the current block, and then determine, according to the dimension parameter, whether the current block uses the SAWP mode.

It is to be noted that, in this embodiment of the present disclosure, the dimension parameter of the current block may include height and width of the current block. Therefore, the encoder may restrict the use of the SAWP mode by using the height and width of the current block, that is, restricting the size of the prediction block that can use the SAWP mode.

Exemplarily, in the present disclosure, if the width is greater than a first threshold and the height is greater than a second threshold, it is determined that the current block uses the SAWP mode. One possible limitation is to use the SAWP mode only when the width of the prediction block is greater than (or greater than or equal to) the first threshold TH1 and the height of the prediction block is greater than (or greater than or equal to) the second threshold. The values of the first threshold TH1 and the second threshold may be 8, 16, 32, and the like; and the first threshold may be equal to the second threshold.

Exemplarily, in the present disclosure, if the width is less than a third threshold and the height is greater than a fourth threshold, it is determined that the current block uses the SAWP mode. One possible limitation is to use the SAWP mode only when the width of the prediction block is less than (or less than or equal to) the third threshold and the height of the prediction block is greater than (or greater than or equal to) the fourth threshold. The values of the third threshold and the fourth threshold may be 8, 16, 32, and the like; and the third threshold may be equal to the fourth threshold.

In another example, in the present disclosure, if the width is less than the third threshold and the height is less than the fourth threshold, it is determined that the current block uses the SAWP mode. One possible limitation is to use the SAWP mode only when the width of the prediction block is less than (or less than or equal to) the third threshold and the height of the prediction block is less than (or less than or equal to) the fourth threshold. The values of the third threshold and the fourth threshold may be 8, 16, 32, and the like; and the third threshold may be equal to the fourth threshold.

With regard to the above examples, description is made by taking that the width of the prediction block is greater than or equal to 8, the height of the prediction block is greater than or equal to 8, the width of the prediction block is less than or equal to 32 and the height of the prediction block is less than or equal to 32 as an example, and a corresponding implementation process is provided as follows.

```
If(SawpEnableFlag&&    IntraCuFlag&&width>=SawpMinSize&&
height>=SawpMinSize&& width<=SawpMaxSize&&
height<=SawpMaxSize){
  sawp_flag
}
if (DtEnableFlag && IntraCuFlag&&!SawpFlag) {
  dt_split_flag
}
```

Where SawpMinSize is equal to 8, and SawpMaxSize is equal to 32.

In addition, description is made by taking that the width of the prediction block is greater than or equal to 8, the height of the prediction block is greater than or equal to 8, the width of the prediction block is less than or equal to 16 and the height of the prediction block is less than or equal to 16 as an example, and a corresponding implementation process is provided as follows.

```
If(SawpEnableFlag&&    IntraCuFlag&&width>=SawpMinSize&&
height>=SawpMinSize&& width<=SawpMaxSize&&
height<=SawpMaxSize){
  sawp_flag
}
if (DtEnableFlag && IntraCuFlag&&!SawpFlag) {
  dt_split_flag
}
```

Where SawpMinSize is equal to 8, and SawpMaxSize is equal to 16.

Further, in this embodiment of the present disclosure, the dimension of the prediction block that can use the SAWP mode may also be limited by limiting a pixel parameter.

Exemplarily, in the present disclosure, the encoder may first determine a pixel parameter of the current block, and then further determine, according to the pixel parameter and a fifth threshold, whether the current block may use the SAWP mode. It can be seen that, one possible limitation is to use the SAWP mode only when the pixel number of the prediction block is greater than (or greater than or equal to) the fifth threshold. The value of the fifth threshold may be 8, 16, 32, and the like.

That is to say, in the present disclosure, the current block can use the SAWP mode only if the dimension parameter of the current block meets a dimension requirement.

It is to be noted that, in this embodiment of the present disclosure, when the encoder performs intra prediction on the current block, in addition to the SAWP mode provided in the present disclosure, the intra prediction mode used may also include any intra coding mode such as a DC mode, a PLANAR mode and an angular mode.

It is to be understood that, in this embodiment of the present disclosure, before performing intra prediction on the current block, the encoder may first determine a prediction mode parameter, and may then determine, by means of the prediction mode parameter, which coding mode is used for the current block.

In this embodiment of the present disclosure, further, when determining the prediction mode parameter of the current block, the encoder may first use various different prediction modes to respectively perform prediction coding on the current block, then calculate a rate-distortion cost result corresponding to each prediction mode in various prediction modes, finally select a minimum rate-distortion cost result from a plurality of rate-distortion cost results obtained by means of calculation, and determine the prediction mode corresponding to the minimum rate-distortion cost result as the prediction mode parameter of the current block.

That is to say, on the encoder side, various prediction modes may be used for the current block to respectively code the colour component to be predicted.

Further, in this embodiment of the present disclosure, after using the various prediction modes to respectively code the current block, the encoder may obtain the rate-distortion cost result corresponding to each prediction mode, then selects the minimum rate-distortion cost result from the plurality of obtained rate-distortion cost results, and determines the prediction mode corresponding to the minimum rate-distortion cost result as the prediction mode parameter of the current block. In this way, the determined prediction mode may be finally used to code the current block; and in the prediction mode, a small prediction residual may be achieved, such that the efficiency of coding and decoding can be improved.

In this embodiment of the present disclosure, further, on the coding end, when making an attempt on intra prediction for a certain prediction block, the encoder also makes an attempt on the cost of coding according to the SAWP mode. When making an attempt on the cost of coding according to the SAWP mode, the encoder makes an attempt on the cost of all or part of possible cases, and then selects the one with the minimum cost as the cost of SAWP mode coding.

It is to be noted that, in the embodiments of the present disclosure, all possible cases above include a combination of three changes that the first intra prediction mode of the current block is all possible prediction modes, the second intra prediction mode of the current block is all possible prediction modes, and the weight matrix derivation mode is all possible modes. Assuming that there are 66 available intra prediction modes, there are 66 possible first intra prediction modes. Since the second intra prediction mode is different from the first intra prediction mode, there are 65 second intra prediction modes. Assuming that there are 56 weight matrix derivation modes (using AWP as an example), in the present disclosure, any two different intra prediction modes and any weight matrix derivation mode may be used, i.e., there are 66×65×56 possibilities in total. If it is set to not use the intra prediction mode such as a PCM, there are 65×64×56 possibilities. In the present disclosure, limitation may also be performed on the intra prediction modes that may be selected, and limitation is performed on the number of weight matrix derivation modes that may be used, such that combinations are reduced accordingly.

For example, the intra prediction modes that may be selected for the first intra prediction mode may be limited, and/or the intra prediction modes that may be selected for the second intra prediction mode may be limited. Limiting the selection of the intra prediction modes is to reduce the intra prediction modes that may be selected, and/or to limit the weight matrix derivation modes that may be used, such that, in the present disclosure, the possibility of using any two different intra prediction modes and any weight matrix derivation mode is reduced, thereby decreasing the number of bits of corresponding flags.

Further, in this embodiment of the present disclosure, the encoder may perform Rate-Distortion Optimization (RDO) on all possible cases of the SAWP mode, so as to determine a combination with the minimum cost. Each combination is a combination including the first intra prediction mode, the second intra prediction mode and the weight matrix derivation mode.

Optionally, in order to reduce the time consumption of RDO, initial selection may be first performed on all possible cases of the SAWP mode. For example, SAD and SATD or the like are used as approximate costs for initial selection, so as to determine a set number of combinations of candidate first intra prediction modes, second intra prediction modes and weight matrix derivation modes; and then RDO fine selection is performed to determine the combination with the minimum cost of the first intra prediction mode, the second intra prediction mode and the weight matrix derivation mode. Therefore, some fast algorithms may be used during initial selection to reduce the number of attempts. For example, when an angular intra prediction mode causes a large cost, attempts will not be made on several intra prediction modes adjacent to the angular intra prediction mode.

It is to be understood that, in the present disclosure, in initial selection and fine selection described above, the cost may include a cost of coding of the overheads of the first intra prediction mode, the second intra prediction mode and the weight matrix derivation mode in the bitstream. The cost of estimation of the overheads of the first intra prediction mode, the second intra prediction mode and the weight matrix derivation mode in the bitstream may also be used during the initial selection. For example, the number of bits of the first or second intra prediction mode is estimated according to whether the first or second intra prediction mode is an MPM, or the number of bits of the first or second intra prediction mode is estimated according to the order of the intra prediction modes. During RDO, the cost may be obtained by means of relatively accurate trial coding. In the process, a method for constructing a mode list or a method for sorting the intra prediction modes of the present disclosure needs to be used.

It is to be understood that, in the present disclosure, during initial selection and fine selection, a first prediction block is determined according to the first intra prediction mode, a second prediction block is determined according to the second intra prediction mode, the weight matrix is derived according to the weight matrix derivation mode, and the prediction block of the present disclosure is determined according to the first prediction block, the second prediction block and the weight matrix. During SAD and SATD initial selection, SAD and SATD are determined by using the current block and the prediction block.

Further, in this embodiment of the present disclosure, the encoder may first analyze the texture of the current block, for example, analyzing by using a gradient, and then use analyzed data to assist in initial selection. For example, during the initial selection, the intra prediction modes are more likely selected for attempt in a direction, which is approximate to the direction in which the texture of the current block is stronger; and for example, during the initial selection, the intra prediction modes are less likely selected or are not selected for attempt in a direction, which is approximate to the direction in which the texture of the current block is weaker.

It is to be noted that, in the present disclosure, the cost of coding according to the SAWP mode includes the cost of code words occupied by the first intra prediction mode, the second intra prediction mode and the weight matrix derivation mode in the bitstream, the cost of various flags and quantization coefficients that are to be transmitted in the bitstream for transform, quantization and entropy coding or the like of the predicted residuals, and the cost of distortion in the reconstructed block.

After the cost of coding according to the SAWP mode is determined, if the cost of coding according to the SAWP mode is less than the costs of other prediction modes (other prediction modes may include other intra prediction modes or inter prediction modes), the encoder selects the SAWP mode as the prediction mode of the current block, otherwise, the encoder selects another prediction mode.

Further, in this embodiment of the present disclosure, the encoder makes an attempt on coding costs for different partitioning of the blocks. If a certain prediction block finally selects the SAWP mode, a flag required by the SAWP mode and information of the first intra prediction mode, the second intra prediction mode and the weight matrix derivation mode are written into the bitstream according to syntax; and at the same time, the prediction block performs prediction and subsequent coding operations according to the method of the SAWP mode.

In this embodiment of the present disclosure, after the encoder determines the intra prediction mode parameter of the current block, if the intra prediction mode parameter indicates that the current block uses the SAWP mode to determine the intra predicted value of the current block, the encoder may further determine the weight matrix derivation mode of the current block.

It is to be noted that, in the present disclosure, the weight matrix derivation mode is used for determining the weight matrix used by the current block. Specifically, the weight matrix derivation mode may be a mode for deriving a weight matrix. For a prediction block with a given length and width, each weight matrix derivation mode may derive one weight matrix; and for prediction blocks with the same size, the weight matrices derived by different weight matrix derivation modes are different.

Exemplarily, in the present disclosure, the AWP in the AVS3 has 56 weight matrix derivation modes, and the GPM in the VVC has 64 weight matrix derivation modes.

In 1102, a first intra prediction mode and a second intra prediction mode of the current block are determined according to the weight matrix derivation mode, and a weight matrix of the current block is determined according to the weight matrix derivation mode.

In this embodiment of the present disclosure, if the intra prediction mode parameter indicates that the current block uses the SAWP mode to determine the intra predicted value of the current block, after determining the weight matrix derivation mode of the current block, the encoder may first determine the first intra prediction mode and the second intra prediction mode of the current block according to the weight matrix derivation mode, and may simultaneously determine the weight matrix of the current block according to the weight matrix derivation mode.

It is to be noted that, in this embodiment of the present disclosure, the first intra prediction mode and the second intra prediction mode used by the current block may be any one of currently common intra prediction modes, including, but not limited to, intra prediction modes such as a DC mode, a Planar mode, a Bilinear mode and an angular prediction mode.

In one example of the present disclosure, a broader understanding is that the intra prediction mode further includes technologies for improving prediction, such as improving sub-pixel interpolation of reference pixels and filtering prediction pixels, for example, MIPF and IPF.

Accordingly, in the present disclosure, the intra prediction modes such as the DC mode, the Planar mode, the Bilinear mode and the angular prediction mode may be called basic intra prediction modes, and the technologies for improving prediction, such as the MIPF and the IPF, are called improved intra prediction modes. The basic intra prediction modes are intra prediction modes that may independently generate prediction blocks without relying on other intra prediction modes, that is, the prediction block may be determined by determining the reference pixels and the basic intra prediction modes. However, the improved intra prediction modes cannot independently generate the prediction block, but only determine the prediction block by relying on the basic intra prediction modes. For example, a certain angular prediction mode may determine and generate the prediction block according to the reference pixel, and the MIPF may use, based on the angular prediction mode, different filters for pixels at different positions to generate or determine the prediction block.

Exemplarily, in the present disclosure, the first intra prediction mode and the second intra prediction mode may both be the basic intra prediction modes, that is, in the embodiments of the present disclosure, two different basic intra prediction modes are used. In this case, the improved intra prediction modes may be respectively combined with the first intra prediction mode and the second intra prediction mode, so as to generate a first prediction block and a second prediction block. Furthermore, after a "new prediction block" is generated in this embodiment of the present disclosure, an updated prediction block may be obtained by improving the "new prediction block".

Exemplarily, in the present disclosure, the first intra prediction mode and the second intra prediction mode may also be combinations of the basic intra prediction modes and the improved intra prediction modes, that is, in the embodiments of the present disclosure, two different intra prediction mode combinations are used. For example, the first intra prediction mode and the second intra prediction mode both use the same angular prediction mode, but the first intra prediction mode does not use the improved intra prediction mode, such as IPF, while the second intra prediction mode uses the improved intra prediction mode, such as the IPF. Alternatively, the first intra prediction mode and the second intra prediction mode both use the same angular prediction mode, but the first intra prediction mode uses one option of the improved intra prediction mode, while the second intra prediction mode uses the other option of the improved intra prediction mode. After the "new prediction block" is obtained, there may still be an improved intra prediction mode to improve the "new prediction block", so as to obtain an updated prediction block.

Therefore, with the intra prediction method provided in the embodiments of the present disclosure, based on the first intra prediction mode and the second intra prediction mode, two prediction blocks that are not exactly identical may be determined for the current block, the weight matrix is determined, and the two prediction blocks are combined according to the weight matrix to obtain the new prediction block.

Further, in this embodiment of the present disclosure, not all points of each weight matrix in all possible weight matrices have the same weights. In other words, at least one possible weight matrix includes at least two different weights.

In one example of the present disclosure, all possible weight matrices include at least two different weights.

In one example of the present disclosure, part of the weight matrices includes at least two different weights. For example, in the present disclosure, if the minimum weight is 0 and the maximum weight is 8, there is a weight matrix with some points of 0 and some points of 8. Correspondingly, part of the weight matrices only includes the same weights. For example, in the present disclosure, there is a weight matrix with all points of 4.

In one example of the present disclosure, there are only two types of weights in one weight matrix; and one type of weights indicates that predicted values of corresponding points are completely derived from values of points corresponding to the first prediction block, and the other type of weights indicates that the predicted values of the corresponding points are completely derived from values of points corresponding to the second prediction block. For example, in the present disclosure, there are only two types of weights in one weight matrix, which respectively are 0 and 1.

In one example of the present disclosure, there may be a plurality of weights in one weight matrix, in which the maximum weight and the minimum weight (for example, 0) respectively indicate that the predicted values of the corresponding points are completely derived from the values of the points corresponding to the first prediction block or the values of the points corresponding to the second prediction block. The weights that are not the maximum value or the minimum value indicate that the predicted values of the corresponding points are derived from the weighted average of the values of the points corresponding to the first prediction block and the second prediction block. An area consisting of the maximum or minimum weights may be called a blending area.

It is to be noted that, in the present disclosure, when there are only two types of weights in the weight matrix, positions at which the weights change form a straight line; or, when there are a plurality of weights in the weight matrix, positions with the same weights in the blending area form a straight line (line section). The straight line may be all horizontal-vertical, or may be not all horizontal-vertical.

In one example of the present disclosure, when there are only two types of weights in the weight matrix, positions at which the weights change form a curve (curve section); or when there are a plurality of weights in the weight matrix, positions with the same weights in the blending area form a curve (curve section).

Further, in this embodiment of the present disclosure, the encoder may use a method similar to the GPM or the AWP to determine the weight matrix. Specifically, if the GPM or the AWP is used in the same coding/decoding standard or used by the encoder and decoder, the method may be used to determine the weight matrix. In this way, part of the same logic may be multiplexed. For example, the AWP is used in AVS3 inter prediction, and the AWP may be used to determine the weight matrix in the AVS3. A method different from the GPM or the AWP in the same coding/decoding standard or the encoder and decoder may also be used, for example, using different number of modes, or different blending area algorithms, or using different parameters. Since correlation in time domain is used in inter prediction, a reconstructed picture in a reference picture is used as a reference block. While correlation in space domain is used in intra prediction, a reconstructed pixel around the current block is used as a reference pixel. If the distance in the space domain is closer, the correlation is stronger; and the distance is farther, the correlation is worse. Therefore, if a weight matrix causes pixel positions used by the prediction block to be far away from the reference pixel, this part may not make a more appropriate predicted value than that in the prior art, and thus such weight matrix may not be used in intra prediction, but may be used in inter prediction.

It is to be noted that, in the embodiments of the present disclosure, since two intra prediction modes need to be used, and other common intra prediction methods generally only need to use one intra prediction mode, the coding method for an intra prediction mode used in the embodiments of the present disclosure may be different from a coding method for an intra prediction mode of other common intra prediction methods. Correspondingly, the MPM construction method used in the embodiments of the present disclosure may also be different from an MPM construction method of other common intra prediction methods.

In the embodiments of the present disclosure, further, the intra prediction method provided in the embodiments of the present disclosure needs to transmit information on the weight matrix derivation mode and information on two intra prediction modes in the bitstream. Taking the AWP in the AVS3 as an example, there are 56 weight matrix derivation modes, and 5-6 bits are required for binaryzation. Taking the AVS3 as an example, there are 66 intra prediction modes, and two MPMs are used. If the intra prediction mode is the MPM, two bits are required for binaryzation, otherwise, 7 bits are required for binaryzation. That is to say, in the AVS3, the information requires a maximum of 20 (6+7+7) bits of overhead.

In order to reduce the binaryzation overhead of the information and improve coding performance, in the embodiments of the present disclosure, the encoder may determine the information by using the correlation between the intra prediction mode of the current block and the weight matrix. Specifically, there may be a certain correlation between the intra prediction mode used by the current block and the weight matrix; and by using the correlation, the encoder may use the information on the weight matrix when coding the intra prediction mode. Further, the encoder may use the information on the weight matrix derivation mode when coding the intra prediction mode.

Further, in this embodiment of the present disclosure, when the weight matrix includes two types of weights, positions at which the weights change form a straight line; or when there are a plurality of weights in the weight matrix, positions with the same weights in the blending area form a straight line, which may be called a boundary line. The boundary line itself has an angle. The angle horizontally towards the right may be set to 0, and increase counter-clockwise. Then, the boundary line may be at an angle of horizontal 0 degrees or vertical 90 degrees, may be at an inclined angle, such as 45 degrees and 135 degrees, and may be at other different angles. If a prediction block selects to use a certain weight matrix, corresponding textures are likely to show different properties on two sides of the boundary line. For example, the two sides of the boundary line have the textures at two different angles; alternatively, one side of the boundary line is a texture at an angle, and the other side is a relatively flat texture. Since the boundary line itself is at an angle, it can be assumed that the boundary line is obtained from one point by means of angular intra prediction. The point may be close to some textures of the current block, and thus there is a correlation between the straight line and the two intra prediction modes of the current block.

Specifically, in the present disclosure, assuming that the boundary line is obtained from one point by means of angular intra prediction, at least one angular intra prediction mode may be found, and the angular intra prediction mode may approximately make the boundary line. For example, a boundary line in the horizontal direction matches a horizontal intra prediction mode, for example, Mode 24 in the AVS3; a boundary line in the vertical direction matches a vertical intra prediction mode, for example, Mode 12 in the AVS3; and a 45-degree boundary line may match a 45-degree intra prediction mode from lower left to upper right, for example, Mode 30 in the AVS3, or may match a 225-degree intra prediction mode from upper right to lower left, for example, Mode 6 in the AVS3. If there is only one type of weights in the weight matrix, the weight matrix may match the modes such as DC, Planar and Bilinear modes without an obvious angle. It can be seen that, the weight matrix derivation mode may match a certain intra prediction mode, and thus the weight matrix derivation mode may be used to assist in the coding of the intra prediction modes.

It is to be noted that, in the present disclosure, the weight matrix derivation mode may also be an index of the weight matrix. For example, 56 modes of the AWP may be regarded as 56 weight matrix derivation modes.

Exemplarily, in the present disclosure, a mapping table may be constructed to further represent a mapping between the weight matrix derivation modes and angular intra prediction modes. Specifically, the boundary lines of a plurality of modes of AWP and GPM are at the same angle. For example, the angles of the boundary lines of the AWP in the AVS3 are the same every 8 modes. The 56 modes of AWP have a total of 7 boundary line angles. An index of the boundary line angle may be obtained by the mode number of the weight matrix derivation mode Mod 8 (% 8). For example, Table 1 is the mapping table. Taking an angular mode of the AVS3 as an example, the indexes 0 and 1 of the boundary line angles may respectively correspond to two angular intra prediction modes, where one is from upper right to lower left, and one is from upper left to lower right. During specific implementation, another approximately corresponding angular intra prediction mode may also be found for the indexes of other boundary line angles, or the indexes of all boundary line angles only correspond to one angular intra prediction mode.

TABLE 1

| | Index of boundary line angle | | | | | | | |
|---|---|---|---|---|---|---|---|---|
| | 0 | 1 | 2 | 3 | 4 | 5 | 6 | 7 |
| Corresponding angular intra prediction mode | 6 30 | 27 3 | 24 | 21 | 18 | 15 | 12 | 9 |

Figure 13:
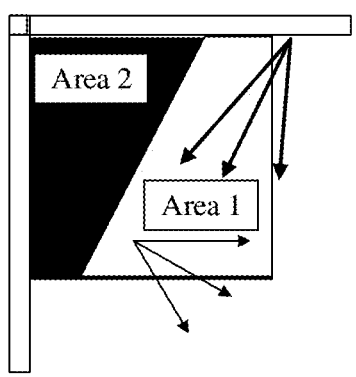
FIG. 13 is a third schematic diagram of intra prediction.

Further, in the present disclosure, the reference pixels on the left side and upper side of the current block are generally used for intra prediction; and the distance between the pixels in space is closer, the correlation is stronger, and the distance in space is farther, the correlation is weaker. Therefore, if only a part of pixels of the current block is obtained by prediction using the intra prediction mode, the position of the part of the pixels affects the probability of the intra prediction mode used for this part. That is, the position and angle of the boundary line affect the selection of the two intra prediction modes on the two sides of the boundary line. FIG. 13 is a third schematic diagram of intra prediction. As illustrated in FIG. 13, Area 1 of the current block indicates that the predicted values are from the first intra prediction mode; Area 2 of the current block indicates that the predicted values are all from the second intra prediction mode; and the blending area between Area 1 and Area 2 is obtained by weighting the predicted values of the two intra prediction modes. With regard to Area 1, since the reference pixel at the upper right part is closest to Area 1, the intra prediction modes (for example, thick arrows) in a fan-shaped angle area from upper right to lower left may better use the spatial correlation, with a higher probability of use. Since Area 1 is far away from the reference pixel at the upper left corner, the intra prediction modes (for example, thin arrows) in a fan-shaped angle area from upper left to lower right cannot well use the spatial correlation, with a lower probability of use.

In this embodiment of the present disclosure, further, when determining the first intra prediction mode and the second intra prediction mode of the current block according to the weight matrix derivation mode, the encoder may first use the weight matrix derivation mode to determine a mode list (MPM), and then further determine the first intra prediction mode and the second intra prediction mode based on the mode list.

Specifically, in this embodiment of the present disclosure, when the first intra prediction mode and the second intra prediction mode are determined by using the correlation with the weight matrix, the weight matrix derivation mode may be used to construct the mode list, or the information of the weight matrix derivation mode may be used when the MPM is constructed. The weight matrix derivation mode may correspond to at least one intra prediction mode, and thus the encoder may add the intra prediction mode corresponding to the weight matrix derivation mode determined for the current block into the mode list, or add several intra prediction modes related to the intra prediction mode corresponding to the weight matrix derivation mode into the mode list.

Further, in this embodiment of the present disclosure, when the encoder determines the mode list using the weight matrix derivation mode, the encoder may first determine intra prediction modes corresponding to neighbouring blocks of the current block, and then determine the intra prediction modes corresponding to the neighbouring blocks as modes to be added. After determining that the modes to be added meet a preset addition condition, the encoder may add the modes to be added into the mode list, that is, adding the intra prediction modes corresponding to the neighbouring blocks of the current block into the mode list; next, if the mode list does not meet a preset list length, the encoder may continue to determine a related intra prediction mode corresponding to the weight matrix derivation mode, and then determines the related intra prediction mode corresponding to the weight matrix derivation mode as a mode to be added; and when it is determined that the mode to be added meets the preset addition condition, the mode to be added is added into the mode list, that is, the related intra prediction mode corresponding to the weight matrix derivation mode is added into the mode list.

It is to be noted that, in this embodiment of the present disclosure, when adding the intra prediction modes corresponding to the neighbouring blocks into the mode list, the encoder may first determine sequence parameters corresponding to the neighbouring blocks, and then successively add the intra prediction modes corresponding to the neighbouring blocks into the mode list according to the sequence parameters. The encoder may determine the corresponding sequence parameter according to a spatial distance between a neighbouring block and the current block. For example, if the spatial distance between the neighbouring block and the current block is closer, the correlation between the neighbouring block and the current block is stronger, and addition processing is performed more earlier, that is, the sequence parameter is smaller; and if the spatial distance between the neighbouring block and the current block is farther, the correlation between the neighbouring block and the current block is weaker, and the addition processing is performed later, that is, the sequence parameter is larger.

Further, in this embodiment of the present disclosure, when determining the related intra prediction mode corresponding to the weight matrix derivation mode, the encoder may first determine the intra prediction mode corresponding to the weight matrix derivation mode, and then based on the intra prediction mode corresponding to the weight matrix derivation mode, determine the related intra prediction mode according to a first index interval.

Exemplarily, in this embodiment of the present disclosure, when determining the several intra prediction modes related to the intra prediction mode corresponding to the weight matrix derivation mode, the encoder may select, according to the first index interval, modes of which index numbers differ by a certain number or numbers from that of the intra prediction mode corresponding to the weight matrix derivation mode, for example, differing by 1 index number, differing by 2 index numbers, or the like. For example, assuming that the index of the intra prediction mode corresponding to the weight matrix derivation mode is 10, and the first index interval is 2, the two intra prediction modes with the indexes of 8 and 12 may be determined as two related intra prediction modes related to the intra prediction mode corresponding to the weight matrix derivation mode.

It is to be noted that, in this embodiment of the present disclosure, after the encoder adds the intra prediction modes corresponding to the neighbouring blocks of the current block into the mode list, or after the encoder adds the related intra prediction mode corresponding to the weight matrix derivation mode into the mode list, if the mode list does not meet the preset list length, that is, the mode list is not filled, the encoder may continue to determine a preset prediction mode as a mode to be added, and then adds the mode to be added into the mode list after determining that the mode to be added meets the preset addition condition, that is, adding the preset prediction mode into the mode list.

It is to be understood that, in the present disclosure, the preset prediction mode may include one or more of various different modes such as a DC mode, a Bilinear mode and a Planar mode.

Further, in this embodiment of the present disclosure, after the encoder separately adds the intra prediction modes corresponding to the neighbouring blocks of the current block, the related intra prediction mode corresponding to the weight matrix derivation mode, and the preset prediction mode into the mode list, if the mode list still does not meet the preset list length, that is, the mode list is still not filled, the encoder may select to use a prediction mode in the mode list to determine an associated intra prediction mode, then determines the associated intra prediction mode as a mode to be added, and adds the mode to be added into the mode list after determining that the mode to be added meets the preset addition condition, that is, adding the associated intra prediction mode corresponding to the mode list into the mode list.

That is to say, in the present disclosure, after the intra prediction modes corresponding to the neighbouring blocks of the current block, the related intra prediction mode corresponding to the weight matrix derivation mode, and the preset prediction mode are successively added into the mode list, if the mode list is still not filled, the encoder may select existing prediction modes in the mode list to determine the corresponding associated intra prediction modes, and then adds these associated intra prediction modes into the mode list.

Exemplarily, in the present disclosure, the encoder may successively determine, based on any prediction mode in the mode list, the associated intra prediction mode related to the prediction mode according to a second index interval. The encoder may select, according to the second index interval, modes of which index numbers differ by a certain number or numbers from the index number of the prediction mode, for example, differing by 1 index number, differing by 2 index numbers, or the like.

It is to be noted that, in the embodiments of the present disclosure, either using an intra prediction mode corresponding to a neighbouring block of the current block as the mode to be added, or using the related intra prediction mode corresponding to the weight matrix derivation mode as the mode to be added, or using the preset prediction mode as the mode to be added, or using the associated intra prediction mode as the mode to be added, the encoder needs to determine whether the mode to be added meets the preset addition condition. Specifically, if the mode to be added exists and is different from all prediction modes in the mode list, it may be determined that the mode to be added meets the preset addition condition, such that the mode to be added may be added into the mode list.

Correspondingly, if the mode to be added does not exist or is the same as (coincides with) a prediction mode in the mode list, it may be determined that the mode to be added does not meet the preset addition condition, such that the mode to be added cannot be added into the mode list, but is directly discarded.

It is to be understood that, in the present disclosure, since the current block needs to use two intra prediction modes for intra prediction, when the MPM is constructed, the intra prediction modes at more positions may be referred to or the intra prediction modes of more neighbouring blocks may be referred to. Correspondingly, in the present disclosure, the length of the mode list used by the current block may be different from the length of the mode list of other intra prediction modes, because code words of the MPM during binaryzation are shorter than that of other modes, the probability that two intra prediction modes are respectively MPMs is increased, which facilitates the improvement of the coding and decoding efficiency.

Figure 24:
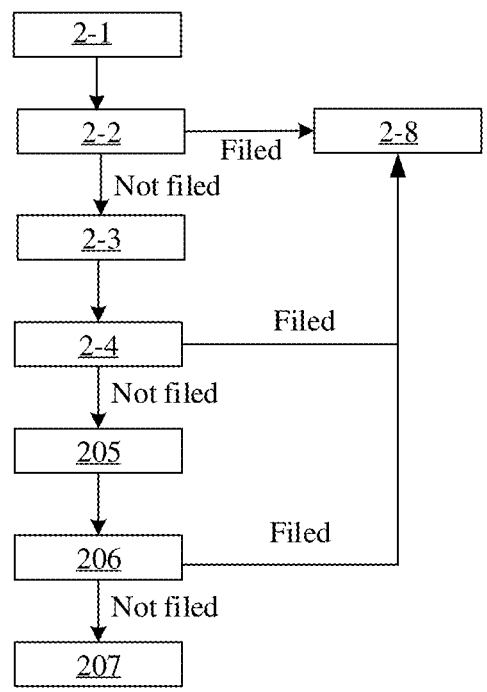
FIG. 24 is a schematic diagram of implementation processes of determining a mode list according to an embodiment of the present disclosure.

Exemplarily, in this embodiment of the present disclosure, assuming that the length of the mode list used by the current block is 4, when using the weight matrix derivation mode to determine the mode list, the encoder may specifically execute the following operations illustrated in FIG. 24.

In 2-1, intra prediction modes of neighbouring blocks are added into the mode list.

In this embodiment of the present disclosure, the encoder may first determine the intra prediction modes corresponding to the neighbouring blocks of the current block, and then successively add the intra prediction modes corresponding to the neighbouring blocks into the mode list.

Figure 14:
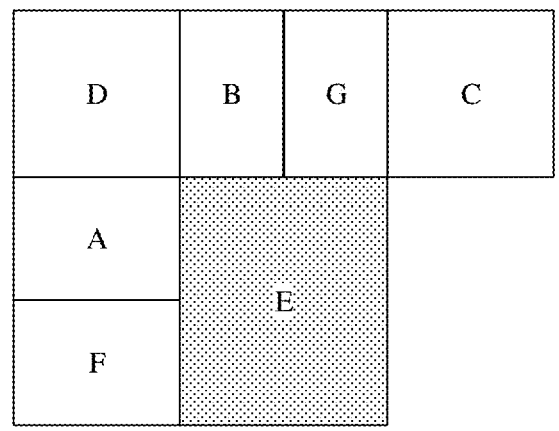
FIG. 14 is a schematic diagram of neighbouring blocks.

FIG. 14 is a schematic diagram of neighbouring blocks. As illustrated in FIG. 14, the current block is E, the encoder may successively fill the intra prediction modes used by the neighbouring blocks F, G, C, A, B and D into the mode list, until the mode list is filled. If some position in F, G, C, A, B and D is not available or the intra prediction mode is not used, the position is skipped.

It is to be understood that, in the present disclosure, if the complexity allows, the intra prediction modes of blocks on the further right side and lower side may be used.

In 2-2, it is determined whether the mode list is filled. If the mode list is not filled, the operation in 2-3 is executed, otherwise the operation in 2-8 is executed.

In 2-3, the related intra prediction mode corresponding to the weight matrix derivation mode is added into the mode list.

In this embodiment of the present disclosure, after the intra prediction modes of the neighbouring blocks are added into the mode list, if the mode list is not filled, that is, the length of the mode list is less than 4, the encoder may continue to fill the intra prediction mode corresponding to the weight matrix derivation mode into the mode list, until the mode list is filled.

It is to be noted that, in the present disclosure, the encoder may select to only add the intra prediction mode corresponding to the weight matrix derivation mode into the mode list, or may select to add the intra prediction mode corresponding to the weight matrix derivation mode and the corresponding related intra prediction mode into the mode list.

In 2-4, it is determined whether the mode list is filled. If the mode list is not filled, the operation in 2-5 is executed, otherwise, the operation in 2-8 is executed.

In 2-5, a preset prediction mode is added into the mode list.

In this embodiment of the present disclosure, after the related intra prediction mode corresponding to the weight matrix derivation mode is added into the mode list, if the mode list is not filled, that is, the length of the mode list is less than 4, the encoder may continue to add the preset prediction mode into the mode list, until the mode list is filled.

The preset prediction mode may include one or more of various different modes such as a DC mode, a Bilinear mode and a Planar mode.

In 2-6, it is determined whether the mode list is filled. If the mode list is not filled, the operation in 2-7 is executed, otherwise, the operation in 2-8 is executed.

In 2-7, associated intra prediction modes corresponding to the mode list are added into the mode list.

In this embodiment of the present disclosure, after the preset prediction mode is added into the mode list, if the mode list is not filled, that is, the length of the mode list is less than 4, the encoder may determine the associated intra prediction modes corresponding to the mode list, and then successively adds the associated intra prediction modes into the mode list.

Specifically, if the mode list is not filled, by means of starting from the first intra prediction mode in the MPM, the intra prediction modes of which index numbers differ by 1, −1, 2, −2, 3 and −3 from that of the intra prediction mode are filled into the MPM, until the mode list is filled. If one of the intra prediction modes with index numbers differing by 1, −1, 2, −2, 3 and −3 from that of the intra prediction mode is illegal, and is less than 0 or greater than the maximum value, then the illegal intra prediction mode is discarded.

In 2-8, the mode list is derived.

It is to be noted that, in this embodiment of the present disclosure, during construction of the mode list, it needs to be guaranteed that each intra prediction mode to be filled (the mode to be added) is different from existing intra prediction modes in the mode list, and then may be filled into the mode list, otherwise, the intra prediction mode is discarded.

That is to say, in the present disclosure, in order to ensure that the first intra prediction mode and the second intra prediction mode of the current block are different, during the construction of the mode list, the encoder must ensure that the intra prediction mode added into the mode list each time is not the same as the existing intra prediction modes in the mode list.

Further, in this embodiment of the present disclosure, when using the weight matrix derivation mode to determine the mode list, the encoder may first determine a list construction strategy corresponding to the weight matrix derivation mode, and then further determine the mode list according to the list construction strategy.

That is to say, in the present disclosure, for different weight matrices, that is, for different weight matrix derivation modes, the encoder may use different construction strategies to construct the mode list. For example, based on the construction strategy, if the boundary line of the weight matrix is 0 degrees or 90 degrees, that is, under a horizontal or vertical situation, the encoder may select to take the intra prediction mode corresponding to the weight matrix into consideration during the construction of the mode list; and for other situations, the intra prediction mode corresponding to the weight matrix is not taken into consideration.

Exemplarily, in the present disclosure, assuming that the boundary line of the weight matrix is 0 degrees, for example, modes (counting from 0) of the AWP such as Mode 2 and Mode 10, when the mode list is constructed, the horizontal intra prediction mode 24 may be added into the candidate of the mode list; and assuming that the boundary line of the weight matrix is 90 degrees, for example, the modes (counting from 0) of the AWP such as Mode 6 and Mode 14, when the mode list is constructed, the vertical intra prediction mode 12 may be added into the candidate of the mode list.

It is to be understood that, in the present disclosure, within a range that the boundary line of the weight matrix is close to 0 degrees, the horizontal intra prediction mode, or the horizontal intra prediction mode and a similar intra prediction mode may be added into the candidates of the mode list; and within a range that the boundary line of the weight matrix is close to 90 degrees, the vertical intra prediction mode, or the horizontal intra prediction mode and the similar intra prediction mode may be added into the candidates of the mode list.

It is to be understood that, in the present disclosure, the two intra prediction modes used by the current block for intra prediction are different, that is, the first intra prediction mode and the second intra prediction mode are different, and the first intra prediction mode may be eliminated when the second intra prediction mode is decoded. That is to say, information of the first intra prediction mode may be used for the decoding of the second intra prediction mode.

In the embodiments of the present disclosure, further, during the construction of the mode list, the encoder may further set a candidate intra prediction mode. The candidate intra prediction mode is different from all intra prediction modes in the mode list.

Specifically, in the present disclosure, in order to ensure that the first intra prediction mode and the second intra prediction mode used by the current block are different, determination of the second intra prediction mode may be dependent on the first intra prediction mode. When determining the first intra prediction mode and the second intra prediction mode based on the mode list, the encoder may first determine one prediction mode in the mode list as the first intra prediction mode, and then determine the second intra prediction mode according to the first intra prediction mode and the mode list.

Further, in the embodiments of the present disclosure, after determining one prediction mode in the mode list as the first intra prediction mode, the encoder may delete the prediction mode from the mode list, and then adds the candidate intra prediction mode to the mode list to obtain an updated mode list. Then, one prediction mode may be selected from the updated mode list and determined as the second intra prediction mode. The selection manner may be arbitrary.

That is to say, in this embodiment of the present disclosure, if the first intra prediction mode selects one MPM, in order to ensure that the first intra prediction mode and the second intra prediction mode used by the current block are different, there is one less MPM available for the second intra prediction mode. In order to not change the length of the mode list available for the first intra prediction mode and the second intra prediction mode, after determining the first intra prediction mode, the encoder may additionally add one MPM, i.e., adding a preset candidate intra prediction mode into the mode list, such that the MPMs of the same number as the first intra prediction mode may still be used when the second intra prediction mode is determined.

Exemplarily, in the present disclosure, assuming that there are N MPMs available for the first intra prediction mode and the second intra prediction mode, when the mode list is constructed, N MPMs and one candidate MPM may be first constructed, and the MPMs available for the first intra prediction mode are the N MPMs. If the first intra prediction mode selects one of the MPMs, for the second intra prediction mode, the MPM selected by the first intra prediction mode is eliminated, and then the candidate MPM is added into the mode list, such that the second intra prediction mode may still select from N MPMs.

In the embodiments of the present disclosure, further, during the construction of the mode list, the encoder may further set a length parameter of the mode list to be (N+1), where N is a positive integer.

Specifically, in the present disclosure, in order to ensure that the first intra prediction mode and the second intra prediction mode used by the current block are different, the determination of the second intra prediction mode may be dependent on the first intra prediction mode. When the encoder determines the first intra prediction mode and the second intra prediction mode based on the mode list, if the mode list is used to determine the first intra prediction mode, one of the first N prediction modes in the mode list may be determined as the first intra prediction mode, and then the second intra prediction mode is determined according to the first intra prediction mode and the mode list.

Further, in the embodiments of the present disclosure, if the mode list is used to determine the first intra prediction mode, after determining one of the first N prediction modes in the mode list as the first intra prediction mode, the encoder determines the second intra prediction mode by using other N prediction modes in the mode list other than the first intra prediction mode.

It is to be noted that, in this embodiment of the present disclosure, when the encoder determines the first intra prediction mode and the second intra prediction mode based on the mode list, if the mode list is not used to determine the first intra prediction mode, the encoder may directly determine one of the first N prediction modes in the mode list as the second intra prediction mode.

That is to say, in this embodiment of the present disclosure, assuming that there are N MPMs available for the intra prediction modes, in order to ensure that the first intra prediction mode and the second intra prediction mode used by the current block are different, during the construction of the mode list, (N+1) MPMs may be constructed. The MPMs available for the first intra prediction mode are the first N MPMs in the mode list. If the first intra prediction mode does not select an MPM, the MPMs available for the second intra prediction mode are the first N MPMs in the mode list. If the first intra prediction mode selects an MPM, the MPMs available for the second intra prediction mode are N MPMs in the mode list other than the first intra prediction mode.

Exemplarily, in the present disclosure, assuming that N is 4, the encoder may construct a mode list including 5 MPMs. MPM[x] represents the (x+1)th MPM, that is, MPM[0] represents the first MPM, which is due to the fact that the count of an array starts from 0. The first intra prediction mode is mode0, and the second intra prediction mode is mode1. Assuming that the first intra prediction mode and the second intra prediction mode are both the MPMs, an index number of the first intra prediction mode in the optional MPMs is idx0, and an index number of the second intra prediction mode in the optional MPMs is idx1, then,

--- mode0=MPM[idx0]
mode1=MPM[idx1<idx0?idx1:idx1+1]
That is to say, if idx1<idx0, mode1=MPM[idx1];
otherwise, mode1=MPM[idx1+1].

---

It can be seen that, the values of idx0 and idx1 range from 0 to 3; and the value of mode1 is related to both idx1 and idx0.

In one embodiment of the present disclosure, if it only ensures that the first intra prediction mode and the second intra prediction mode used by the current block are different, but the number of the MPMs that may be selected for the first intra prediction mode and the second intra prediction mode is not limited, the encoder may also not set the candidate intra prediction modes, or not increase the length of the mode list. In this case, the encoder needs to change the coding method for the second intra prediction mode. That is to say, if the first intra prediction mode selects one MPM in the mode list, there is one less MPM available for the second intra prediction mode; and in this case, since there are fewer MPMs available for the second intra prediction mode, the coding method for the second intra prediction mode needs to be changed.

Exemplarily, in the present disclosure, for example, the number N of the MPMs is 4, the first bit is used to indicate whether it is an MPM. For example, "1" indicates that it is an MPM, and "0" indicates that it is not an MPM. If the first intra prediction mode is an MPM, since there are 4 MPMs, 2 bits are used to indicate which MPM it is, that is, "00, 01, 10 and 11" respectively represent the first MPM, the second MPM, the third MPM and the fourth MPM. If the first intra prediction mode and the second intra prediction mode both are MPMs, there are only 3 MPMs available for the second intra prediction mode, and 1-2 bits may be used to indicate which MPM it is, for example, "00, 01 and 10" respectively represent the remaining first MPM, second MPM and third MPM. It can be seen that, since one possibility is excluded, the coding method or binaryzation method may be changed to save overheads.

Exemplarily, in the present disclosure, assuming that N is 4, the mode list including 4 MPMs is constructed. MPM[x] represents the (x+1)th MPM, that is, MPM[0] represents the first MPM, which is due to the fact that the count of an array starts from 0. The first intra prediction mode is mode0, and the second intra prediction mode is mode1. Assuming that the first intra prediction mode and the second intra prediction mode are both MPMs, an index number of the first intra prediction mode in the optional MPMs is idx0, and an index number of the second intra prediction mode in the optional MPMs is idx1, then:

```
mode0=MPM[idx0]
mode1=MPM[idx1<idx0?idx1:idx1+1]
That is to say, if idx1<idx0, mode1=MPM[idx1];
otherwise, mode1=MPM[idx1+1].
```

It can be seen that, the value of idx0 ranges from 0 to 3; the value of idx1 ranges from 0 to 2; and the value of mode1 is related to both idx1 and idx0. idx0 may use 2 bits for binaryzation, and idx1 uses 1-2 bits for binaryzation.

In the embodiments of the present disclosure, further, when determining the first intra prediction mode and the second intra prediction mode of the current block according to the weight matrix derivation mode, the encoder may also sort the intra prediction modes corresponding to the neighbouring blocks of the current block, the related intra prediction mode corresponding to the weight matrix derivation mode, and the preset prediction mode, so as to obtain a candidate list of prediction modes. The preset prediction mode includes one or more of various prediction modes such as a DC mode, a Bilinear mode and a Planar mode. Then, the encoder may determine the first intra prediction mode and the second intra prediction mode according to the candidate list of prediction modes.

Specifically, in this embodiment of the present disclosure, when the first intra prediction mode and the second intra prediction mode are determined by using the correlation with the weight matrix, the intra prediction mode corresponding to the weight matrix derivation mode or several intra prediction modes related to the intra prediction mode corresponding to the weight matrix derivation mode during binaryzation may be assigned shorter code words than a common intra prediction mode, or code words that are shorter than possibly longest code words in the intra prediction mode. That is to say, the code words of the intra prediction mode(s) are not the longest. Therefore, it can be considered that the intra prediction mode corresponding to the weight matrix derivation mode or several intra prediction modes related to the intra prediction mode corresponding to the weight matrix derivation mode have a higher probability of being selected than the other modes.

That is to say, in this embodiment of the present disclosure, the first intra prediction mode and the second intra prediction mode may also not use the MPMs. The encoder may sort all intra prediction modes that may be used by the first intra prediction mode and the second intra prediction mode, so as to generate the candidate list of prediction modes, and further, variable-length coding is used for binaryzation, shorter code words are allocated to the top-ranked intra prediction modes in the candidate list of prediction modes, and longer code words are allocated to the low-ranked intra prediction modes in the candidate list of prediction modes. During sorting, the intra prediction modes of the neighbouring blocks of the current block may be referred to, or the weight matrix derivation mode of the current block may also be referred to.

Figure 25:
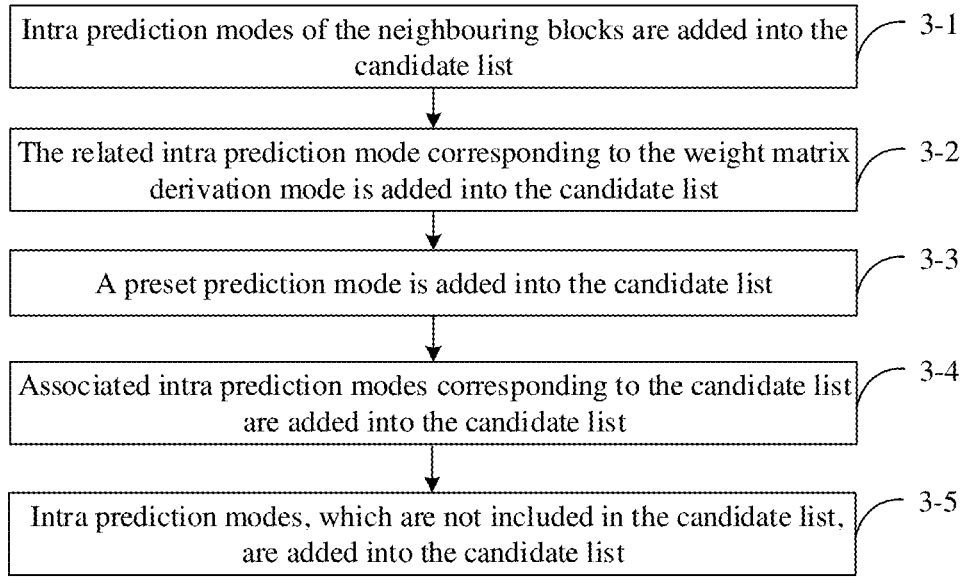
FIG. 25 is a schematic diagram of implementation processes of determining a first intra prediction mode and a second intra prediction mode of a current block according to an embodiment of the present disclosure.

Exemplarily, in the embodiments of the present disclosure, the method for the encoder to determine the first intra prediction mode and the second intra prediction mode of the current block according to the weight matrix derivation mode may include the following operations illustrated in FIG. 25.

In 3-1, the intra prediction modes of the neighbouring blocks are added into the candidate list.

In this embodiment of the present disclosure, the encoder may first determine the intra prediction modes corresponding to the neighbouring blocks of the current block, then sort the intra prediction modes corresponding to the neighbouring blocks, and successively add the intra prediction modes into the candidate list after sorting.

The current block is E, the encoder may successively fill, into the candidate list, the intra prediction modes used by the neighbouring blocks F, G, C, A, B and D according to an order of F, G, C, A, B and D. If a position in F, G, C, A, B and D is not available or the intra prediction mode is not used, the position is skipped.

It is to be understood that, in the present disclosure, if the complexity allows, the intra prediction modes of blocks on the further right side and lower side may be used.

In 3-2, the related intra prediction mode corresponding to the weight matrix derivation mode is added into the candidate list.

In this embodiment of the present disclosure, after the intra prediction modes of the neighbouring blocks are added into the candidate list, the encoder may continue to fill the intra prediction mode corresponding to the weight matrix derivation mode into the candidate list.

It is to be noted that, in the present disclosure, the encoder may select to only add the intra prediction mode corresponding to the weight matrix derivation mode into the candidate list, or may select to add the intra prediction mode corresponding to the weight matrix derivation mode and the corresponding related intra prediction mode into the candidate list.

In 3-3, a preset prediction mode is added into the candidate list.

In this embodiment of the present disclosure, after the related intra prediction mode corresponding to the weight matrix derivation mode is added into the candidate list, the encoder may continue to add the preset prediction mode into the candidate list.

The preset prediction mode may include one or more of various different modes such as a DC mode, a Bilinear mode and a Planar mode.

In 3-4, associated intra prediction modes corresponding to the candidate list are added into the candidate list.

In this embodiment of the present disclosure, after the preset prediction mode is added into the candidate list, the encoder may determine the associated intra prediction modes corresponding to the candidate list, and then successively adds the associated intra prediction modes into the candidate list.

Specifically, by starting from the first intra prediction mode in the candidate list, the encoder may fill the intra prediction modes of which index numbers differ by 1, −1, 2, −2, 3 and −3 from that of the intra prediction mode into the candidate list. If one of the intra prediction modes with index numbers differing by 1, −1, 2, −2, 3 and −3 from that of the intra prediction mode is illegal, and is less than 0 or greater than the maximum value, then the illegal intra prediction mode is discarded.

In 3-5, intra prediction modes, which are not included in the candidate list, are added into the candidate list.

In this embodiment of the present disclosure, starting from the index 0 of the prediction mode, the encoder may also add intra prediction modes without being sorted into the candidate list, until the end.

It can be seen that, due to different angles and positions of the boundary line of the weight matrices, the intra prediction modes have different probabilities, and the first intra prediction mode and the second intra prediction mode have different probabilities. For example, in examples of the above figure, the first intra prediction mode (corresponding to a white block) has a higher probability of an angular mode from upper right to lower left than an angular mode from upper left to lower right, and the second intra prediction mode (corresponding to a black block) does not have a higher probability of an angular mode from upper right to lower left than an angular mode from upper left to lower right. Therefore, the first intra prediction mode and the second intra prediction mode for each weight matrix derivation mode may be respectively sorted according to respective probability characteristics.

Further, in this embodiment of the present disclosure, when determining the first intra prediction mode and the second intra prediction mode of the current block according to the weight matrix derivation mode, the encoder may also establish a reference set of first intra prediction modes corresponding to the weight matrix derivation mode, simultaneously establish a reference set of second intra prediction modes corresponding to the weight matrix derivation mode, and then determine the first intra prediction mode based on the reference set of first intra prediction modes, and determine the second intra prediction mode based on the reference set of second intra prediction modes.

That is to say, in the embodiments of the present disclosure, for the weight matrix derivation mode of the current block, the encoder may sort all possible intra prediction modes, corresponding to the weight matrix derivation mode, of the first intra prediction mode, so as to generate the reference set of first intra prediction modes, and at the same time, may also sort all possible intra prediction modes, corresponding to the weight matrix derivation mode, of the second intra prediction mode, so as to generate the reference set of second intra prediction modes. Therefore, the first intra prediction mode may be determined from the reference set of first intra prediction modes, and the first intra prediction mode may be determined from the reference set of second intra prediction modes.

Exemplarily, in the present disclosure, the encoder may preset a mapping table to determine a mapping between each weight matrix derivation mode and the first intra prediction mode and the second intra prediction mode. As illustrated in Table 2, for one weight matrix derivation mode, sorting of all possible intra prediction modes of the first intra prediction mode corresponding to the weight matrix derivation mode, and sorting of all possible intra prediction modes of the second intra prediction mode corresponding to the weight matrix derivation mode may be determined by means of Table 2.

TABLE 2

| Weight derivation mode | Intra prediction mode | Sorting |
| --- | --- | --- |
| 0 | 0 (first intra prediction mode) | ... |
|  | 1 (second intra prediction mode) | ... |
| 1 | 0 (first intra prediction mode) | ... |
|  | 1 (second intra prediction mode) | ... |
| 2 | 0 (first intra prediction mode) | ... |
|  | 1 (second intra prediction mode) | ... |
| ... | ... | ... |

Further, in this embodiment of the present disclosure, in order to reduce the complexity, the encoder may narrow down a lookup table as Table 2 above by means of clustering, for example, may classify the weight matrix derivation modes to determine types corresponding to the weight matrix derivation modes. One type of the weight matrix derivation modes corresponds to the same sorting of all possible intra prediction modes of the first intra prediction mode, and also corresponds to the same sorting of all possible intra prediction modes of the second intra prediction mode.

Further, in this embodiment of the present disclosure, in order to reduce the complexity, the encoder may narrow down a lookup table as Table 2 above by means of clustering, for example, may classify the intra prediction modes to determine types corresponding to the intra prediction modes. For example, non-angular modes such as DC, Planar and Bilinear modes belong to one type. Angular modes may be classified according to the range of some radians, for example, every 45-degree, that is, a ¼ circle, belong to one type, or every 22.5-degree, that is, a ⅛ circle, belong to one type. Specifically, the angular modes may also be partitioned into several unequal intervals.

Figure 15:
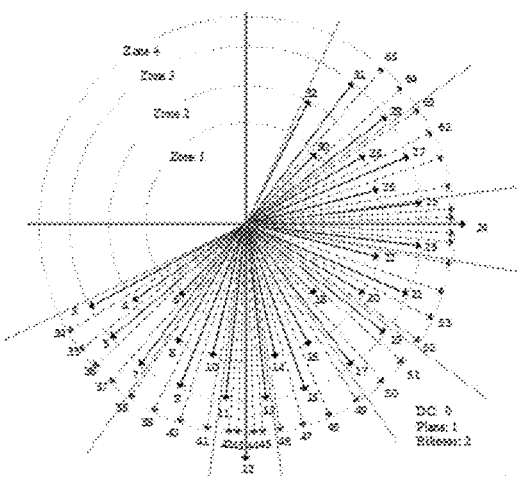
FIG. 15 is a schematic clustering diagram.

FIG. 15 is a schematic clustering diagram. As illustrated in FIG. 15, all angular modes may be partitioned into 9 areas. The sorting within each area may be made according to the order of mode numbers or from the center of the area to both sides.

It is to be understood that, in the present disclosure, the angles of the angular modes in the AVS3 are not consecutive. The previous Modes 3-32 cover a large radian range, but are relatively sparse, and the following Modes 34-65 are relatively finer, and thus during classification, the modes before and after Mode 33 may be classified into different categories by means of the characteristic.

In this embodiment of the present disclosure, further, since the intra prediction method provided in the present disclosure needs to use two different intra prediction modes and one weight matrix derivation mode to determine the predicted value of the current block, in order to reduce the overheads, in the present disclosure, the encoder may reduce the number of bits by limiting the two intra prediction modes of the current block, and at the same time, the encoder may also reduce the number of bits by limiting the weight matrix derivation mode of the current block.

Exemplarily, in the present disclosure, since the first 33 prediction modes in the AVS3 have nearly covered an overall angle range, good performance may be guaranteed by only using the first 33 prediction modes in the AVS3, and during coding, it only needs to adjust to not use an EIPM. Further, the encoder may further compress and limit the number of intra prediction modes possibly used by the current block, so as to finally achieve that coding is performed by only using 5 bits, such that the overheads are further reduced, thereby achieving better performance.

In one example of the present disclosure, the encoder may reduce the overheads for coding the two intra prediction modes by decreasing the number of the intra prediction modes possibly used by the current block. For example, in the AVS3, if 66 intra prediction modes are used, a maximum of 7 bits is needed to code one intra prediction mode; and if only 33 intra prediction modes are used and a PCM is not used, a maximum of 6 bits is needed to code one intra prediction mode.

Further, in the present disclosure, considering that the intra prediction mode generally includes a non-angular prediction mode such as a DC mode, a Planar mode or a Bilinear mode, and an angular prediction mode. During implementation, each non-angular mode uses one set of logic, all angular modes use one set of logic, or the angular modes use several sets of logic, there may be some circuits that may be multiplexed between different logics and some circuits that may not be multiplexed. Therefore, for limiting the number of the intra prediction modes possibly used by the current block, it may be limited to only select angular prediction modes or only select non-angular prediction modes.

Description is made below by taking limitation of the intra prediction modes possibly used by the second intra prediction mode as an example. It is to be noted that, corresponding limitation may also be applied to the limitation of the first intra prediction mode.

Manner I: the second intra prediction mode may only use one intra prediction mode specified in the non-angular prediction modes.

For example, the second intra prediction mode may only use a DC mode, or the second intra prediction mode may only use a Bilinear mode, or the like. Since the second intra prediction mode only has one possible selection, when the blocks in the present disclosure are used for coding and decoding, the second intra prediction mode may be derived by default to predict the current block, without determining the second intra prediction mode; the second intra prediction mode does not need to be written into the bitstream during coding; and what the second intra prediction mode is does not need to be parsed from the bitstream during decoding.

Manner II: the second intra prediction mode may only use the non-angular mode, or some of the non-angular modes.

For example, the second intra prediction mode may only use the DC and Bilinear modes. Since the second intra prediction mode only has 2 possible selections, intra_luma_pred_mode1 of 1 bit may be used to indicate whether the second intra prediction mode is the DC mode or the Bilinear mode. During coding, only two possibilities of DC and Bilinear modes need to be tried for the second intra prediction mode. After it is determined which intra prediction mode the second intra prediction mode is, intra_luma_pred_mode1 may be determined. During decoding of corresponding blocks, only intra_luma_pred_mode1 of 1 bit needs to be parsed for the second intra prediction mode, so as to determine whether it is the DC mode or the Bilinear mode.

In other embodiments, the second intra prediction mode may only use the non-angular mode, that is, the second intra prediction mode only has 3 possible selections, and then intra_luma_pred_mode1 of 2 bits may be used to indicate which intra prediction mode the second intra prediction mode is.

Manner III: the second intra prediction mode may only use all or part of the angular prediction modes.

Since the intra prediction modes that the second intra prediction mode may select are reduced, the number of bits of intra_luma_pred_mode1 for representing the second intra prediction mode in the bitstream is also decreased. For example, in the AVS3, the second intra prediction mode may only use all of the angular modes. There are 3 non-angular modes in the AVS3, which are DC, Plane and Bilinear modes. That is to say, in the AVS3, the second intra prediction mode may only use the modes other than 0, 1 and 2.

In a specific embodiment, the second intra prediction mode may use all the intra prediction modes other than the non-angular prediction modes (that is, the second intra prediction mode may use all the angular prediction modes).

In a specific embodiment, the second intra prediction mode may use part of all angular prediction modes. The part of the angular prediction modes may be the first 33 angular prediction modes; alternatively, the part of the angular prediction modes may be selected from 33 angular prediction modes or 65 angular prediction modes according to a preset interval. For example, the preset interval may be 1, 2 or another positive integer.

As described in Table 3, an example of an intra prediction mode of a luma prediction block is provided. A mode number IntraLumaPredMode corresponds to the corresponding intra prediction mode. 0 represents a DC mode; 1 represents a Plane mode; 2 represents a Bilinear mode; 12 represents a vertical mode; 24 represents a horizontal mode; 33 represents a PCM mode; and the remaining are the angular modes other than horizontal and vertical modes. Angles represented by specific mode numbers may refer to FIG. 7.

TABLE 3

Intra prediction mode of luma prediction block

| IntraLumaPredMode | Intra prediction mode |
| --- | --- |
| 0 | Intra_Luma_DC |
| 1 | Intra_Luma_Plane |
| 2 | Intra_Luma_Bilinear |
| 3-11 | Intra_Luma_Angular |
| 12 | Intra_Luma_Vertical |
| 13-23 | Intra_Luma_Angular |
| 24 | Intra_Luma_Horizontal |
| 25-32 | Intra_Luma_Angular |
| 33 | Intra_Luma_PCM |
| 34-65 | Intra_Luma_Angular |

Taking that the second intra prediction mode may only use the modes other than 0, 1 and 2 as an example, a construction process of the MPM list available for the second intra prediction mode is provided.

For example, each intra prediction mode may use 4 MPMs. Then, the mode list with the length of 8 may be constructed; and the number of the non-angular prediction modes should be less than or equal to 3 since there are only 3 non-angular prediction modes in the AVS3. The first 4 MPMs are available for the first intra prediction mode to select. The second intra prediction mode may select the first 4 MPMs of the non-angular modes in the MPM list other than the first intra prediction mode.

Figure 16:
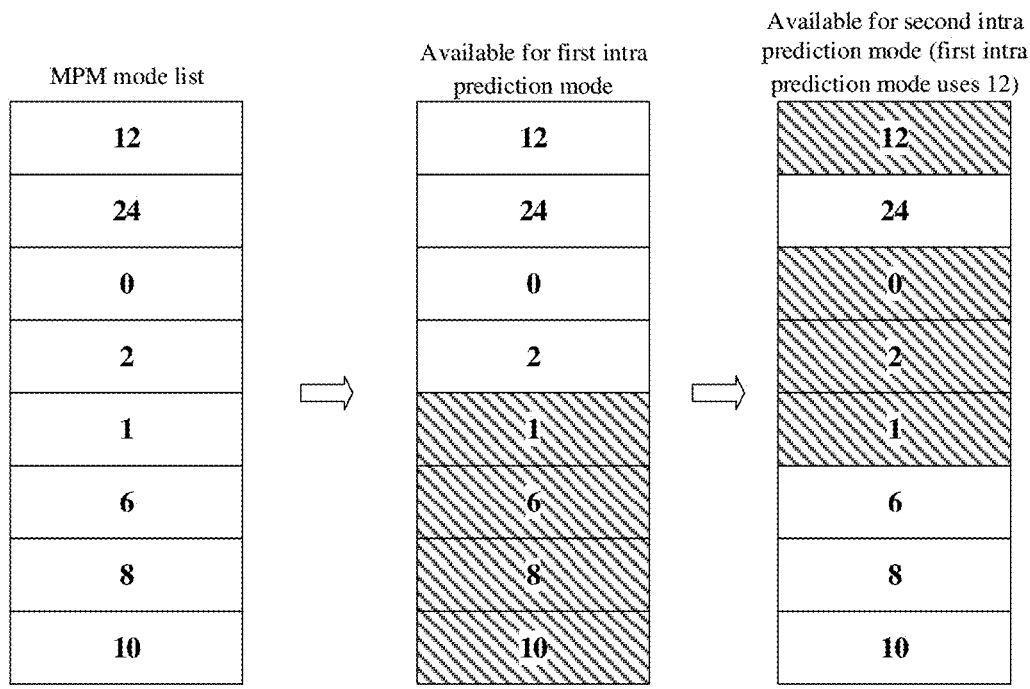
FIG. 16 is a schematic diagram of selection of an intra prediction mode.

FIG. 16 is used as an example for description. Assuming that the constructed MPM list is illustrated in FIG. 16, the first intra prediction mode may select one of the first 4 MPMs. Assuming that the first intra prediction mode uses 12, that is, the first MPM in the MPM list, the MPMs available for the second intra prediction mode are checked from front to back, the first MPM (12) has been used by the first intra prediction mode, such that the first MPM is not available. The second MPM (24) is not used and is an available angular mode, such that the second MPM is available; and although the MPMs corresponding to the third (0), the fourth (2) and the fifth (1) are not used, the MPMs are non-angular modes, such that the MPMs are not available. The sixth (6), seventh (8) and eighth (10) MPMs are used and available angular modes, such that the MPMs are available; and therefore, 24, 6, 8 and 10 respectively correspond to the modes with the MPM indexes of 0, 1, 2 and 3 in the second intra prediction mode.

Taking blocks illustrated in FIG. 14 as an example, an example of constructing the MPM list is provided.

The list length of the first part of the MPM mode list is set to 8.

The current block is E, the intra prediction modes used by F, G, C, A, B and D are successively filled in the MPM mode list, until the MPM mode list is filled. If some position in F, G, C, A, B and D is not available or does not use the intra prediction mode, the position is skipped. In the present disclosure, in addition to using the intra prediction modes corresponding to the blocks illustrated in FIG. 14, the intra prediction modes corresponding to other blocks may also be used. For example, the intra prediction modes corresponding to the blocks on the right side or lower side of the current block are used.

Further, if the MPM mode list is not filled, the intra prediction modes corresponding to the weight matrix derivation modes are filled into the MPM mode list, until the MPM mode list is filled.

If the MPM mode list is not filled, the DC mode and the Bilinear mode are successively filled into the MPM mode list, until the MPM mode list is filled.

If the MPM mode list is not filled, by means of starting from the first intra prediction mode in the MPM mode list, intra prediction modes differing by 1, −1, 2, −2, 3 and −3 from the intra prediction mode are filled into the MPM mode list, until the MPM mode list is filled. If one of the intra prediction modes differing by 1, −1, 2, −2, 3 and −3 from the intra prediction mode is illegal, and is less than 0 or greater than the maximum value or is the PCM, then the intra prediction mode is discarded.

If the mode number of the first intra prediction mode in the MPM mode list is greater than the mode number of the second intra prediction mode, the two MPMs are swapped.

In an operation of filling the MPM mode list, each intra prediction mode to be filled may be filled into the MPM list only if the intra prediction mode to be filled is different from all existing intra prediction modes in the MPM mode list, otherwise, the intra prediction mode is discarded.

In the processes of limiting the intra prediction modes available for the second intra prediction mode, if the derived or determined second intra prediction mode is an illegal mode, the second intra prediction mode needs to be modified according to a preset correspondence to a legal mode. Specifically, when the second intra prediction mode is limited to be an angular prediction mode, if the obtained second intra prediction modes are Mode 0, Mode 1 and Mode 2, the second intra prediction modes need to correspond to one or several available angular modes according to the preset correspondence, so as to avoid illegal modes (that is, limiting unavailable non-angular prediction modes). For example, the second intra prediction mode is decoded to obtain Mode 0, and then the second intra prediction mode is set to Mode 12 (i.e., the vertical mode) according to the preset correspondence. If the second intra prediction mode is decoded to obtain Mode 1, the second intra prediction mode is set to Mode 18 (i.e., the mode at 45 degrees towards the bottom right) according to the preset correspondence. If the second intra prediction mode is decoded to obtain Mode 2, the second intra prediction mode is set to Mode 24 (i.e., the horizontal mode) according to the preset correspondence.

It is to be noted that, in the embodiments of the present disclosure, when limiting the number of the intra prediction modes, the encoder may directly limit the number of intra prediction modes of all prediction blocks, and may also refer to a dimension parameter of the current block, so as to use different limitation manners for the current blocks with different dimensions.

Exemplarily, in the present disclosure, with regard to a prediction block with a larger dimension parameter, for example, the prediction block of 64×64 or 32×32, the encoder may use all the intra prediction modes to determine the two intra prediction modes of the current block. With regard to a prediction block with a smaller dimension parameter, for example, the prediction block of 8×8, the encoder may use part of the intra prediction modes to determine the two intra prediction modes of the current block. That is to say, the number of the intra prediction modes possibly used by the current block is limited. This is because, with regard to the prediction block with a small dimension parameter, the impact caused by small angular differences is not obvious.

It is to be understood that, in the present disclosure, a dimension threshold may be preset, for example, a second dimension threshold. If the dimension parameter of the current block is less than the second dimension threshold, it may be considered that the small angular differences do not have a large impact. Therefore, the number of the intra prediction modes that can be selected by the current block may be limited. Specifically, by limiting the index numbers of the two intra prediction modes of the current block, the number of the intra prediction modes may be limited.

Exemplarily, in the present disclosure, if the dimension parameter of the current block is less than the second dimension threshold, the encoder may determine the first intra prediction mode and the second intra prediction mode according to a second mode index range. The second mode index range is used for limiting the index numbers of the intra prediction modes. Specifically, the second mode index range may include a second lower limit threshold and a second upper limit threshold. The encoder may first determine the first index number of the first intra prediction mode, and may simultaneously determine the second index number of the second intra prediction mode. Then, the first index number and the second index number are set to be both greater than the second lower limit threshold, and set to be both less than the second upper limit threshold.

That is to say, in the present disclosure, the index number of the first intra prediction mode and the index number of the second intra prediction mode of the current block may be limited by means of the second mode index range, so as to complete the limitation of the number of the intra prediction modes.

For example, in the AVS3, the second mode index range may be 0-32, that is, the index number of the first intra prediction mode and the index number of the second intra prediction mode may be limited within 0-32 by means of the second mode index range, such that the current block may use the first 33 prediction modes to determine the first intra prediction mode and the second intra prediction mode.

It is to be understood that, in the present disclosure, the first dimension threshold may be the same as or different from the second dimension threshold, and the first mode index range may be the same as or different from the second mode index range.

Further, if the intra prediction modes that may be selected by the first intra prediction mode and the second intra prediction mode are not limited, the two determined intra prediction modes have corresponding prediction capabilities, and the corresponding weight matrices do not need to be processed. However, after the intra prediction modes available for selection are limited, the prediction capabilities of the two intra prediction modes are changed, and the corresponding weight matrices also need to be adjusted.

Specifically, in the AWP weight matrices illustrated in FIG. 2, a white area at a lower right corner in the weight matrix 0 (numbered 0) is completely derived from the first intra prediction mode, a black part at an upper left corner is completely derived from the second intra prediction mode, and a gray part is obtained by weighting the two intra prediction modes. If the DC mode is required to perform prediction at the upper left corner, and the horizontal mode is required to perform prediction at the lower right corner, the first intra prediction mode may be set as the horizontal mode, and the second intra prediction mode may be set as the DC mode. On the contrary, if the horizontal mode is required to perform prediction at the upper left corner, and the DC mode is required to perform prediction at the lower right corner, the first intra prediction mode may be set as the DC mode, and the second intra prediction mode may be set as the horizontal mode. However, if one of the intra prediction modes is limited, for example, the second intra prediction mode may only use the angular mode, according to the existing method, for the AWP weight matrix 0, the DC mode cannot be used for prediction at the upper left corner because the second intra prediction mode cannot use the DC mode. If one of the intra prediction modes is limited, for example, the second intra prediction mode may only use the DC mode, according to the existing method, the black part in the AWP weight matrix can only be obtained by means of prediction using the DC mode. That is to say, the limitation on the second intra prediction mode significantly affects the effect of prediction.

Therefore, in the present disclosure, in some cases, the weight matrices need to be adjusted, that is, the weight matrix corresponding to the first intra prediction mode is swapped with the weight matrix corresponding to the second intra prediction mode.

Manner I: a weight matrix swap flag is increased, and the flag indicates whether to swap the weight matrices of the two prediction blocks.

Manner II: it is determined according to the weight matrices whether to swap the weights of the two prediction blocks.

Specifically, when the intra prediction modes that may be selected by the first intra prediction mode are not limited, there are more intra prediction modes that may be selected by the first intra prediction mode, and the first intra prediction mode has a high prediction capability. Since the intra prediction modes that may be selected by the second intra prediction mode are limited, there are few selections available for the second intra prediction mode, and the second intra prediction mode has a low prediction capability. In this way, the weights may be automatically allocated according to the weight matrices. According to the allocation results, in the final prediction block, there are more points affected by the first intra prediction mode, and there are fewer points affected by the second intra prediction mode.

Manner III: it is determined according to the mode number of the first intra prediction mode and/or the mode number of the second intra prediction mode whether to swap the weights of the two prediction blocks.

Since there is a certain difference between prediction angles logically used by adjacent angular prediction modes, due to the impact of interpolation filtering and the sizes of the blocks, especially in smaller blocks, the difference between the prediction blocks made by the adjacent angular prediction modes is not particularly large. Therefore, the logic of whether to swap the weights of the two prediction blocks is set in the mode numbers of the intra prediction modes. For example, a certain intra prediction mode (the first intra prediction mode or the second intra prediction mode) uses the angular prediction mode with an even number to indicate that the weights of the two prediction blocks are not swapped, and uses the angular prediction mode with an odd number to indicate that the weights of the two prediction blocks are swapped.

In another embodiment, if the second intra prediction mode can only use a certain non-angular mode or several non-angular modes, for example, the second intra prediction mode can only use the DC mode, it may be determined according to the parity of the mode number of the first intra prediction mode whether to swap the weights of the two prediction blocks. If the mode number of the first intra prediction mode is an even number, the weights of the two prediction blocks are not swapped, otherwise (the mode number of the first intra prediction mode being an odd number), the weights of the two prediction blocks are swapped.

In one example of the present disclosure, the encoder may reduce the overheads for coding the weight matrix derivation mode by decreasing the number of the weight matrix derivation modes that may be used by the current block. For example, in the AVS3, if 56 weight matrix derivation modes are used, a maximum of 6 bits is needed to code one weight matrix derivation mode; and if only 32 weight matrix derivation modes are used, a maximum of 5 bits is needed to code one weight matrix derivation mode. Further, the encoder may further compress and limit the number of weight matrix derivation modes that may be used by the current block (so as to identify with fewer flags which weight matrix or weight matrix derivation mode is selected), for example, only 16 weight matrix derivation modes are used, so as to finally achieve the fact that coding is performed by only using 4 bits, such that the overheads are further reduced, thereby achieving better performance. It is to be noted that, in this embodiment of the present disclosure, when limiting the number of the weight matrix derivation modes, the encoder may directly limit the number of weight matrix derivation modes of all prediction blocks, and may also refer to the dimension parameter of the current block, so as to use different limitation manners for the current blocks with different dimensions.

Exemplarily, in the present disclosure, with regard to a prediction block with a larger dimension parameter, for example, a prediction block of 64×64 or 32×32, the encoder may use all the weight matrix derivation modes to determine the weight matrix derivation mode of the current block. With regard to a prediction block with a smaller dimension parameter, for example, a prediction block of 8×8, the encoder may use part of the weight matrix derivation modes to determine the weight matrix derivation mode of the current block. That is to say, the number of the weight matrix derivation modes that may be used by the current block is limited. This is because, with regard to the prediction block with the smaller dimension parameter, the impact caused by small angular differences is not obvious.

It is to be understood that, in the present disclosure, a dimension threshold may be first set, for example, a first dimension threshold. If the dimension parameter of the current block is less than the first dimension threshold, it may be considered that the small angular differences do not have a large impact, and thus the number of the weight matrix derivation modes that can be selected by the current block may be limited. Specifically, by means of limiting the index number of the weight matrix derivation mode of the current block, the number of the weight matrix derivation modes may be limited.

Exemplarily, in the present disclosure, if the dimension parameter of the current block is less than the first dimension threshold, the encoder may determine the weight matrix derivation mode according to the first mode index range. The first mode index range is used for limiting the index number of the weight matrix derivation mode. Specifically, the first mode index range may include a first lower limit threshold and a first upper limit threshold. The encoder may separately compare the index number of the weight matrix derivation mode with the first lower limit threshold and the first upper limit threshold. If the index number of the weight matrix derivation mode is less than the first lower limit threshold, the index number of the weight matrix derivation mode may be set as the first lower limit threshold. If the index number of the weight matrix derivation mode is greater than the first upper limit threshold, the index number of the weight matrix derivation mode may be set as the first upper limit threshold.

That is to say, in the present disclosure, the index number of the weight matrix derivation mode of the current block may be limited by means of the first mode index range, so as to complete the limitation of the number of the weight matrix derivation modes.

For example, in the AVS3, the first mode index range may be 0-32, that is, the index number of the weight matrix derivation mode may be limited within 0-32 by means of the first mode index range. Therefore, the current block may use the first 33 weight matrix derivation modes to determine the weight matrix derivation mode of the current block.

Example 1

The weight matrices available for the AWP include the weight matrices corresponding to No. 0-55. Details are illustrated in FIG. 2. In the present disclosure, only 32 weight matrices are used in SAWP, that is, the weight matrices that may be used by the SAWP correspond to 0-7, 16-23, 32-39 and 48-55 weight matrices of the AWP (weight matrices corresponding to the corresponding numbers in FIG. 2). That is, the weight matrices 0-7 of the SAWP correspond to the weight matrices 0-7 of the AWP; the weight matrices 8-15 of the SAWP correspond to the weight matrices 16-23 of the AWP; the weight matrices 16-23 of the SAWP correspond to the weight matrices 32-39 of the AWP; and the weight matrices 24-31 of the SAWP correspond to the weight matrices 48-55 of the AWP. Assuming that the 32 weight matrices have equal probabilities, a flag sawp_idx of 5 bits is required.

In a specific embodiment, a relationship between the value of sawp_idx and a binary symbol string is illustrated in Table 4.

TABLE 4

| Value of sawp_idx | Binary symbol string | | | | |
|---|---|---|---|---|---|
| 0 | 0 | 0 | 0 | 0 | 0 |
| 1 | 1 | 0 | 0 | 0 | 0 |
| 2 | 0 | 1 | 0 | 0 | 0 |
| 3 | 1 | 1 | 0 | 0 | 0 |
| 4 | 0 | 0 | 1 | 0 | 0 |
| ... | ... | ... | ... | ... | ... |
| 28 | 0 | 0 | 1 | 1 | 1 |
| 29 | 1 | 0 | 1 | 1 | 1 |
| 30 | 0 | 1 | 1 | 1 | 1 |
| 31 | 1 | 1 | 1 | 1 | 1 |
| binIdx | 0 | 1 | 2 | 3 | 4 |

Example 2: in this example, only 24 weight matrices are used in the SAWP, and the weight matrices that may be used by the SAWP correspond to 8-15, 24-31 and 40-47 weight matrices of the AWP as illustrated in FIG. 2. That is, the weight matrices 0-7 of the SAWP correspond to the weight matrices 8-15 of the AWP, the weight matrices 8-15 of the SAWP correspond to the weight matrices 24-31 of the AWP, and the weight matrices 16-23 of the SAWP correspond to the weight matrices 40-47 of the AWP, a flag sawp_idx of 4-5 bits is required.

A relationship between the value of sawp_idx and a binary symbol string is illustrated in Table 5.

TABLE 5

| Value of sawp_idx | Binary symbol string | | | | |
|---|---|---|---|---|---|
| 0 | 1 | 0 | 0 | 0 | 0 |
| 1 | 1 | 0 | 0 | 0 | 1 |
| 2 | 1 | 0 | 0 | 1 | 0 |
| 3 | 1 | 0 | 0 | 1 | 1 |
| 4 | 1 | 0 | 1 | 0 | 0 |
| 5 | 1 | 0 | 1 | 0 | 1 |
| 6 | 1 | 0 | 1 | 1 | 0 |
| 7 | 1 | 0 | 1 | 1 | 1 |
| 8 | 0 | 0 | 0 | 0 | — |
| 9 | 0 | 0 | 0 | 1 | — |
| 10 | 0 | 0 | 1 | 0 | — |
| 11 | 0 | 0 | 1 | 1 | — |
| 12 | 0 | 1 | 0 | 0 | — |
| 13 | 0 | 1 | 0 | 1 | — |
| 14 | 0 | 1 | 1 | 0 | — |
| 15 | 0 | 1 | 1 | 1 | — |
| 16 | 1 | 1 | 0 | 0 | 0 |
| 17 | 1 | 1 | 0 | 0 | 1 |
| 18 | 1 | 1 | 0 | 1 | 0 |
| 19 | 1 | 1 | 0 | 1 | 1 |
| 20 | 1 | 1 | 1 | 0 | 0 |
| 21 | 1 | 1 | 1 | 0 | 1 |
| 22 | 1 | 1 | 1 | 1 | 0 |
| 23 | 1 | 1 | 1 | 1 | 1 |
| binIdx | 0 | 1 | 2 | 3 | 4 |

Further, since No. 10 and No. 14 in the 24 weight matrices of the SAWP respectively correspond to No. 26 and No. 30 in the 56 weight matrices of the AWP, which are similar to the horizontal and vertical modes in the binary tree partitioning (BT), the probability of actual selection is low, and longer binary symbol strings may be allocated to the weight matrices, and shorter binary symbol strings are allocated to the weight matrices with higher selection probability.

In an example, binary symbol strings of No. 2 and No. 10 in the 24 weight matrices of the SAWP are swapped, and the binary symbol strings of No. 6 and No. 14 are swapped, as illustrated in Table 6 below.

TABLE 6

| Value of sawp_idx | Binary symbol string | | | | |
|---|---|---|---|---|---|
| 0 | 1 | 0 | 0 | 0 | 0 |
| 1 | 1 | 0 | 0 | 0 | 1 |
| 2 | 0 | 0 | 1 | 0 | — |
| 3 | 1 | 0 | 0 | 1 | 1 |
| 4 | 1 | 0 | 1 | 0 | 0 |
| 5 | 1 | 0 | 1 | 0 | 1 |
| 6 | 0 | 1 | 1 | 0 | — |
| 7 | 1 | 0 | 1 | 1 | 1 |
| 8 | 0 | 0 | 0 | 0 | — |
| 9 | 0 | 0 | 0 | 1 | — |
| 10 | 1 | 0 | 0 | 1 | 0 |
| 11 | 0 | 0 | 1 | 1 | — |
| 12 | 0 | 1 | 0 | 0 | — |
| 13 | 0 | 1 | 0 | 1 | — |

TABLE 6-continued

| Value of sawp_idx | Binary symbol string | | | | |
|---|---|---|---|---|---|
| 14 | 1 | 0 | 1 | 1 | 0 |
| 15 | 0 | 1 | 1 | 1 | — |
| 16 | 1 | 1 | 0 | 0 | 0 |
| 17 | 1 | 1 | 0 | 0 | 1 |
| 18 | 1 | 1 | 0 | 1 | 0 |
| 19 | 1 | 1 | 0 | 1 | 1 |
| 20 | 1 | 1 | 1 | 0 | 0 |
| 21 | 1 | 1 | 1 | 0 | 1 |
| 22 | 1 | 1 | 1 | 1 | 0 |
| 23 | 1 | 1 | 1 | 1 | 1 |
| binIdx | 0 | 1 | 2 | 3 | 4 |

In 1103, the predicted value of the current block is determined based on the first intra prediction mode, the second intra prediction mode and the weight matrix.

In this embodiment of the present disclosure, after determining the first intra prediction mode and the second intra prediction mode of the current block according to the weight matrix derivation mode, and simultaneously determining the weight matrix of the current block according to the weight matrix derivation mode, the encoder may further determine the predicted value of the current block based on the first intra prediction mode, the second intra prediction mode and the weight matrix.

It is to be understood that, in this embodiment of the present disclosure, when determining the predicted value of the current block based on the first intra prediction mode, the second intra prediction mode and the weight matrix, the encoder may first determine a first predicted value of the current block according to the first intra prediction mode, simultaneously determine a second predicted value of the current block according to the second intra prediction mode, then perform weighted average calculation on the first predicted value and the second predicted value by using the weight matrix, and finally obtain the predicted value of the current block.

Further, in this embodiment of the present disclosure, after determining the predicted value of the current block, the encoder may also perform a difference operation on a real value and the predicted value of the current block to obtain a difference result between the real value and the predicted value, thereby determining a predicted difference of the current block, i.e., a residual.

That is to say, in the present disclosure, the encoder may calculate the difference between the real value and an intra predicted value of the current block, so as to obtain the residual; and the residual is subjected to transform, quantization and entropy coding and written into the bitstream, and is transmitted to a decoding side.

Figure 26:
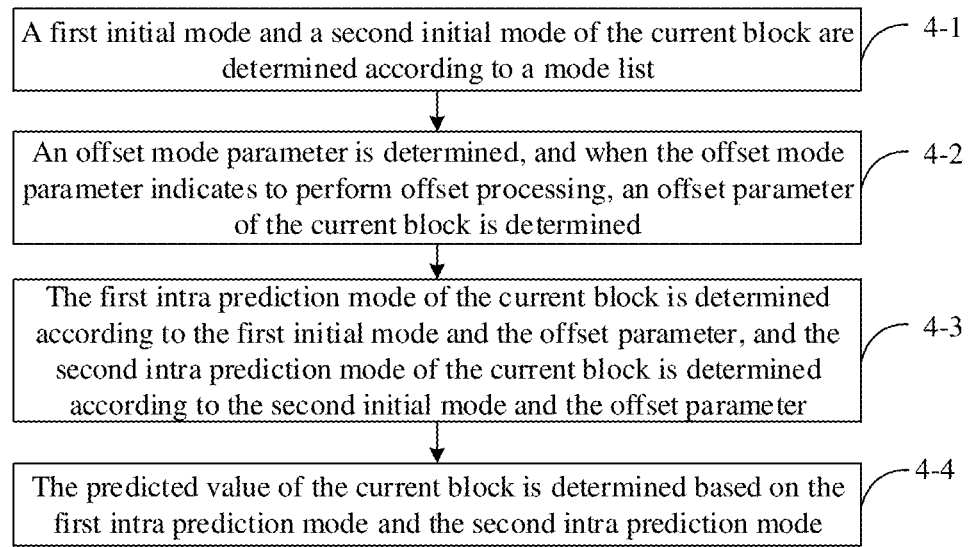
FIG. 26 is a schematic diagram of implementation processes of a coding method according to an embodiment of the present disclosure.

In an embodiment of the present disclosure, further, if the intra prediction mode parameter indicates that the current block uses the SAWP mode to determine the intra predicted value of the current block, the coding method performed by the encoder may include the following operations illustrated in FIG. 26.

In 4-1, a first initial mode and a second initial mode of the current block are determined according to a mode list.

In this embodiment of the present disclosure, after the encoder determines the intra prediction mode parameter of the current block, if the intra prediction mode parameter indicates that the current block uses the SAWP mode to determine the intra predicted value of the current block, the encoder may further determine the mode list (MPM list) used by the current block. Then, the first initial mode and the second initial mode of the current block are determined according to the mode list.

It is to be noted that, in the present disclosure, the mode list is used for determining intra prediction modes used by the current block. Specifically, the encoder may construct the mode list by using several intra prediction modes with high probabilities of use, so as to determine the two intra prediction modes of the current block based on the mode list.

It is to be understood that, in this embodiment of the present disclosure, when determining the mode list, the encoder may use a common manner of constructing the MPM, such as constructing the MPM by using prediction modes of the neighbouring blocks, or the like. Alternatively, the method for constructing a mode list involved in the intra prediction method provided in the present disclosure may also be used, that is, the weight matrix derivation mode of the current block is used to construct the mode list.

That is to say, in the present disclosure, the method for constructing a mode list may select to use the mode list construction method provided in the operation in 1102 in the above embodiment, and may also use other MPM construction method, which is not specifically limited in the present disclosure.

Further, in this embodiment of the present disclosure, after determining the mode list used by the current block, the encoder may first determine the first initial mode and the second initial mode of the current block according to the mode list.

Exemplarily, in the present disclosure, the encoder constructs a mode list including N MPMs. If N is $2^n$, n bits (mpm_idx) may be used to indicate which MPM in the mode list is selected, that is, determining the first initial mode and the second initial mode, and then another bit is used to indicate whether offset is needed (offset_needed). For example, the mode list including 4 MPMs is constructed, when the intra prediction modes are selected in the mode list, 2 bits (mpm_idx) need to be used to indicate which MPM in the mode list is selected as an initial mode. The correspondence between the value of mpm_idx and a binary symbol string illustrated in FIG. 7 may be used for determining the prediction modes.

TABLE 7

| mpm_idx | Binary symbol string |
|---|---|
| 0 | 00 |
| 1 | 01 |
| 2 | 10 |
| 3 | 11 |

In 4-2, an offset mode parameter is determined, and when the offset mode parameter indicates to perform offset processing, an offset parameter of the current block is determined.

In this embodiment of the present disclosure, the encoder may further determine the offset mode parameter. The offset mode parameter is used for determining whether to perform offset. Specifically, when the offset mode parameter indicates to perform offset processing, the encoder may further determine the offset parameter of the current block.

It is to be noted that, in this embodiment of the present disclosure, the encoder may use one bit to indicate whether to perform offset (offset_needed). That is to say, the encoder may further determine, by setting the offset mode parameter, whether the prediction mode (the first initial mode or the second initial mode) of the current block needs to be offset.

Further, in this embodiment of the present disclosure, if the offset mode parameter indicates to perform offset processing, the encoder may further determine the offset parameter of the current block. The offset parameter may include an offset manner and an offset amount. By means of determining the offset parameter, the encoder may determine whether to perform offset processing on the first initial mode or the second initial mode of the current block.

It is to be noted that, in this embodiment of the present disclosure, the encoder may also use coding bits to indicate the offset manner and the offset amount in the offset parameter. For example, the encoder may use one bit (sign) to indicate whether an offset manner is "+" or "−", and may also use some bits (offset) to indicate the offset amount.

In one example of the present disclosure, the encoder may set the offset manner and the offset amount in advance. For example, the encoder may only offset a certain amount by default, for example, 1, or 2, or 4.

In 4-3, the first intra prediction mode of the current block is determined according to the first initial mode and the offset parameter, and the second intra prediction mode of the current block is determined according to the second initial mode and the offset parameter.

In this embodiment of the present disclosure, after determining the offset parameter of the current block, the encoder may determine the first intra prediction mode of the current block according to the first initial mode and the offset parameter, and simultaneously determine the second intra prediction mode of the current block according to the second initial mode and the offset parameter.

Further, in this embodiment of the present disclosure, when determining the first intra prediction mode and the second intra prediction mode of the current block according to the mode list and the offset parameter, the encoder may perform offset processing on the first initial mode according to the offset manner and the offset amount, so as to determine the first intra prediction mode, and may simultaneously perform offset processing on the second initial mode according to the offset manner and the offset amount, so as to determine the second intra prediction mode.

That is to say, in this embodiment of the present disclosure, the encoder may first use several bits to determine which prediction mode in the mode list is used. That is, the initial mode is first determined from the mode list, then the offset processing is performed on the initial mode according to the offset parameter, and finally the intra prediction mode used by the current block may be determined.

It is to be understood that, in the embodiments of the present disclosure, the encoder may use the same offset parameter for the first initial mode and the second initial mode. That is, offset processing is performed on the first initial mode and the second initial mode according to the same offset manner and offset amount. Correspondingly, the encoder may also use different offset parameters for the first initial mode and the second initial mode. That is, offset processing is performed based on the first initial mode in one offset manner, and at the same time, offset processing is performed based on the second initial mode in the other offset manner. The offset manners and offset amounts corresponding to the two offset manners may be not exactly identical.

That is to say, in the present disclosure, the offset manner and offset amount corresponding to the offset processing on the first initial mode may be the same as or different from the offset manner and offset amount corresponding to the offset processing on the second initial mode.

In one example of the present disclosure, the offset mode parameter corresponding to the first initial mode may also be different from the offset mode parameter corresponding to the second initial mode. That is, by respectively setting the offset mode parameters for the first initial mode and the second initial mode, the encoder achieves several different processing modes as follows: performing offset processing on both the first initial mode and the second initial mode; or not performing offset processing on the first initial mode and the second initial mode; or performing offset processing on the first initial mode, and not performing offset processing on the second initial mode simultaneously; or not performing offset processing on the first initial mode, and performing offset processing on the second initial mode simultaneously.

Further, in this embodiment of the present disclosure, if the offset mode parameter indicates not to perform offset processing, the encoder may directly determine the first intra prediction mode and the second intra prediction mode according to the mode list. That is, the encoder may directly use several bits to determine which prediction mode in the mode list is used.

In 4-4, the predicted value of the current block is determined based on the first intra prediction mode and the second intra prediction mode.

In this embodiment of the present disclosure, after determining the first intra prediction mode and the second intra prediction mode of the current block according to the mode list and the offset parameter, the encoder may determine the predicted value of the current block based on the first intra prediction mode and the second intra prediction mode.

It is to be noted that, in this embodiment of the present disclosure, when determining the predicted value of the current block, the encoder may first determine a first predicted value of the current block according to the first intra prediction mode, simultaneously determine a second predicted value of the current block according to the second intra prediction mode, then perform weighted average calculation on the first predicted value and the second predicted value by using the weight matrix of the current block, and finally obtain the predicted value of the current block.

Further, in this embodiment of the present disclosure, after determining the predicted value of the current block, the encoder may also perform a difference operation on a real value and predicted value of the current block to obtain a difference result between the real value and the predicted value, thereby determining a predicted difference of the current block, i.e., a residual.

That is to say, in the present disclosure, the encoder may calculate the difference between the real value and an intra predicted value of the current block, so as to obtain the residual; and the residual is subjected to transform, quantization and entropy coding and written into the bitstream, and is transmitted to a decoding side.

In the embodiments of the present disclosure, further, by means of the intra prediction method illustrated in the operations in 4-1 to 4-4, the encoder may first select a prediction mode from the mode list, then determine based on the prediction mode whether offset is needed, and if so, further determine the offset manner and the offset amount. The offset amount may be understood as an offset mode index number.

It is to be noted that, in the embodiments of the present disclosure, the method for determining the prediction mode of the current block after performing offset processing on the mode list may not only be applied to the SAWP mode in the embodiments of the present disclosure, but also be applied to other intra prediction mode, and may also be applied to any inter prediction mode. The present disclosure is not specifically limited thereto. In addition, 1 bit (offset_needed) may also be used to indicate whether offset is needed. For example, if the value of the offset mode parameter offset_needed is set to 0, it can be considered that offset processing is not performed; and if the value of the offset mode parameter offset_needed is set to 1, it can be considered that offset processing is performed.

Exemplarily, in the present disclosure, 4 MPMs are required to be constructed, and 2 bits may be used to determine which prediction mode is selected, and 1 bit is used to determine whether offset processing is performed. If the selected intra prediction mode is one of the MPMs, 2 bits (mpm_idx) are needed to indicate which MPM it is, and 1 bit (offset_needed) indicates that no offset is needed, with a total of 3 bits.

Further, in this embodiment of the present disclosure, if the offset mode parameter indicates to perform offset processing, the offset parameter may further be determined. The offset parameter may include an offset manner of one bit (sign), and may further include an offset amount of some bits (offset).

That is to say, in the present disclosure, if offset is needed, one bit (sign) may be used to indicate whether the offset manner is "+" or "−". Further, the method for setting the offset amount can only offset a certain amount by default, for example, 1 or 2 or 4, or may use some overheads to indicate the offset amount. For example, assuming that there are two available offset amounts, for example, 2 and 4, one bit may be used to indicate whether the offset amount is 2 or 4. Assuming that there are a plurality of available offset amounts, some bits (offset) may be used to indicate the offset amounts, and the correspondence between a value of offset and a binary symbol string illustrated in FIG. 8 may be applied to determine the offset amounts.

TABLE 8

| offset | Binary symbol string |
|---|---|
| 1 | 0 |
| 2 | 10 |
| 4 | 110 |
| 8 | 1110 |

Figure 17:
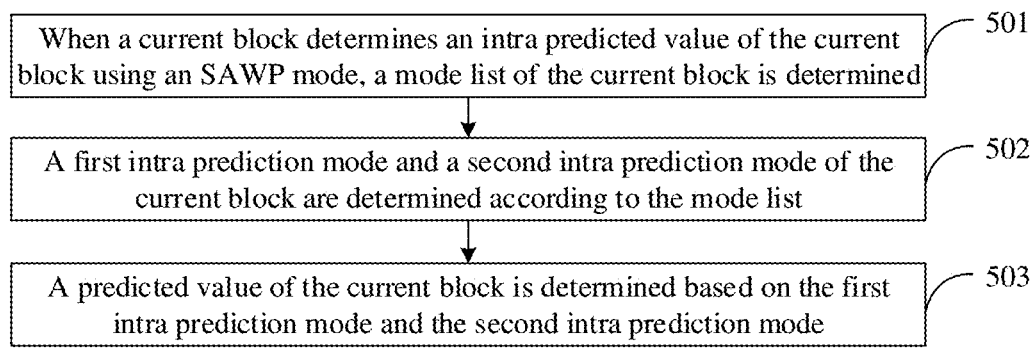
FIG. 17 is a second schematic diagram of implementation processes of an intra prediction method.

Based on the above embodiments, another embodiment of the present disclosure provides an intra prediction method, which is applied to an encoder. FIG. 17 is a second schematic diagram of implementation processes of an intra prediction method. As illustrated in FIG. 17, the method for intra prediction performed by the encoder may include the following operations.

In 501, when a current block determines an intra predicted value of the current block by using an SAWP mode, a mode list of the current block is determined.

In this embodiment of the present disclosure, after determining that the current block determines the intra predicted value of the current block by using the SAWP mode, the encoder may first determine the mode list of the current block.

It is to be noted that, in this embodiment of the present disclosure, the SAWP mode is an intra prediction method. Specifically, the SAWP mode is to determine two different intra prediction modes for the current block; then two prediction blocks are respectively determined according to the two different intra prediction modes; next, a weight matrix may be determined, and the two prediction blocks are combined according to the weight matrix; and finally, a new prediction block may be obtained, i.e., the prediction block of the current block is obtained.

In one example of the present disclosure, the decoder may first determine a dimension parameter of the current block, and then determine according to the dimension parameter whether the current block uses the SAWP mode. Specifically, if the width is greater than a first threshold and the height is greater than a second threshold, it is determined that the current block uses the SAWP mode; or if the width is less than a third threshold and the height is greater than a fourth threshold, it is determined that the current block uses the SAWP mode.

In one example of the present disclosure, the decoder may first determine a pixel parameter of the current block, and then determine, according to the pixel parameter and a fifth threshold, whether the current block uses the SAWP mode.

In one example of the present disclosure, the decoder may first determine an intra prediction mode parameter of the current block, and then determine according to the intra prediction mode parameter whether the current block uses the SAWP mode.

It is to be noted that, in the present disclosure, a weight matrix derivation mode is used for determining the weight matrix used by the current block. Specifically, the weight matrix derivation mode may be a mode for deriving the weight matrix. For a prediction block with a given length and width, each weight matrix derivation mode may derive one weight matrix; and for the prediction blocks with the same size, the weight matrices derived by different weight matrix derivation modes are different.

Exemplarily, in the present disclosure, the AWP in the AVS3 has 56 weight matrix derivation modes, and the GPM in the VVC has 64 weight matrix derivation modes.

Further, in this embodiment of the present disclosure, when using the weight matrix derivation mode to determine the mode list, the encoder may first determine intra prediction modes corresponding to neighbouring blocks of the current block, and then determine the intra prediction modes corresponding to the neighbouring blocks as modes to be added. After determining that the modes to be added meet a preset addition condition, the encoder may add the modes to be added into the mode list, that is, adding the intra prediction modes corresponding to the neighbouring blocks of the current block into the mode list; next, if the mode list does not meet a preset list length, the encoder may continue to determine the weight matrix derivation mode of the current block, determine a related intra prediction mode corresponding to the weight matrix derivation mode, and then determine the related intra prediction mode corresponding to the weight matrix derivation mode as a mode to be added; and when it is determined that the mode to be added meets the preset addition condition, the mode to be added is added into the mode list, that is, the related intra prediction mode corresponding to the weight matrix derivation mode is added into the mode list.

It is to be noted that, in this embodiment of the present disclosure, after the encoder adds the intra prediction modes corresponding to the neighbouring blocks of the current block into the mode list, or the encoder adds the related intra prediction mode corresponding to the weight matrix derivation mode into the mode list, if the mode list does not meet the preset list length, that is, the mode list is not filled, the encoder may continue to determine a preset prediction mode as a mode to be added, and then adds the mode to be added into the mode list after determining that the mode to be added meets the preset addition condition, that is, adding the preset prediction mode into the mode list.

It is to be understood that, in the present disclosure, the preset prediction mode may include one or more of various different modes such as a DC mode, a Bilinear mode and a Planar mode.

Further, in this embodiment of the present disclosure, after the encoder separately adds the intra prediction modes corresponding to the neighbouring blocks of the current block, the related intra prediction mode corresponding to the weight matrix derivation mode, and the preset prediction mode into the mode list, if the mode list still does not meet the preset list length, that is, the mode list is still not filled, the encoder may select a prediction mode in the mode list to determine an associated intra prediction mode, then determines the associated intra prediction mode as a mode to be added, and adds the mode to be added into the mode list after determining that the mode to be added meets the preset addition condition, that is, adding the associated intra prediction mode corresponding to the mode list into the mode list.

That is to say, in the present disclosure, after the intra prediction modes corresponding to the neighbouring blocks of the current block, the related intra prediction mode corresponding to the weight matrix derivation mode, and the preset prediction mode are successively added into the mode list, if the mode list is still not filled, the encoder may select an existing prediction mode in the mode list to determine the corresponding associated intra prediction modes, and then adds these associated intra prediction modes into the mode list.

It is to be noted that, in the embodiments of the present disclosure, either using an intra prediction mode corresponding to a neighbouring block of the current block as the mode to be added, or using the related intra prediction mode corresponding to the weight matrix derivation mode as the mode to be added, or using the preset prediction mode as the mode to be added, or using the associated intra prediction mode as the mode to be added, the encoder needs to determine whether the mode to be added meets the preset addition condition. Specifically, if the mode to be added exists and is different from all prediction modes in the mode list, it may be determined that the mode to be added meets the preset addition condition, such that the mode to be added may be added into the mode list.

Correspondingly, if the mode to be added does not exist, or the mode to be added is the same as (coincides with) the a prediction mode in the mode list, it may be determined that the mode to be added does not meet the preset addition condition, and the mode to be added cannot be added into the mode list, but is directly discarded.

It is to be understood that, in the present disclosure, since the current block needs to use two intra prediction modes for intra prediction, when the MPM is constructed, the intra prediction modes at more positions may be referred to or the intra prediction modes of more neighbouring blocks may be referred to. Correspondingly, in the present disclosure, the length of the mode list used by the current block may be different from the length of the mode list of other intra prediction modes, because code words during binaryzation of the MPM are shorter than that of other modes, the probability that two intra prediction modes are both MPMs is increased, which facilitates the improvement of the coding and decoding efficiency.

Further, in this embodiment of the present disclosure, when using the weight matrix derivation mode to determine the mode list, the encoder may first determine a list construction strategy corresponding to the weight matrix derivation mode, and then further determine the mode list according to the list construction strategy.

That is to say, in the present disclosure, for different weight matrices, that is, for different weight matrix derivation modes, the encoder may use different construction strategies to construct the mode list. For example, based on the construction strategy, if the boundary line of the weight matrix is 0 degrees or 90 degrees, that is, under a horizontal or vertical situation, the encoder may select to take the intra prediction mode corresponding to the weight matrix into consideration during the construction of the mode list, and does not take the intra prediction mode corresponding to the weight matrix into consideration under other situations.

In 502, a first intra prediction mode and a second intra prediction mode of the current block are determined according to the mode list.

In this embodiment of the present disclosure, after constructing the mode list of the current block, the encoder may determine the first intra prediction mode and the second intra prediction mode of the current block according to the mode list.

It is to be understood that, in the present disclosure, the two intra prediction modes used by the current block for intra prediction are different, that is, the first intra prediction mode and the second intra prediction mode are different, and the possibility of the first intra prediction mode may be eliminated when the second intra prediction mode is decoded. That is to say, information of the first intra prediction mode may be used for the decoding of the second intra prediction mode.

In this embodiment of the present disclosure, further, during the construction of the mode list, the encoder may set a candidate intra prediction mode. The candidate intra prediction mode is different from all intra prediction modes in the mode list.

Specifically, in the present disclosure, in order to ensure that the first intra prediction mode and the second intra prediction mode used by the current block are different, the determination of the second intra prediction mode may be dependent on the first intra prediction mode. When determining the first intra prediction mode and the second intra prediction mode based on the mode list, the encoder may first determine one prediction mode in the mode list as the first intra prediction mode, and then determine the second intra prediction mode according to the first intra prediction mode and the mode list.

Further, in this embodiment of the present disclosure, after determining one prediction mode in the mode list as the first intra prediction mode, the encoder may delete the prediction mode from the mode list, and then adds the candidate intra prediction mode to the mode list to obtain an updated mode list. Then, one prediction mode may be selected from the updated mode list and determined as the second intra prediction mode. The selection manner may be arbitrary.

Exemplarily, in the present disclosure, assuming that there are N MPMs available for the first intra prediction mode and the second intra prediction mode, when the mode list is constructed, N MPMs and one candidate MPM may be first constructed, and the MPMs available for the first intra prediction mode are the N MPMs. If the first intra prediction mode selects one of the MPMs, for the second intra prediction mode, the MPM selected by the first intra prediction mode is eliminated, and then the candidate MPM is added into the mode list, such that the second intra prediction mode may still select from N MPMs.

In this embodiment of the present disclosure, further, during the construction of the mode list, the encoder may set a length parameter of the mode list to (N+1). N is a positive integer.

Specifically, in the present disclosure, in order to ensure that the first intra prediction mode and the second intra prediction mode used by the current block are different, the determination of the second intra prediction mode may be dependent on the first intra prediction mode. When the encoder determines the first intra prediction mode and the second intra prediction mode based on the mode list, if the mode list is used to determine the first intra prediction mode, one of the first N prediction modes in the mode list may be determined as the first intra prediction mode, and then the second intra prediction mode is determined according to the first intra prediction mode and the mode list.

Further, in this embodiment of the present disclosure, if the mode list is used to determine the first intra prediction mode, after determining one of the first N prediction modes in the mode list as the first intra prediction mode, the encoder determines the second intra prediction mode by means of other N prediction modes in the mode list other than the first intra prediction mode.

It is to be noted that, in the embodiments of the present disclosure, when the encoder determines the first intra prediction mode and the second intra prediction mode based on the mode list, if the mode list is not used to determine the first intra prediction mode, the encoder may directly determine one of the first N prediction modes in the mode list as the second intra prediction mode.

In one embodiment of the present disclosure, if it only ensures that the first intra prediction mode and the second intra prediction mode used by the current block are different, but the number of the MPMs that may be selected for the first intra prediction mode and the second intra prediction mode is not limited, the encoder may also not set the candidate intra prediction modes, or not increase the length of the mode list. In this case, the encoder needs to change the coding method for the second intra prediction mode. That is to say, if the first intra prediction mode selects one MPM in the mode list, there is one less MPM available for the second intra prediction mode; and in this case, since there are fewer MPMs available for the second intra prediction mode, the coding method for the second intra prediction mode needs to be changed.

Exemplarily, in the present disclosure, for example, the number N of the MPMs is 4, the first bit is used to indicate whether it is an MPM. For example, "1" indicates that it is an MPM, and "0" indicates that it is not an MPM. If the first intra prediction mode is an MPM, since there are 4 MPMs, 2 bits are used to indicate which MPM it is, that is, "00, 01, 10 and 11" respectively represent the first MPM, the second MPM, the third MPM and the fourth MPM. If the first intra prediction mode and the second intra prediction mode both are the MPMs, there are only 3 MPMs available for the second intra prediction mode, and 1-2 bits may be used to indicate which MPM it is, for example, "00, 01 and 10" respectively represent the remaining first MPM, second MPM and third MPM. It can be seen that, since one possibility is excluded, the coding method or binaryzation method may be changed to save overheads.

In 503, the predicted value of the current block is determined based on the first intra prediction mode and the second intra prediction mode.

In this embodiment of the present disclosure, after determining the first intra prediction mode and the second intra prediction mode of the current block according to the mode list, the encoder may further determine the predicted value of the current block based on the first intra prediction mode and the second intra prediction mode.

It is to be understood that, in this embodiment of the present disclosure, when determining the predicted value of the current block based on the first intra prediction mode and the second intra prediction mode, the encoder may first determine a first predicted value of the current block according to the first intra prediction mode, simultaneously determine a second predicted value of the current block according to the second intra prediction mode, then perform weighted average calculation on the first predicted value and the second predicted value, and finally obtain the predicted value of the current block. For example, the encoder may perform weighted average calculation on the first predicted value and the second predicted value by using the weight matrix, so as to obtain the predicted value of the current block.

Further, in this embodiment of the present disclosure, after determining the predicted value of the current block, the encoder may also perform difference operation on a real value and predicted value of the current block to obtain a difference result between the real value and the predicted value, thereby determining a predicted difference of the current block, i.e., a residual.

That is to say, in the present disclosure, the encoder may calculate the difference between the real value and an intra predicted value of the current block, so as to obtain the residual; and the residual is subjected to transform, quantization and entropy coding and written into the bitstream, and is transmitted to a decoding side.

In the intra prediction methods provided in the embodiments of the present disclosure, the encoder and the decoder may determine two different prediction blocks of the current block by means of two different intra prediction modes, and finally obtain a more complex prediction block by combining the prediction blocks using various weight matrices, such that the accuracy of prediction is improved. In addition, the encoder and the decoder may also construct an MPM list by means of a correlation between the weight matrices and the prediction modes, such that the complexity can be greatly reduced. That is to say, by means of the intra prediction methods provided in the present disclosure, the complexity can be reduced while the quality of intra prediction is improved, thereby improving compression performance.

In this embodiment of the present disclosure, further, after determining the mode list of the current block, the encoder may first determine a first initial mode and a second initial mode of the current block according to the mode list, then determine an offset mode parameter, and when the offset mode parameter indicates to perform offset processing, determine the offset parameter of the current block; next, the encoder may determine the first intra prediction mode of the current block according to the first initial mode and the offset parameter, and determine the second intra prediction mode of the current block according to the second initial mode and the offset parameter; and finally, the encoder may determine the predicted value of the current block based on the first intra prediction mode and the second intra prediction mode.

It is to be understood that, in this embodiment of the present disclosure, when determining the mode list, the encoder may use a common manner of constructing the MPM. For example, the prediction modes of the neighbouring blocks are used to construct the MPM. Alternatively, a method for constructing a mode list involved in the intra prediction method provided in the present disclosure may also be used, that is, the mode list is constructed by using the weight matrix derivation mode of the current block.

That is to say, in the present disclosure, the method for constructing a mode list may select to use the mode list construction method described in the above embodiments, and may also use other MPM construction method, which is not specifically limited in the present disclosure.

Further, in this embodiment of the present disclosure, after determining the mode list used by the current block, the encoder may first determine the first initial mode and the second initial mode of the current block according to the mode list.

Exemplarily, in the present disclosure, the encoder constructs a mode list including N MPMs. If N is $2^n$, n bits (mpm_idx) may be used to indicate which MPM in the mode list is selected, that is, determining the first initial mode and the second initial mode, and then another bit is used to indicate whether offset is needed (offset_needed). For example, the mode list including 4 MPMs is constructed, when the intra prediction modes are selected in the mode list, 2 bits (mpm_idx) need to be used to indicate which MPM in the mode list is selected as an initial mode. The correspondence between the value of mpm_idx and a binary symbol string illustrated in Table 3 may be used for determining the prediction modes.

It is to be noted that, in this embodiment of the present disclosure, the encoder may use one bit to indicate whether offset needs to be performed (offset_needed). That is to say, the encoder may further determine, by setting the offset mode parameter, whether the prediction mode (the first initial mode or the second initial mode) of the current block needs to be offset.

Further, in this embodiment of the present disclosure, if the offset mode parameter indicates to perform offset processing, the encoder may further determine the offset parameter of the current block. The offset parameter may include an offset manner and an offset amount. By means of determining the offset parameter, the encoder may determine whether to perform offset processing on the first initial mode or the second initial mode of the current block.

It is to be noted that, in this embodiment of the present disclosure, the encoder may also use coding bits to indicate the offset manner and the offset amount in the offset parameter. For example, the encoder may use one bit (sign) to indicate whether an offset manner is "+" or "−", or may use some bits (offset) to indicate the offset amount.

In one example of the present disclosure, the encoder may set the offset manner and the offset amount in advance. For example, the encoder can only offset a certain amount by default, for example, 1 or 2 or 4.

Further, in this embodiment of the present disclosure, when determining the first intra prediction mode and the second intra prediction mode of the current block according to the mode list and the offset parameter, the encoder may perform offset processing on the first initial mode according to the offset manner and the offset amount, so as to determine the first intra prediction mode, and may simultaneously perform offset processing on the second initial mode according to the offset manner and the offset amount, so as to determine the second intra prediction mode.

That is to say, in this embodiment of the present disclosure, the encoder may first use several bits to determine which prediction mode in the mode list is used. That is, the initial mode is first determined from the mode list, then offset processing is performed on the initial mode according to the offset parameter, and finally the intra prediction mode used by the current block may be determined.

It is to be understood that, in the embodiments of the present disclosure, the encoder may use the same offset parameter for the first initial mode and the second initial mode. That is, based on the first initial mode and the second initial mode, offset processing is performed according to the same offset manner and offset amount. Correspondingly, the encoder may also use different offset parameters for the first initial mode and the second initial mode. That is, offset processing is performed based on the first initial mode in one offset manner, and at the same time, offset processing is performed based on the second initial mode in the other offset manner. The offset manners and offset amounts corresponding to the two offset manners may be not exactly identical.

That is to say, in the present disclosure, the offset manner and the offset amount corresponding to offset processing on the first initial mode may be the same as or different from the offset manner and the offset amount corresponding to offset processing on the second initial mode.

In one example of the present disclosure, the offset mode parameter corresponding to the first initial mode may also be different from the offset mode parameter corresponding to the second initial mode. That is, by respectively setting offset mode parameters for the first initial mode and the second initial mode, the encoder achieves several different processing modes as follows: performing offset processing on both the first initial mode and the second initial mode; or not performing offset processing on the first initial mode and the second initial mode; or performing offset processing on the first initial mode, and not performing offset processing on the second initial mode simultaneously; or not performing offset processing on the first initial mode, and performing offset processing on the second initial mode simultaneously.

Further, in this embodiment of the present disclosure, if the offset mode parameter indicates not to perform offset processing, the encoder may directly determine the first intra prediction mode and the second intra prediction mode according to the mode list. That is, the encoder may directly use several bits to determine which prediction mode in the mode list is used.

It is to be noted that, in the embodiments of the present disclosure, when determining the predicted value of the current block, the encoder may first determine a first predicted value of the current block according to the first intra prediction mode, simultaneously determine a second predicted value of the current block according to the second intra prediction mode, then perform weighted average calculation on the first predicted value and the second predicted value, and finally obtain the predicted value of the current block.

In view of the disadvantages that an intra prediction mode in related technologies can only predict simple textures, the intra prediction methods provided in the embodiments of the present disclosure may determine two prediction blocks by means of two intra prediction modes, and obtain more complex prediction blocks by means of combining the prediction blocks using various weight matrices. Therefore, the quality of intra prediction can be improved, and compression performance can be improved. It can be seen that, the intra prediction methods provided in the present disclosure, the coding of the intra prediction modes can be improved. The compression performance is effectively improved by using the probability characteristics of the intra prediction modes in a new scenario to improve the coding method for intra prediction modes.

It is to be noted that, the method for coding an intra prediction mode used in the present disclosure may be different from a method for coding an intra prediction mode of the intra prediction method in common technologies. Correspondingly, the MPM construction method used in the present disclosure may also be different from an MPM construction method of the intra prediction method in common technologies.

It is to be understood that, in the present disclosure, since there is a certain correlation between the intra prediction mode selected by the current block and the weight matrix, by using the correlation, the coding of the intra prediction mode may use the information of the weight matrix. That is, the coding of the intra prediction mode may use the information of the weight matrix derivation mode. Specifically, an MPM may be constructed by using the weight matrix derivation mode, or the information of the weight matrix derivation mode may be used when the MPM is constructed.

In one example of the present disclosure, the intra prediction mode corresponding to the weight matrix derivation mode or several intra prediction modes related to the intra prediction mode corresponding to the weight matrix derivation mode are set to be assigned code words that are shorter than common intra prediction mode during binaryzation.

It is to be noted that, in the present disclosure, since two intra prediction modes need to be used in the present disclosure, when the MPM is constructed, the intra prediction modes at more positions may be referred to, or the intra prediction modes of more neighbouring blocks may be referred to. The length of the mode list (that is, an MPM list) used in the present disclosure may be different from the length of the mode list (that is, an MPM list) of another intra prediction mode.

By means of the intra prediction methods provided in the embodiments of the present disclosure, the encoder and the decoder may determine two different prediction blocks of the current block by means of two different intra prediction modes, and finally obtain a more complex prediction block by combining the prediction blocks using various weight matrices, such that the accuracy of prediction is improved. In addition, the encoder and the decoder may also construct an MPM list by means of a correlation between the weight matrices and the prediction modes, such that the complexity can be greatly reduced. That is to say, by means of the intra prediction methods provided in the present disclosure, the complexity can be reduced while the quality of intra prediction is improved, thereby improving compression performance.

Figure 18:
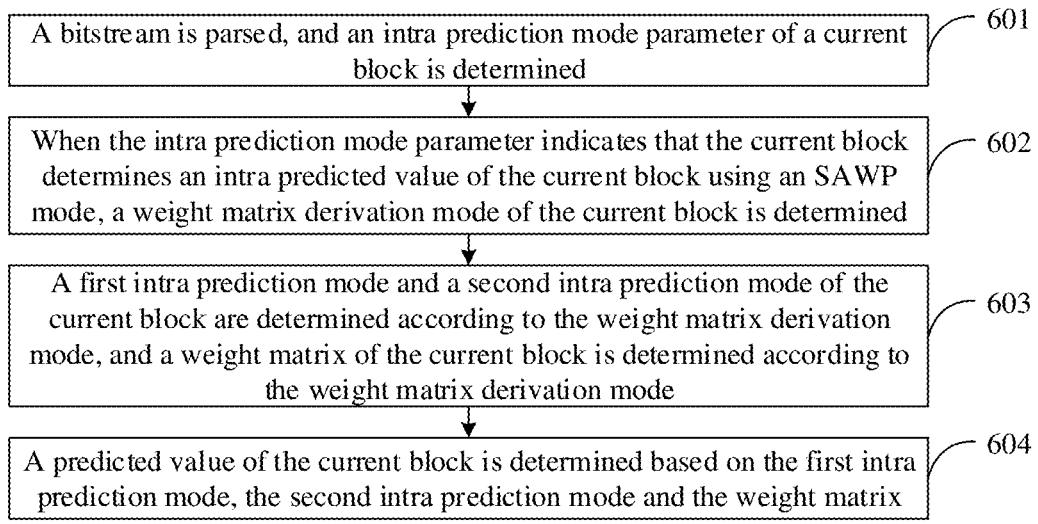
FIG. 18 is a third schematic diagram of implementation processes of an intra prediction method.

An embodiment of the present disclosure provides an intra prediction method, which is applied to a decoder. FIG. 18 is a third schematic diagram of implementation processes of an intra prediction method. As illustrated in FIG. 18, the method for intra prediction performed by the decoder may include the following operations.

In 601, a bitstream is parsed, and an intra prediction mode parameter of a current block is determined.

In this embodiment of the present disclosure, the decoder parses a bitstream, and determines an intra prediction mode parameter of the current block.

It is to be noted that, in this embodiment of the present disclosure, the intra prediction mode parameter may indicate whether the current block may use an SAWP mode, that is, indicating whether the current block may use two different prediction modes for prediction.

It is to be understood that, in this embodiment of the present disclosure, the intra prediction mode parameter may be understood as a flag for indicating whether the SAWP mode is used. Specifically, the decoder parses the bitstream, and may determine a variable as the intra prediction mode parameter, such that the intra prediction mode parameter may be determined by means of the value of the variable.

It is to be noted that, in this embodiment of the present disclosure, the SAWP mode is an intra prediction method. Specifically, the SAWP mode is to determine two different intra prediction modes for the current block; then two prediction blocks are respectively determined according to the two different intra prediction modes; next, a weight matrix may be determined, and the two prediction blocks are combined according to the weight matrix; and finally, a new prediction block may be obtained, i.e., the prediction block of the current block is obtained.

Further, in this embodiment of the present disclosure, when the SAWP mode is applied, the size of the current block may be limited.

It is to be understood that, since the intra prediction method provided in this embodiment of the present disclosure needs to generate two prediction blocks by using two different intra prediction modes respectively, and then perform weighting according to the weight matrix to obtain the new prediction block, in order to reduce complexity and consider the tradeoff between compression performance and complexity at the same time, some prediction blocks with certain sizes may be restricted to not use the SAWP mode in the embodiments of the present disclosure. Therefore, in the present disclosure, the decoder may first determine a dimension parameter of the current block, and then determine according to the dimension parameter whether the current block uses the SAWP mode.

It is to be noted that, in this embodiment of the present disclosure, the dimension parameter of the current block may include the height and width of the current block. Therefore, the decoder may restrict the use of the SAWP mode by using the height and width of the current block, that is, restricting the size of the prediction block that can use the SAWP mode.

Exemplarily, in the present disclosure, if the width is greater than a first threshold and the height is greater than a second threshold, it is determined that the current block uses the SAWP mode. It can be seen that one possible limitation is to use the SAWP mode only when the width of the prediction block is greater than (or greater than or equal to) the first threshold and the height of the prediction block is greater than (or greater than or equal to) the second threshold. The values of the first threshold and the second threshold may be 8, 16, 32, and the like; and the first threshold may be equal to the second threshold.

Exemplarily, in the present disclosure, if the width is less than a third threshold and the height is greater than a fourth threshold, it is determined that the current block uses the SAWP mode. It can be seen that one possible limitation is to use the SAWP mode only when the width of the prediction block is less than (or less than or equal to) the third threshold and the height of the prediction block is greater than (or greater than or equal to) the fourth threshold. The values of the third threshold and the fourth threshold may be 8, 16, 32, and the like; and the third threshold may be equal to the fourth threshold.

Further, in this embodiment of the present disclosure, the dimension of the prediction block that can use the SAWP mode may also be limited by limiting a pixel parameter.

Exemplarily, in the present disclosure, the decoder may first determine a pixel parameter of the current block, and then further determine, according to the pixel parameter and a fifth threshold, whether the current block may use the SAWP mode. It can be seen that one possible limitation is to use the SAWP mode only when the pixel number of the prediction block is greater than (or greater than or equal to) the fifth threshold. The value of the fifth threshold may be 8, 16, 32, and the like.

That is to say, in the present disclosure, the current block can use the SAWP mode only if the dimension parameter of the current block meets a dimension requirement.

Exemplarily, in the present disclosure, there may be a picture-level flag to determine whether the current picture to be decoded uses the present disclosure. For example, an intra picture (for example, an I picture) may be configured to use the present disclosure, and an inter picture (for example, a B picture or a P picture) is configured to not use the present disclosure. Alternatively, the intra picture may be configured to not use the present disclosure, and the inter picture is configured to use the present disclosure. Alternatively, some intra pictures may be configured to use the present disclosure, and some inter pictures are configured to not use the present disclosure. The inter picture may also use intra prediction, and thus the inter pictures may also use the present disclosure.

There may be a flag below a picture level and above a CU level (for example, tile, slice, patch, or LCU) to determine whether an area uses the present disclosure.

In 602, when the intra prediction mode parameter indicates that the current block determines an intra predicted value of the current block by using the SAWP mode, a weight matrix derivation mode of the current block is determined.

In this embodiment of the present disclosure, after the decoder determines the intra prediction mode parameter of the current block, if the intra prediction mode parameter indicates that the current block determines the intra predicted value of the current block by using the SAWP mode, the decoder may further determine the weight matrix derivation mode of the current block.

It is to be noted that, in the present disclosure, the weight matrix derivation mode is used for determining a weight matrix used by the current block. Specifically, the weight matrix derivation mode may be a mode for deriving the weight matrix. For the prediction block with a given length and width, each weight matrix derivation mode may derive one weight matrix; and for the prediction blocks with the same size, the weight matrices derived by different weight matrix derivation modes are different.

Exemplarily, in the present disclosure, the AWP in the AVS3 has 56 weight matrix derivation modes, and the GPM in the VVC has 64 weight matrix derivation modes.

In 603, a first intra prediction mode and a second intra prediction mode of the current block are determined according to the weight matrix derivation mode, and a weight matrix of the current block is determined according to the weight matrix derivation mode.

In this embodiment of the present disclosure, if the intra prediction mode parameter indicates that the current block determines the intra predicted value of the current block by using the SAWP mode, after determining the weight matrix derivation mode of the current block, the decoder may first determine the first intra prediction mode and the second intra prediction mode of the current block according to the weight matrix derivation mode, and may simultaneously determine the weight matrix of the current block according to the weight matrix derivation mode.

It is to be noted that, in this embodiment of the present disclosure, the first intra prediction mode and the second intra prediction mode used by the current block may both be any one of currently common intra prediction modes, including, but not limited to, intra prediction modes such as a DC mode, a Planar mode, a Bilinear mode and an angular prediction mode.

In one example of the present disclosure, a broader understanding is that the intra prediction mode further includes technologies for improving prediction, such as improving sub-pixel interpolation of reference pixels and filtering prediction pixels, for example, MIPF and IPF.

Accordingly, in the present disclosure, the intra prediction modes such as the DC mode, the Planar mode, the Bilinear mode and the angular prediction mode may be called basic intra prediction modes, and the technologies for improving prediction, such as the MIPF and the IPF, are called improved intra prediction modes. The basic intra prediction modes are intra prediction modes that may independently generate prediction blocks without relying on other intra prediction modes, that is, the prediction block may be determined by determining the reference pixels and the basic intra prediction modes. However, the improved intra prediction modes cannot independently generate the prediction block, but only determine the prediction block by relying on the basic intra prediction modes. For example, a certain angular prediction mode may determine and generate the prediction block according to the reference pixel, and the MIPF may use, based on the angular prediction mode, different filters for pixels at different positions to generate or determine the prediction block.

Exemplarily, in the present disclosure, the first intra prediction mode and the second intra prediction mode may both be the basic intra prediction modes, that is, in the embodiments of the present disclosure, two different basic intra prediction modes are used. In this case, the improved intra prediction modes may be respectively combined with the first intra prediction mode and the second intra prediction mode, so as to generate a first prediction block and a second prediction block. Furthermore, after a "new prediction block" is generated in this embodiment of the present disclosure, an updated prediction block may be obtained by improving the "new prediction block".

Exemplarily, in the present disclosure, the first intra prediction mode and the second intra prediction mode may also be combinations of the basic intra prediction modes and the improved intra prediction modes, that is, in the embodiments of the present disclosure, two different intra prediction mode combinations are used. For example, the first intra prediction mode and the second intra prediction mode both use the same angular prediction mode, but the first intra prediction mode does not use the improved intra prediction mode, such as IPF, while the second intra prediction mode uses the improved intra prediction mode, such as the IPF. Alternatively, the first intra prediction mode and the second intra prediction mode both use the same angular prediction mode, but the first intra prediction mode uses one option of the improved intra prediction mode, while the second intra prediction mode uses the other option of the improved intra prediction mode. After the "new prediction block" is obtained, there may still be an improved intra prediction mode to improve the "new prediction block", so as to obtain an updated prediction block.

Therefore, by means of the intra prediction method provided in this embodiment of the present disclosure, based on the first intra prediction mode and the second intra prediction mode, two prediction blocks that are not exactly identical may be determined for the current block, the weight matrix is determined, and the two prediction blocks are combined according to the weight matrix to obtain the new prediction block.

Further, in this embodiment of the present disclosure, not all points of each weight matrix in all possible weight matrices have the same weights. In other words, at least one possible weight matrix includes at least two different weights.

In one example of the present disclosure, all possible weight matrices include at least two different weights.

In one example of the present disclosure, part of the weight matrices includes at least two different weights. For example, in the present disclosure, if the minimum weight is 0 and the maximum weight is 8, there is a weight matrix with some points of 0 and some points of 8. Correspondingly, part of the weight matrices only includes the same weights. For example, in the present disclosure, there is a weight matrix with all points of 4.

In one example of the present disclosure, there are only two types of weights in one weight matrix; and one type of weights indicates that predicted values of corresponding points are completely derived from values of points corresponding to the first prediction block, and the other type of weights indicates that the predicted values of the corresponding points are completely derived from values of points corresponding to the second prediction block. For example, in the present disclosure, there are only two types of weights in one weight matrix, which respectively are 0 and 1.

In one example of the present disclosure, there may be a plurality of weights in one weight matrix, in which the maximum weight and the minimum weight (for example, 0) respectively indicate that the predicted values of the corresponding points are completely derived from the values of the points corresponding to the first prediction block or the values of the points corresponding to the second prediction block. The weights that are not the maximum value or the minimum value indicate that the predicted values of the corresponding points are derived from the weighted average of the values of the points corresponding to the first prediction block and the second prediction block. An area consisting of the maximum or minimum weights may be called a blending area.

It is to be noted that, in the present disclosure, when there are only two types of weights in the weight matrix, positions at which the weights change form a straight line; or, when there are a plurality of weights in the weight matrix, positions with the same weights in the blending area form a straight line (line section). The straight line may be all horizontal-vertical, or may be not all horizontal-vertical.

In one example of the present disclosure, when there are only two types of weights in the weight matrix, positions at which the weights change form a curve (curve section); or when there are a plurality of weights in the weight matrix, positions with the same weights in the blending area form a curve (curve section).

Further, in this embodiment of the present disclosure, the decoder may use a method similar to the GPM or the AWP to determine the weight matrix. Specifically, if the GPM or the AWP is used in the same coding/decoding standard or used by the encoder and decoder, the method may be used to determine the weight matrix. In this way, part of the same logic may be multiplexed. For example, the AWP is used in AVS3 inter prediction, and the AWP may be used to determine the weight matrix in the AVS3. A method different from the GPM or the AWP in the same coding/decoding standard or the encoder and decoder may also be used, for example, using different number of modes, or different blending area algorithms, or using different parameters. Since correlation in time domain is used in inter prediction, a reconstructed picture in a reference picture is used as a reference block. While correlation in space domain is used in intra prediction, a reconstructed pixel around the current block is used as a reference pixel. If the distance in the space domain is closer, the correlation is stronger; and the distance is farther, the correlation is worse. Therefore, if a weight matrix causes pixel positions used by the prediction block to be far away from the reference pixel, this part may not make a more appropriate predicted value than that in the prior art, and thus such weight matrix may not be used in intra prediction, but may be used in inter prediction.

It is to be noted that, in the embodiments of the present disclosure, since two intra prediction modes need to be used, and other common intra prediction methods generally only need to use one intra prediction mode, the coding method for an intra prediction mode used in the embodiments of the present disclosure may be different from a coding method for an intra prediction mode of other common intra prediction methods. Correspondingly, the MPM construction method used in the embodiments of the present disclosure may also be different from an MPM construction method of other common intra prediction methods.

In the embodiments of the present disclosure, further, the intra prediction method provided in the embodiments of the present disclosure needs to transmit information on the weight matrix derivation mode and information on two intra prediction modes in the bitstream. Taking the AWP in the AVS3 as an example, there are 56 weight matrix derivation modes, and 5-6 bits are required for inverse binaryzation. Taking the AVS3 as an example, there are 66 intra prediction modes, and two MPMs are used. If the intra prediction mode is the MPM, two bits are required for inverse binaryzation, otherwise, 7 bits are required for inverse binaryzation. That is to say, in the AVS3, the information requires a maximum of 20 (6+7+7) bits of overhead.

In order to reduce the inverse binaryzation overhead of the information and improve coding performance, in the embodiments of the present disclosure, the decoder may determine the information by using the correlation between the intra prediction mode of the current block and the weight matrix. Specifically, there may be a certain correlation between the intra prediction mode used by the current block and the weight matrix; and by using the correlation, the decoder may use the information on the weight matrix when decoding the intra prediction mode. Further, the decoder may use the information on the weight matrix derivation mode when decoding the intra prediction mode.

Further, in this embodiment of the present disclosure, when the weight matrix includes two types of weights, positions at which the weights change form a straight line; or when there are a plurality of weights in the weight matrix, positions with the same weights in the blending area form a straight line, which may be called a boundary line. The boundary line itself has an angle. The angle horizontally towards the right may be set to 0, and increase counter-clockwise. Then, the boundary line may be at an angle of horizontal 0 degrees or vertical 90 degrees, may be at an inclined angle, such as 45 degrees and 135 degrees, and may be at other different angles. If a prediction block selects to use a certain weight matrix, corresponding textures are likely to show different properties on two sides of the boundary line. For example, the two sides of the boundary line have the textures at two different angles; alternatively, one side of the boundary line is a texture at an angle, and the other side is a relatively flat texture. Since the boundary line itself is at an angle, it can be assumed that the boundary line is obtained from one point by means of angular intra prediction. The point may be close to some textures of the current block, and thus there is a correlation between the straight line and the two intra prediction modes of the current block.

Specifically, in the present disclosure, assuming that the boundary line is obtained from one point by means of angular intra prediction, at least one angular intra prediction mode may be found, and the angular intra prediction mode may approximately make the boundary line. For example, a boundary line in the horizontal direction matches a horizontal intra prediction mode, for example, Mode 24 in the AVS3; a boundary line in the vertical direction matches a vertical intra prediction mode, for example, Mode 12 in the AVS3; and a 45-degree boundary line may match a 45-degree intra prediction mode from lower left to upper right, for example, Mode 30 in the AVS3, or may match a 225-degree intra prediction mode from upper right to lower left, for example, Mode 6 in the AVS3. If there is only one type of weights in the weight matrix, the weight matrix may match the modes such as DC, Planar and Bilinear modes without an obvious angle. It can be seen that, the weight matrix derivation mode may match a certain intra prediction mode, and thus the weight matrix derivation mode may be used to assist in the decoding of the intra prediction modes.

It is to be noted that, in the present disclosure, the weight matrix derivation mode may also be an index of the weight matrix. For example, 56 modes of the AWP may be regarded as 56 weight matrix derivation modes.

Exemplarily, in the present disclosure, a mapping table may be constructed to further represent a mapping between the weight matrix derivation modes and angular intra prediction modes. Specifically, the boundary lines of a plurality of modes of AWP and GPM are at the same angle. For example, the angles of the boundary lines of the AWP in the AVS3 are the same every 8 modes. The 56 modes of AWP have a total of 7 boundary line angles. An index of the boundary line angle may be obtained by the mode number of the weight matrix derivation mode Mod 8 (% 8). For example, Table 1 is the mapping table. Taking an angular mode of the AVS3 as an example, the indexes 0 and 1 of the boundary line angles may respectively correspond to two angular intra prediction modes, where one is from upper right to lower left, and one is from upper left to lower right. During specific implementation, another approximately corresponding angular intra prediction mode may also be found for the indexes of other boundary line angles, or the indexes of all boundary line angles only correspond to one angular intra prediction mode.

Further, in the present disclosure, the reference pixels on the left side and upper side of the current block are generally used for intra prediction; and the distance between the pixels in space is closer, the correlation is stronger, and the distance in space is farther, the correlation is weaker. Therefore, if only a part of pixels of the current block is obtained by prediction using the intra prediction mode, the position of the part of the pixels affects the probability of the intra prediction mode used for this part. That is, the position and angle of the boundary line affect the selection of the two intra prediction modes on the two sides of the boundary line.

In this embodiment of the present disclosure, further, when determining the first intra prediction mode and the second intra prediction mode of the current block according to the weight matrix derivation mode, the decoder may first use the weight matrix derivation mode to determine a mode list (MPM list), and then further determine the first intra prediction mode and the second intra prediction mode based on the mode list.

Specifically, in this embodiment of the present disclosure, when the first intra prediction mode and the second intra prediction mode are determined by using the correlation with the weight matrix, the weight matrix derivation mode may be used to construct the mode list, or the information of the weight matrix derivation mode may be used when the MPM is constructed. The weight matrix derivation mode may correspond to at least one intra prediction mode, and thus the decoder may add the intra prediction mode corresponding to the weight matrix derivation mode determined for the current block into the mode list, or add several intra prediction modes related to the intra prediction mode corresponding to the weight matrix derivation mode into the mode list.

Further, in this embodiment of the present disclosure, when the decoder determines the mode list using the weight matrix derivation mode, the decoder may first determine intra prediction modes corresponding to neighbouring blocks of the current block, and then determine the intra prediction modes corresponding to the neighbouring blocks as modes to be added. After determining that the modes to be added meet a preset addition condition, the decoder may add the modes to be added into the mode list, that is, adding the intra prediction modes corresponding to the neighbouring blocks of the current block into the mode list; next, if the mode list does not meet a preset list length, the decoder may continue to determine a related intra prediction mode corresponding to the weight matrix derivation mode, and then determines the related intra prediction mode corresponding to the weight matrix derivation mode as a mode to be added; and when it is determined that the mode to be added meets the preset addition condition, the mode to be added is added into the mode list, that is, the related intra prediction mode corresponding to the weight matrix derivation mode is added into the mode list.

It is to be noted that, in this embodiment of the present disclosure, when adding the intra prediction modes corresponding to the neighbouring blocks into the mode list, the decoder may first determine sequence parameters corresponding to the neighbouring blocks, and then successively add the intra prediction modes corresponding to the neighbouring blocks into the mode list according to the sequence parameters. The decoder may determine the corresponding sequence parameter according to a spatial distance between a neighbouring block and the current block. For example, if the spatial distance between the neighbouring block and the current block is closer, the correlation between the neighbouring block and the current block is stronger, and addition processing is performed more earlier, that is, the sequence parameter is smaller; and if the spatial distance between the neighbouring block and the current block is farther, the correlation between the neighbouring block and the current block is weaker, and the addition processing is performed later, that is, the sequence parameter is larger.

Further, in this embodiment of the present disclosure, when determining the related intra prediction mode corresponding to the weight matrix derivation mode, the decoder may first determine the intra prediction mode corresponding to the weight matrix derivation mode, and then based on the intra prediction mode corresponding to the weight matrix derivation mode, determine the related intra prediction mode according to a first index interval.

Exemplarily, in the present disclosure, when determining the several intra prediction modes related to the intra prediction mode corresponding to the weight matrix derivation mode, the decoder may select, according to the first index interval, modes of which index numbers differ by a certain number or numbers from that of the intra prediction mode corresponding to the weight matrix derivation mode, for example, differing by 1 index number, differing by 2 index numbers, or the like. For example, assuming that the index of the intra prediction mode corresponding to the weight matrix derivation mode is 10, and the first index interval is 2, the two intra prediction modes with the indexes of 8 and 12 may be determined as two related intra prediction modes related to the intra prediction mode corresponding to the weight matrix derivation mode.

It is to be noted that, in this embodiment of the present disclosure, after the decoder adds the intra prediction modes corresponding to the neighbouring blocks of the current block into the mode list, or after the decoder adds the related intra prediction mode corresponding to the weight matrix derivation mode into the mode list, if the mode list does not meet the preset list length, that is, the mode list is not filled, the decoder may continue to determine a preset prediction mode as a mode to be added, and then adds the mode to be added into the mode list after determining that the mode to be added meets the preset addition condition, that is, adding the preset prediction mode into the mode list.

It is to be understood that, in the present disclosure, the preset prediction mode may include one or more of various different modes such as a DC mode, a Bilinear mode and a Planar mode.

Further, in this embodiment of the present disclosure, after the decoder separately adds the intra prediction modes corresponding to the neighbouring blocks of the current block, the related intra prediction mode corresponding to the weight matrix derivation mode, and the preset prediction mode into the mode list, if the mode list still does not meet the preset list length, that is, the mode list is still not filled, the decoder may select a prediction mode in the mode list to determine an associated intra prediction mode, then determines the associated intra prediction mode as a mode to be added, and adds the mode to be added into the mode list after determining that the mode to be added meets the preset addition condition, that is, adding the associated intra prediction mode corresponding to the mode list into the mode list.

That is to say, in the present disclosure, after the intra prediction modes corresponding to the neighbouring blocks of the current block, the related intra prediction mode corresponding to the weight matrix derivation mode, and the preset prediction mode are successively added into the mode list, if the mode list is still not filled, the decoder may select to determine the corresponding associated intra prediction modes based on existing prediction modes in the mode list, and then adds these associated intra prediction modes into the mode list.

Exemplarily, in the present disclosure, the decoder may successively determine, based on any prediction mode in the mode list, the associated intra prediction mode related to the prediction mode according to a second index interval. The decoder may select, according to the second index interval, modes of which index numbers differ by a certain number or numbers from the index number of the prediction mode, for example, differing by 1 index number, differing by 2 index numbers, or the like.

It is to be noted that, in the embodiments of the present disclosure, either using an intra prediction mode corresponding to a neighbouring block of the current block as the mode to be added, or using the related intra prediction mode corresponding to the weight matrix derivation mode as the mode to be added, or using the preset prediction mode as the mode to be added, or using the associated intra prediction mode as the mode to be added, the decoder needs to determine whether the mode to be added meets the preset addition condition. Specifically, if the mode to be added exists and is different from all prediction modes in the mode list, it may be determined that the mode to be added meets the preset addition condition, and thus the mode to be added may be added into the mode list.

Correspondingly, if the mode to be added does not exist or is the same as (coincides with) a prediction mode in the mode list, it may be determined that the mode to be added does not meet the preset addition condition, such that the mode to be added cannot be added into the mode list, but is directly discarded.

It is to be understood that, in the present disclosure, since the current block needs to use two intra prediction modes for intra prediction, when the MPM is constructed, the intra prediction modes at more positions may be referred to, or the intra prediction modes of more neighbouring blocks may be referred to. Correspondingly, in the present disclosure, the length of the mode list used by the current block may be different from the length of the mode list of other intra prediction modes, because code words of the MPM during binarization are shorter than that of other modes, the probability that two intra prediction modes are respectively MPMs is increased, which facilitates the improvement of the coding and decoding efficiency.

It is to be noted that, in the present disclosure, in order to ensure that the first intra prediction mode and the second intra prediction mode of the current block are different, during construction of the mode list, the decoder must ensure that the intra prediction mode added into the mode list each time is not the same as the existing intra prediction modes in the mode list.

Further, in this embodiment of the present disclosure, when using the weight matrix derivation mode to determine the mode list, the decoder may first determine a list construction strategy corresponding to the weight matrix derivation mode, and then further determine the mode list according to the list construction strategy.

That is to say, in the present disclosure, for different weight matrices, that is, for different weight matrix derivation modes, the decoder may use different construction strategies to construct the mode list. For example, based on the construction strategy, if the boundary line of the weight matrix is 0 degrees or 90 degrees, that is, under a horizontal or vertical situation, the decoder may select to take the intra prediction mode corresponding to the weight matrix into consideration during the construction of the mode list; and for other situations, the intra prediction mode corresponding to the weight matrix is not taken into consideration.

Exemplarily, in the present disclosure, assuming that the boundary line of the weight matrix is 0 degrees, for example, modes (counting from 0) of the AWP such as Mode 2 and Mode 10, when the mode list is constructed, the horizontal intra prediction mode 24 may be added into the candidate of the mode list; and assuming that the boundary line of the weight matrix is 90 degrees, for example, the modes (counting from 0) of the AWP such as Mode 6 and Mode 14, when the mode list is constructed, the vertical intra prediction mode 12 may be added into the candidate of the mode list.

It is to be understood that, in the present disclosure, within a range that the boundary line of the weight matrix is close to 0 degrees, the horizontal intra prediction mode, or the horizontal intra prediction mode and a similar intra prediction mode may further be added into the candidates of the mode list; and within a range that the boundary line of the weight matrix is close to 90 degrees, the vertical intra prediction mode, or the horizontal intra prediction mode and the similar intra prediction mode may be added into the candidates of the mode list.

It is to be understood that, in the present disclosure, the two intra prediction modes used by the current block for intra prediction are different, that is, the first intra prediction mode and the second intra prediction mode are different, and the first intra prediction mode may be eliminated when the second intra prediction mode is decoded. That is to say, information of the first intra prediction mode may be used for the decoding of the second intra prediction mode.

In this embodiment of the present disclosure, further, during the construction of the mode list, the decoder may further set a candidate intra prediction mode. The candidate intra prediction mode is different from all the intra prediction modes in the mode list.

Specifically, in the present disclosure, in order to ensure that the first intra prediction mode and the second intra prediction mode used by the current block are different, determination of the second intra prediction mode may be dependent on the first intra prediction mode. When determining the first intra prediction mode and the second intra prediction mode based on the mode list, the decoder may first determine one prediction mode in the mode list as the first intra prediction mode, and then determine the second intra prediction mode according to the first intra prediction mode and the mode list.

Further, in the embodiments of the present disclosure, after determining one prediction mode in the mode list as the first intra prediction mode, the decoder may delete the prediction mode from the mode list, and then adds the candidate intra prediction mode to the mode list to obtain an updated mode list. Then, one prediction mode may be selected from the updated mode list and determined as the second intra prediction mode. The selection manner may be arbitrary.

That is to say, in this embodiment of the present disclosure, if the first intra prediction mode selects one MPM, in order to ensure that the first intra prediction mode and the second intra prediction mode used by the current block are different, there is one less MPM available for the second intra prediction mode. In order to not change the length of the mode list available for the first intra prediction mode and the second intra prediction mode, after determining the first intra prediction mode, the decoder may additionally add one MPM, i.e., adding a preset candidate intra prediction mode into the mode list, such that the MPMs of the same number as the first intra prediction mode may still be used when the second intra prediction mode is determined.

Exemplarily, in the present disclosure, assuming that there are N MPMs available for the first intra prediction mode and the second intra prediction mode, when the mode list is constructed, N MPMs and one candidate MPM may be first constructed, and the MPMs available for the first intra prediction mode are the N MPMs. If the first intra prediction mode selects one of the MPMs, for the second intra prediction mode, the MPM selected by the first intra prediction mode is eliminated, and then the candidate MPM is added into the mode list, such that the second intra prediction mode may still select from N MPMs.

In this embodiment of the present disclosure, further, during the construction of the mode list, the decoder may further set a length parameter of the mode list to be (N+1), where N is a positive integer.

Specifically, in the present disclosure, in order to ensure that the first intra prediction mode and the second intra prediction mode used by the current block are different, the determination of the second intra prediction mode may be dependent on the first intra prediction mode. When the decoder determines the first intra prediction mode and the second intra prediction mode based on the mode list, if the mode list is used to determine the first intra prediction mode, one of the first N prediction modes in the mode list may be determined as the first intra prediction mode, and then the second intra prediction mode is determined according to the first intra prediction mode and the mode list.

Further, in the embodiments of the present disclosure, if the mode list is used to determine the first intra prediction mode, after determining one of the first N prediction modes in the mode list as the first intra prediction mode, the decoder determines the second intra prediction mode by using other N prediction modes in the mode list other than the first intra prediction mode.

It is to be noted that, in this embodiment of the present disclosure, when the decoder determines the first intra prediction mode and the second intra prediction mode based on the mode list, if the mode list is not used to determine the first intra prediction mode, the decoder may directly determine one of the first N prediction modes in the mode list as the second intra prediction mode.

That is to say, in this embodiment of the present disclosure, assuming that there are N MPMs available for the intra prediction modes, in order to ensure that the first intra prediction mode and the second intra prediction mode used by the current block are different, during the construction of the mode list, (N+1) MPMs may be constructed. The MPMs available for the first intra prediction mode are the first N MPMs in the mode list. If the first intra prediction mode does not select an MPM, the MPMs available for the second intra prediction mode are the first N MPMs in the mode list. If the first intra prediction mode selects an MPM, the MPMs available for the second intra prediction mode are the N MPMs in the mode list other than the first intra prediction mode.

Exemplarily, in the present disclosure, assuming that N is 4, the decoder may construct a mode list including 5 MPMs. MPM[x] represents the (x+1)th MPM, that is, MPM[0] represents the first MPM, which is due to the fact that the count of an array starts from 0. The first intra prediction mode is mode0, and the second intra prediction mode is mode1. Assuming that the first intra prediction mode and the second intra prediction mode are both the MPMs, an index number of the first intra prediction mode in the optional MPMs is idx0, and an index number of the second intra prediction mode in the optional MPMs is idx1, then, ---
mode0=MPM[idx0]
mode1=MPM[idx1<idx0?idx1:idx1+1]
That is to say, if idx1<idx0, mode1=MPM[idx1]; otherwise, mode1=MPM[idx1+1].

---

It can be seen that, the values of idx0 and idx1 range from 0 to 3; and the value of mode1 is related to both idx1 and idx0.

Exemplarily, in this embodiment of the present disclosure, on a decoding side, the decoder may determine a variable intra_luma_pred_mode0 with respect to the first intra prediction mode by parsing the bitstream, and may also determine a variable intra_luma_pred_mode1 with respect to the second intra prediction mode. Next, the decoder may determine the first intra prediction mode IntraLumaPredMode0 according to intra_luma_pred_mode0, and determine the second intra prediction mode IntraLumaPredMode1 according to intra_luma_pred_mode1.

In this embodiment of the present disclosure, when the MPM list is constructed, MPM[0]<MPM[1] is guaranteed. If MPM[0]>MPM[1] initially, MPM[0] may be swapped with MPM[1]. In order to correspond to the subsequent operations in 2 and 5, the encoder also needs to use the same MPM list construction method.

Specifically, a relationship between the variables intra_luma_pred_mode0 and intra_luma_pred_mode1 and a binary symbol string may be illustrated in Table 9 below.

TABLE 9

| intra_luma_pred_mode | Binary symbol string | | | | | |
|---|---|---|---|---|---|---|
| 0 | 1 | 0 | 0 | | | |
| 1 | 1 | 0 | 1 | | | |
| 2 | 1 | 1 | 0 | | | |
| 3 | 1 | 1 | 1 | | | |
| 4 | 0 | 0 | 0 | 0 | 0 | 0 |
| ... | | | | ... | | |
| binIdx | 0 | 1 | 2 | 3 | 4 | 5 | 6 |

A first bit is used to indicate whether it is an MPM. For example, "1" indicates that it is an MPM, and "0" indicates that it is not an MPM. If the first intra prediction mode is an MPM, assuming that the mode list includes 4 MPMs, 2 bits may be used to indicate which MPM in the mode list is used, that is, "00, 01, 10 and 11" respectively represent the first MPM, the second MPM, the third MPM and the fourth MPM in the mode list.

Specifically, the method 1 for the decoder to separately derive IntraLumaPredMode0 and IntraLumaPredMode1 according to intra_luma_pred_mode0 and intra_luma_pred_mode1 includes the following operations.

1. If the value of intra_luma_pred_mode0 is 0, IntraLumaPredMode0 is equal to MPM[0], otherwise, if the value of intra_luma_pred_mode0 is 1, IntraLumaPredMode0 is equal to MPM[1]; if the value of intra_luma_pred_mode0 is 2, IntraLumaPredMode0 is equal to MPM[2]; and if the value of intra_luma_pred_mode0 is 3, IntraLumaPredMode0 is equal to MPM[3].

2. Otherwise, the value (intra_luma_pred_mode0+EipmPuFlag×32) of IntraPredMode0 is set to be:

if the value of IntraPredMode0 minus 4 is less than MPM[0], IntraLumaPredMode0 is equal to IntraPredMode0 minus 2;

otherwise, if the value of IntraPredMode0 minus 3 is greater than MPM[0] and less than MPM[1], IntraLumaPredMode0 is equal to IntraPredMode0 minus 1;

otherwise, IntraLumaPredMode0 is equal to IntraPredMode0.

3. If the value of intra_luma_pred_mode0 is less than 4, the value of intra_luma_pred_mode1 is less than 4, and the value of intra_luma_pred_mode1 is greater than or equal to the value of intra_luma_pred_mode0, mpmPlus=1, otherwise, mpmPlus=0.

4. If the value of intra_luma_pred_mode1 is 0, IntraLumaPredMode1 is equal to MPM[0+mpmPlus], otherwise, if the value of intra_luma_pred_mode1 is 1, IntraLumaPredMode1 is equal to MPM[1+mpmPlus]; if the value of intra_luma_pred_mode1 is 2, IntraLumaPredMode1 is equal to MPM[2+mpmPlus]; and if the value of intra_luma_pred_mode1 is 3, IntraLumaPredMode1 is equal to MPM[3+mpmPlus].

5. Otherwise, the value (intra_luma_pred_mode1+EipmPuFlag×32) of IntraPredMode1 is set to be:

if the value of IntraPredMode1 minus 4 is less than MPM[0], IntraLumaPredMode1 is equal to IntraPredMode1 minus 2;

otherwise, if the value of IntraPredMode1 minus 3 is greater than MPM[0] and less than MPM[1], IntraLumaPredMode1 is equal to IntraPredMode1 minus 1;

otherwise, IntraLumaPredMode1 is equal to IntraPredMode1.

The two-valued variable eipm_pu_flag is a flag of an extended luma intra prediction mode. Exemplarily, "1" indicates that the extended angular intra prediction mode should be used; and "0" indicates that the extended luma intra prediction mode is not used. The value of EipmPuFlag is equal to the value of eipm_pu_flag. Specifically, if there is no eipm_pu_flag in a bitstream, the value of EipmPuFlag is equal to 0.

In one embodiment of the present disclosure, if it only ensures that the first intra prediction mode and the second intra prediction mode used by the current block are different, but the number of the MPMs that may be selected for the first intra prediction mode and the second intra prediction mode is not limited, the decoder may also not set the candidate intra prediction modes, or not increase the length of the mode list. In this case, the decoder needs to change the decoding method for the second intra prediction mode. That is to say, if the first intra prediction mode selects one MPM in the mode list, there is one less MPM available for the second intra prediction mode; and in this case, since there are fewer MPMs available for the second intra prediction mode, the decoding method for the second intra prediction mode needs to be changed.

Exemplarily, in the present disclosure, for example, the number N of the MPMs is 4, the first bit is used to indicate whether it is an MPM. For example, "1" indicates that it is an MPM, and "0" indicates that it is not an MPM. If the first intra prediction mode is an MPM, since there are 4 MPMs, 2 bits are used to indicate which MPM it is, that is, "00, 01, 10 and 11" respectively represent the first MPM, the second MPM, the third MPM and the fourth MPM. If the first intra prediction mode and the second intra prediction mode both are MPMs, there are only 3 MPMs available for the second intra prediction mode, and 1-2 bits may be used to indicate which MPM it is, for example, "00, 01 and 10" respectively represent the remaining first MPM, second MPM and third MPM. It can be seen that, since one possibility is excluded, an inverse binaryzation method may be changed to save overheads.

Exemplarily, in the present disclosure, assuming that N is 4, the mode list including 4 MPMs is constructed. MPM[x] represents the (x+1)th MPM, that is, MPM[0] represents the first MPM, which is due to the fact that the count of an array starts from 0. The first intra prediction mode is mode0, and the second intra prediction mode is mode1. Assuming that the first intra prediction mode and the second intra prediction mode are both MPMs, an index number of the first intra prediction mode in the optional MPMs is idx0, and an index number of the second intra prediction mode in the optional MPMs is idx1, then:

mode0=MPM[idx0]
mode1=MPM[idx1<idx0?idx1:idx1+1]
That is to say, if idx1<idx0, mode1=MPM[idx1];
otherwise, mode1=MPM[idx1+1].

It can be seen that, the value of idx0 ranges from 0 to 3; the value of idx1 ranges from 0 to 2; and the value of mode1 is related to both idx1 and idx0. idx0 may use 2 bits for inverse binaryzation, and idx1 uses 1-2 bits for inverse binaryzation.

Exemplarily, in this embodiment of the present disclosure, on a decoding side, the decoder may determine the variable intra_luma_pred_mode0 with respect to the first intra prediction mode by parsing the bitstream, and may also determine the variable intra_luma_pred_mode1 with respect to the second intra prediction mode. Next, the decoder may determine the first intra prediction mode IntraLumaPredMode0 according to intra_luma_pred_mode0, and simultaneously determine the second intra prediction mode IntraLumaPredMode1 according to intra_luma_pred_mode1.

In this embodiment of the present disclosure, when the MPM list is constructed, MPM[0]<MPM[1] is guaranteed. If MPM[0]>MPM[1] initially, MPM[0] may be swapped with MPM[1]. In order to correspond to the subsequent operations in 2 and 5, the encoder also needs to use the same MPM list construction method.

Specifically, a relationship between the variables intra_luma_pred_mode0 and intra_luma_pred_mode1 and a binary symbol string may be illustrated in Table 10 below.

TABLE 10

| intra_luma_pred_mode | Binary symbol string | | | | | |
|---|---|---|---|---|---|---|
| 0 | 1 | 0 | 0 | | | |
| 1 | 1 | 0 | 1 | | | |
| 2 | 1 | 1 | 0 | | | |
| 3 | 1 | 1 | 1 | | | |
| 4 | 0 | 0 | 0 | 0 | 0 | 0 |
| ... | | | | ... | | |
| binIdx | 0 | 1 | 2 | 3 | 4 | 5 | 6 |

If the value of intra_luma_pred_mode0 is less than 4, a relationship between intra_luma_pred_mode1 and a binary symbol string may be illustrated in Table 11 below, otherwise, the relationship between intra_luma_pred_mode1 and the binary symbol string is the same as the relationship between intra_luma_pred_mode0 and the binary symbol string.

TABLE 11

| intra_luma_pred_mode | Binary symbol string | | | | | |
|---|---|---|---|---|---|---|
| 0 | 1 | 0 | | | | |
| 1 | 1 | 1 | 0 | | | |
| 2 | 1 | 1 | 1 | | | |
| 3 | | | | | | |
| 4 | 0 | 0 | 0 | 0 | 0 | 0 |
| ... | | | | ... | | |
| binIdx | 0 | 1 | 2 | 3 | 4 | 5 | 6 |

Specifically, the method for the decoder to separately derive IntraLumaPredMode0 and IntraLumaPredMode1 according to intra_luma_pred_mode0 and intra_luma_pred_mode1 includes the following operations.

1. If the value of intra_luma_pred_mode0 is 0, IntraLumaPredMode0 is equal to MPM[0], otherwise, if the value of intra_luma_pred_mode0 is 1, IntraLumaPredMode0 is equal to MPM[1]; if the value of intra_luma_pred_mode0 is 2, IntraLumaPredMode0 is equal to MPM[2]; and if the value of intra_luma_pred_mode0 is 3, IntraLumaPredMode0 is equal to MPM[3].

2. Otherwise, the value (intra_luma_pred_mode0+EipmPuFlag×32) of IntraPredMode0 is set to be:
  if the value of IntraPredMode0 minus 4 is less than MPM[0], IntraLumaPredMode0 is equal to IntraPredMode0 minus 2;
  otherwise, if the value of IntraPredMode0 minus 3 is greater than MPM[0] and less than MPM[1], IntraLumaPredMode0 is equal to IntraPredMode0 minus 1;
  otherwise, IntraLumaPredMode0 is equal to IntraPredMode0.

3. If the value of intra_luma_pred_mode0 is less than 4, the value of intra_luma_pred_mode1 is less than 4, and the value of intra_luma_pred_mode1 is greater than or equal to the value of intra_luma_pred_mode0, mpmPlus=1, otherwise, mpmPlus=0.

4. If the value of intra_luma_pred_mode1 is 0, IntraLumaPredMode1 is equal to MPM[0+mpmPlus], otherwise, if the value of intra_luma_pred_mode1 is 1, IntraLumaPredMode1 is equal to MPM[1+mpmPlus]; if the value of intra_luma_pred_mode1 is 2, IntraLumaPredMode1 is equal to MPM[2+mpmPlus]; and if the value of intra_luma_pred_mode1 is 3, IntraLumaPredMode1 is equal to MPM[3+mpmPlus].

5. Otherwise, the value (intra_luma_pred_mode1+EipmPuFlag×32) of IntraPredMode1 is set to be:
  if the value of IntraPredMode1 minus 4 is less than MPM[0], IntraLumaPredMode1 is equal to IntraPredMode1 minus 2;
  otherwise, if the value of IntraPredMode1 minus 3 is greater than MPM[0] and less than MPM[1], IntraLumaPredMode1 is equal to IntraPredMode1 minus 1;
  otherwise, IntraLumaPredMode1 is equal to IntraPredMode1.

The two-valued variable eipm_pu_flag is a flag of an extended luma intra prediction mode. Exemplarily, "1" indicates that the extended angular intra prediction mode should be used, and "0" indicates that the extended luma intra prediction mode is not used. The value of EipmPuFlag is equal to the value of eipm_pu_flag. Specifically, if there is no eipm_pu_flag in a bitstream, the value of EipmPuFlag is equal to 0.

In this embodiment of the present disclosure, further, when determining the first intra prediction mode and the second intra prediction mode of the current block according to the weight matrix derivation mode, the decoder may also sort the intra prediction modes corresponding to the neighbouring blocks of the current block, the related intra prediction mode corresponding to the weight matrix derivation mode, and the preset prediction mode, so as to obtain a candidate list of prediction modes. The preset prediction mode includes one or more of various prediction modes such as a DC mode, a Bilinear mode and a Planar mode. Next, the decoder may determine the first intra prediction mode and the second intra prediction mode according to the candidate list of prediction modes.

Specifically, in this embodiment of the present disclosure, when the first intra prediction mode and the second intra prediction mode are determined by using the correlation with the weight matrix, the intra prediction mode corresponding to the weight matrix derivation mode or several intra prediction modes related to the intra prediction mode corresponding to the weight matrix derivation mode during binaryzation may be assigned shorter code words than a common intra prediction mode, or code words that are shorter than possibly longest code words in the intra prediction mode. That is to say, the code words of the intra prediction mode(s) are not the longest. Therefore, it can be considered that the intra prediction mode corresponding to the weight matrix derivation mode or several intra prediction modes related to the intra prediction mode corresponding to the weight matrix derivation mode have a higher probability of being selected than the other modes.

That is to say, in this embodiment of the present disclosure, the first intra prediction mode and the second intra prediction mode may also not use the MPMs. All intra prediction modes that may be used by the first intra prediction mode and the second intra prediction mode may be sorted to generate the candidate list of prediction modes, shorter code words are allocated to the top-ranked intra prediction modes in the candidate list of prediction modes, and longer code words are allocated to the low-ranked intra prediction modes in the candidate list of prediction modes. During sorting, the intra prediction modes of the neighbouring blocks of the current block may be referred to, or the weight matrix derivation mode of the current block may also be referred to.

Further, in this embodiment of the present disclosure, when determining the first intra prediction mode and the second intra prediction mode of the current block according to the weight matrix derivation mode, the decoder may also establish a reference set of first intra prediction modes corresponding to the weight matrix derivation mode, simultaneously establish a reference set of second intra prediction modes corresponding to the weight matrix derivation mode, and then determine the first intra prediction mode based on the reference set of first intra prediction modes, and simultaneously determine the second intra prediction mode based on the reference set of second intra prediction modes.

That is to say, in the embodiments of the present disclosure, for the weight matrix derivation mode of the current block, the decoder may sort all possible intra prediction modes, corresponding to the weight matrix derivation mode, of the first intra prediction mode, so as to generate the reference set of first intra prediction modes, and at the same time, may also sort all possible intra prediction modes, corresponding to the weight matrix derivation mode, of the second intra prediction mode, so as to generate the reference set of second intra prediction modes. Therefore, the first intra prediction mode may be determined from the reference set of first intra prediction modes, and the first intra prediction mode may be determined from the reference set of second intra prediction modes.

Further, in this embodiment of the present disclosure, in order to reduce the complexity, a lookup table as Table 2 above may be narrowed down by means of clustering, for example, the weight matrix derivation modes may be classified to determine types corresponding to the weight matrix derivation modes. One type of the weight matrix derivation modes corresponds to the same sorting of all possible intra prediction modes of the first intra prediction mode, and also corresponds to the same sorting of all possible intra prediction modes of the second intra prediction mode.

Further, in this embodiment of the present disclosure, in order to reduce the complexity, a lookup table as Table 2 above may be narrowed down by means of clustering, for example, the intra prediction modes may be classified to determine types corresponding to the intra prediction modes. For example, non-angular modes such as DC, Planar and Bilinear modes belong to one type. Angular modes may be classified according to the range of some radians, for example, every 45-degree, that is, a ¼ circle, belong to one type, or every 22.5-degree, that is, a ⅛ circle, belong to one type. Specifically, the angular modes may also be partitioned into several unequal intervals.

In this embodiment of the present disclosure, further, since the intra prediction method provided in the present disclosure needs to use two different intra prediction modes and one weight matrix derivation mode to determine the predicted value of the current block, in order to reduce the overheads, in the present disclosure, the number of bits may be reduced by limiting the two intra prediction modes of the current block, and at the same time, the number of bits may also be reduced by limiting the weight matrix derivation mode of the current block.

Exemplarily, in the present disclosure, since the first 33 prediction modes in the AVS3 have nearly covered an overall angle range, good performance may be guaranteed by only using the first 33 prediction modes in the AVS3, and during decoding, it only needs to adjust to not use an EIPM. Further, the number of intra prediction modes possibly used by the current block may further be compressed and limited, so as to finally achieve the fact that decoding is performed by only using 5 bits, such that the overheads are further reduced, thereby achieving better performance.

In one example of the present disclosure, the overheads for decoding the two intra prediction modes may be reduced by decreasing the number of the intra prediction modes possibly used by the current block. For example, in the AVS3, if 66 intra prediction modes are used, a maximum of 7 bits is needed to decode one intra prediction mode; and if only 33 intra prediction modes are used and a PCM is not used, a maximum of 6 bits is needed to decode one intra prediction mode.

Further, in the present disclosure, considering that the intra prediction mode generally includes a non-angular prediction mode such as a DC mode, a Planar mode or a Bilinear mode, and an angular prediction mode. During implementation, each non-angular mode uses one set of logic, all angular modes use one set of logic, or the angular modes use several sets of logic, there may be some circuits that may be multiplexed between different logics and some circuits that may not be multiplexed. Therefore, for limiting the number of the intra prediction modes possibly used by the current block, it may be limited to only select angular prediction modes or only select non-angular prediction modes.

Description is made below by taking limitation of the intra prediction modes possibly used by the second intra prediction mode as an example. It is to be noted that, corresponding limitation may also be applied to the limitation of the first intra prediction mode.

Manner I: the second intra prediction mode may only use one intra prediction mode specified in the non-angular prediction modes.

For example, the second intra prediction mode may only use a DC mode, or the second intra prediction mode may only use a Bilinear mode, or the like. Since the second intra prediction mode only has one possible selection, when the blocks in the present disclosure are used for coding and decoding, the second intra prediction mode may be derived by default to predict the current block, without determining the second intra prediction mode; the second intra prediction mode does not need to be written into the bitstream during coding; and what the second intra prediction mode is does not need to be parsed from the bitstream during decoding.

In this embodiment, description is further made by taking the method being applied to luma prediction as an example. If the current block CU uses an SAWP mode, the bitstream needs to be parsed to acquire the corresponding weight matrix derivation mode and the first intra prediction mode (the second intra prediction mode only has one possible selection, and thus the second intra prediction mode is a preset intra prediction mode by default).

A corresponding decoding process is illustrated in Table 12.

TABLE 12

```
......
if ((SawpFlag) {
    sawp_idx
    intra_luma_pred_mode0
}
......
```

The SAWP mode index sawp_idx is used for determining a weight matrix of SAWP, and the value of SawpIdx is equal to the value of sawp_idx. If there is no sawp_idx in the bitstream, the value of SawpIdx is equal to 0.

The first luma prediction mode intra_luma_pred_mode0 of SAWP is used for determining a first intra prediction mode IntraLumaPredMode0 of a luma block of SAWP, and the first intra prediction mode IntraLumaPredMode0 is determined according to intra_luma_pred_mode0.

A second intra prediction mode IntraLumaPredMode1 is derived by default.

Intra prediction sample matrices predMatrix0 and pred-Matrix1 are respectively determined according to the first intra prediction mode IntraLumaPredMode0 and the second intra prediction mode IntraLumaPredMode1. The weight matrix SawpWeightArrayY is determined according to SawpIdx.

A new prediction sample matrix predMatrixSawp is determined according to the two intra prediction sample matrices predMatrix0 and predMatrix1, and the weight matrix Sawp-WeightArrayY.

A specific method includes the following.

The value of an element predMatrixSawp [x][y] in the prediction sample matrix predMatrixSawp of SAWP is ((predMatrix0[x][y]*AwpWeightArrayY[x][y]+predMatrix1[x][y]*(8−AwpWeightArrayY[x][y])+4)>>3).

Manner II: the second intra prediction mode may only use the non-angular mode, or some of the non-angular modes.

For example, the second intra prediction mode may only use the DC and Bilinear modes. Since the second intra prediction mode only has 2 possible selections, intra_luma_pred_mode1 of 1 bit may be used to indicate whether the second intra prediction mode is the DC mode or the Bilinear mode. During coding, only two possibilities of DC and Bilinear modes need to be tried for the second intra prediction mode. After it is determined that which intra prediction mode the second intra prediction mode is, intra_luma_pred_mode1 may be determined. During decoding of corresponding blocks, only intra_luma_pred_mode1 of 1 bit needs to be parsed for the second intra prediction mode, so as to determine whether it is the DC mode or the Bilinear mode.

In other examples, the second intra prediction mode may only use the non-angular mode, that is, the second intra prediction mode only has 3 possible selections, and then intra_luma_pred_mode1 of 2 bits may be used to indicate which intra prediction mode the second intra prediction mode is.

In this embodiment, description is further made by taking the method being applied to luma prediction as an example. If the current block CU uses the SAWP mode, the bitstream needs to be parsed to acquire the corresponding weight matrix derivation mode and two intra prediction modes. A specific decoding process is illustrated in Table 13.

TABLE 13

```
......
if ((SawpFlag) {
    sawp_idx
    intra_luma_pred_mode0
    intra_luma_pred_mode1
}
......
```

The SAWP mode index sawp_idx is used for determining a weight matrix of SAWP, and the value of SawpIdx is equal to the value of sawp_idx. If there is no sawp_idx in the bitstream, the value of SawpIdx is equal to 0.

The first luma prediction mode intra_luma_pred_mode0 of SAWP is used for determining a first intra prediction mode IntraLumaPredMode0 of a luma block of SAWP. The second luma prediction mode intra_luma_pred_mode1 of SAWP is used for determining a second intra prediction mode IntraLumaPredMode1 of the luma block of SAWP.

If the value of intra_luma_pred_mode1 is 0, the second intra prediction mode IntraLumaPredMode1 is a DC mode "Intra_Luma_DC"; and if the value of intra_luma_pred_mode1 is 1, the second intra prediction mode IntraLumaPredMode1 is a Bilinear mode "Intra_Luma_Bilinear".

The first intra prediction mode IntraLumaPredMode0 and the second intra prediction mode IntraLumaPredMode1 are respectively determined according to intra_luma_pred_mode0 and intra_luma_pred_mode1. Intra prediction sample matrices predMatrix0 and predMatrix1 are respectively determined according to the first intra prediction mode IntraLumaPredMode0 and the second intra prediction mode IntraLumaPredMode1. The weight matrix SawpWeightArrayY is determined according to SawpIdx.

A new prediction sample matrix predMatrixSawp is determined according to the two intra prediction sample matrices predMatrix0 and predMatrix1, and the weight matrix Sawp-WeightArrayY. A specific method includes the following.

The value of an element predMatrixSawp [x][y] in the prediction sample matrix predMatrixSawp of SAWP is ((predMatrix0[x][y]*AwpWeightArrayY[x][y]+predMatrix1[x][y] *(8−AwpWeightArrayY[x][y])+4)>>3).

Manner III: the second intra prediction mode may only use all or part of the angular prediction modes.

Since the intra prediction modes selected by the second intra prediction mode are reduced, the number of bits of intra_luma_pred_mode1 for representing the second intra prediction mode in the bitstream is also decreased. For example, in the AVS3, the second intra prediction mode may only use all of the angular modes. There are 3 non-angular modes in the AVS3, which are DC, Plane and Bilinear modes. That is to say, in the AVS3, the second intra prediction mode may only use the modes other than 0, 1 and 2.

In a specific embodiment, the second intra prediction mode may use all the intra prediction modes other than the non-angular prediction modes (that is, the second intra prediction mode may use all the angular prediction modes).

In a specific embodiment, the second intra prediction mode may use part of all angular prediction modes. The part of the angular prediction modes may be the first 33 angular prediction modes; alternatively, the part of the angular prediction modes may be selected from 33 angular prediction modes or 65 angular prediction modes according to a preset interval. For example, the preset interval may be 1, 2 or another positive integer.

As described in Table 3, an example of an intra prediction mode of a luma prediction block is provided. A mode number IntraLumaPredMode corresponds to the corresponding intra prediction mode. 0 represents a DC mode; 1 represents a Plane mode; 2 represents a Bilinear mode; 12 represents a vertical mode; 24 represents a horizontal mode; 33 represents a PCM mode; and the remaining are the angular modes other than horizontal and vertical modes. Angles represented by specific mode numbers may refer to FIG. 7.

Taking that the second intra prediction mode may only use the modes other than 0, 1 and 2 as an example, a construction process of the MPM list available for the second intra prediction mode is provided.

For example, each intra prediction mode may use 4 MPMs. Then, the mode list with the length of 8 may be constructed; and the number of the non-angular prediction modes should be less than or equal to 3 since there are only 3 non-angular prediction modes in the AVS3. The first 4 MPMs are available for the first intra prediction mode to select. The second intra prediction mode may select the first 4 MPMs of the non-angular modes in the MPM list other than the first intra prediction mode.

FIG. 16 is used as an example for description. Assuming that the constructed MPM list is illustrated in FIG. 16, the first intra prediction mode may select one of the first 4 MPMs. Assuming that the first intra prediction mode uses 12, that is, the first MPM in the MPM list, the MPMs available for the second intra prediction mode are checked from front to back, the first MPM (12) has been used by the first intra prediction mode, such that the first MPM is not available. The second MPM (24) is not used and is an available angular mode, such that the second MPM is available; and although the MPMs corresponding to the third (0), the fourth (2) and the fifth (1) are not used, the MPMs are non-angular modes, such that the MPMs are not available. The sixth (6), seventh (8) and eighth (10) MPMs are used and available angular modes, such that the MPMs are available; and therefore, 24, 6, 8 and 10 respectively correspond to the modes with the MPM indexes of 0, 1, 2 and 3 in the second intra prediction mode.

Taking blocks illustrated in FIG. 14 as an example, an example of constructing the MPM list is provided.

The list length of the first part of the MPM mode list is set to 8.

The current block is E, the intra prediction modes used by F, G, C, A, B and D are successively filled in the MPM mode list, until the MPM mode list is filled. If some position in F, G, C, A, B and D is not available or does not use the intra prediction mode, the position is skipped. In the present disclosure, in addition to using the intra prediction modes corresponding to the blocks illustrated in FIG. 14, the intra prediction modes corresponding to other blocks may also be used. For example, the intra prediction modes corresponding to the blocks on the right side or lower side of the current block are used.

Further, if the MPM mode list is not filled, the intra prediction modes corresponding to the weight matrix derivation modes are filled into the MPM mode list, until the MPM mode list is filled.

If the MPM mode list is not filled, the DC mode and the Bilinear mode are successively filled into the MPM mode list, until the MPM mode list is filled.

If the MPM mode list is not filled, by means of starting from the first intra prediction mode in the MPM mode list, intra prediction modes differing by 1, −1, 2, −2, 3 and −3 from the intra prediction mode are filled into the MPM mode list, until the MPM mode list is filled. If one of the intra prediction modes differing by 1, −1, 2, −2, 3 and −3 from the intra prediction mode is illegal, and is less than 0 or greater than the maximum value or is the PCM, then the intra prediction mode is discarded.

If the mode number of the first intra prediction mode in the MPM mode list is greater than the mode number of the second intra prediction mode, the two MPMs are swapped In an operation of filling the MPM mode list, each intra prediction mode to be filled may be filled into the MPM list only if the intra prediction mode to be filled is different from all existing intra prediction modes in the MPM mode list, otherwise, the intra prediction mode is discarded.

In this embodiment, description is further made by taking the method being applied to luma prediction as an example. If the current block CU uses the SAWP mode, the bitstream needs to be parsed to acquire the corresponding weight matrix derivation mode and two intra prediction modes. A specific decoding process is illustrated in Table 14.

TABLE 14

......
if ((SawpFlag) {
  sawp_idx
  intra_luma_pred_mode0
  intra_luma_pred_mode1
}
......

The SAWP mode index sawp_idx is used for determining a weight matrix of SAWP, and the value of SawpIdx is equal to the value of sawp_idx. If there is no sawp_idx in the bitstream, the value of SawpIdx is equal to 0.

A first luma prediction mode intra_luma_pred_mode0 of SAWP is used for determining a first intra prediction mode IntraLumaPredMode0 of a luma block of SAWP.

A second luma prediction mode intra_luma_pred_mode1 of SAWP is used for determining a second intra prediction mode IntraLumaPredMode1 of the luma block of SAWP.

The first intra prediction mode IntraLumaPredMode0 and the second intra prediction mode IntraLumaPredMode1 are respectively determined according to intra_luma_pred_mode0 and intra_luma_pred_mode1. The method described above is used in the process. Intra prediction sample matrices predMatrix0 and predMatrix1 are respectively determined according to the first intra prediction mode IntraLumaPredMode0 and the second intra prediction mode IntraLumaPredMode1. The weight matrix SawpWeightArrayY is determined according to SawpIdx.

A new prediction sample matrix predMatrixSawp is determined according to the two intra prediction sample matrices predMatrix0 and predMatrix1, and the weight matrix Sawp-WeightArrayY.

A specific method includes the following.

The value of an element predMatrixSawp [x][y] in the prediction sample matrix predMatrixSawp of SAWP is ((predMatrix0[x][y]*AwpWeightArrayY[x][y]+predMatrix1[x][y]*(8−AwpWeightArrayY[x][y])+4)>>3).

In the processes of limiting the intra prediction modes available for the second intra prediction mode, if the derived or determined second intra prediction mode is an illegal mode, the second intra prediction mode needs to be modified according to a preset correspondence to a legal mode. Specifically, when the second intra prediction mode is limited to be an angular prediction mode, if the obtained second intra prediction modes are Mode 0, Mode 1 and Mode 2, the second intra prediction modes need to correspond to one or several available angular modes according to the preset correspondence, so as to avoid illegal modes (that is, limiting unavailable non-angular prediction modes). For example, the second intra prediction mode is decoded to obtain Mode 0, and then the second intra prediction mode is set to Mode 12 (i.e., the vertical mode) according to the preset correspondence. If the second intra prediction mode is decoded to obtain Mode 1, the second intra prediction mode is set to Mode 18 (i.e., the mode at 45 degrees towards the bottom right) according to the preset correspondence. If the second intra prediction mode is decoded to obtain Mode 2, the second intra prediction mode is set to Mode 24 (i.e., the horizontal mode) according to the preset correspondence.

It is to be noted that, in the embodiments of the present disclosure, when the number of the intra prediction modes is limited, the number of the intra prediction modes of all prediction blocks may be directly limited, and a dimension parameter of the current block may also be referred to, so as to use different limitation manners for the current blocks with different dimensions.

Exemplarily, in the present disclosure, with regard to a prediction block with a larger dimension parameter, for example, the prediction block of 64×64 or 32×32, all the intra prediction modes may be used to determine the two intra prediction modes of the current block. With regard to a prediction block with a smaller dimension parameter, for example, the prediction block of 8×8, part of the intra prediction modes may be used to determine the two intra prediction modes of the current block. That is to say, the number of the intra prediction modes possibly used by the current block is limited. This is because, with regard to the prediction block with a small dimension parameter, the impact caused by small angular differences is not obvious.

It is to be understood that, in the present disclosure, a dimension threshold may be preset, such as a second dimension threshold. If the dimension parameter of the current block is less than the second dimension threshold, it may be considered that the small angular differences do not have a large impact. Therefore, the number of the intra prediction modes that can be selected by the current block may be limited. Specifically, by limiting the index numbers of the two intra prediction modes of the current block, the number of the intra prediction modes may be limited.

Exemplarily, in the present disclosure, if the dimension parameter of the current block is less than the second dimension threshold, the first intra prediction mode and the second intra prediction mode may be determined according to a second mode index range. The second mode index range is used for limiting the index numbers of the intra prediction modes. Specifically, the second mode index range may include a second lower limit threshold and a second upper limit threshold. The first index number of the first intra prediction mode may be first determined, and the second index number of the second intra prediction mode may be determined simultaneously. Then, the first index number and the second index number are set to be both greater than the second lower limit threshold, and set to be both less than the second upper limit threshold.

That is to say, in the present disclosure, the index number of the first intra prediction mode and the index number of the second intra prediction mode of the current block may be limited by means of the second mode index range, so as to complete the limitation of the number of the intra prediction modes.

For example, in the AVS3, the second mode index range may be 0-32, that is, the index number of the first intra prediction mode and the index number of the second intra prediction mode may be limited within 0-32 by means of the second mode index range, such that the current block may use the first 33 prediction modes to determine the first intra prediction mode and the second intra prediction mode.

It is to be understood that, in the present disclosure, the first dimension threshold may be the same as or different from the second dimension threshold, and the first mode index range may be the same as or different from the second mode index range.

Further, if the intra prediction modes available for the first intra prediction mode and the second intra prediction mode are not limited, the two determined intra prediction modes have corresponding prediction capabilities, and the corresponding weight matrices do not need to be processed. However, after the intra prediction modes available for selection are limited, the prediction capabilities of the two intra prediction modes are changed, and the corresponding weight matrices also need to be adjusted.

Specifically, in the AWP weight matrices illustrated in FIG. 2, a white area at a lower right corner in the weight matrix 0 (numbered 0) is completely derived from the first intra prediction mode, a black part at an upper left corner is completely derived from the second intra prediction mode, and a gray part is obtained by weighting the two intra prediction modes. If the DC mode is required to perform prediction at the upper left corner, and the horizontal mode is required to perform prediction at the lower right corner, the first intra prediction mode may be set as the horizontal mode, and the second intra prediction mode may be set as the DC mode. On the contrary, if the horizontal mode is required to perform prediction at the upper left corner, and the DC mode is required to perform prediction at the lower right corner, the first intra prediction mode may be set as the DC mode, and the second intra prediction mode may be set as the horizontal mode. However, if one of the intra prediction modes is limited, for example, the second intra prediction mode may only use the angular mode, according to the existing method, for the AWP weight matrix 0, the DC mode cannot be used for prediction at the upper left corner because the second intra prediction mode cannot use the DC mode. If one of the intra prediction modes is limited, for example, the second intra prediction mode may only use the DC mode, according to the existing method, the black part in the AWP weight matrix can only be obtained by prediction using the DC mode. That is to say, the limitation on the second intra prediction mode significantly affects the effect of prediction.

Therefore, in the present disclosure, in some cases, the weight matrices need to be adjusted, that is, the weight matrix corresponding to the first intra prediction mode is swapped with the weight matrix corresponding to the second intra prediction mode.

Manner I: a weight matrix swap flag is increased, and the flag indicates whether to swap the weight matrices of the two prediction blocks. During decoding, the flag is acquired by parsing the bitstream, so as to determine whether the weight matrices need to be swapped.

In this embodiment, description is further made by taking the method being applied to luma prediction as an example. If the current block CU uses the SAWP mode, the bitstream needs to be parsed to acquire the corresponding weight matrix derivation mode and two intra prediction modes.

A specific decoding process is illustrated in Table 15.

TABLE 15

```
......
if ((SawpFlag) {
sawp_idx
intra_luma_pred_mode0
intra_luma_pred_mode1
switch_flag
}
......
```

The SAWP mode index sawp_idx is used for determining a weight matrix of SAWP, and the value of SawpIdx is equal to the value of sawp_idx. If there is no sawp_idx in the bitstream, the value of SawpIdx is equal to 0.

A first luma prediction mode intra_luma_pred_mode0 of SAWP is used for determining a first intra prediction mode IntraLumaPredMode0 of a luma block of SAWP.

A second luma prediction mode intra_luma_pred_mode1 of SAWP is used for determining a second intra prediction mode IntraLumaPredMode1 of the luma block of SAWP.

For an SAWP switch flag switch_flag, the value of SwitchFlag is equal to the value of switch_flag.

The first intra prediction mode IntraLumaPredMode0 and the second intra prediction mode IntraLumaPredMode1 are respectively determined according to intra_luma_pred_mode0 and intra_luma_pred_mode1. Intra prediction sample matrices predMatrix0 and predMatrix1 are respectively determined according to the first intra prediction mode IntraLumaPredMode0 and the second intra prediction mode IntraLumaPredMode1. The weight matrix SawpWeightArrayY is determined according to SawpIdx.

A new prediction sample matrix predMatrixSawp is determined according to the two intra prediction sample matrices predMatrix0 and predMatrix1, and the weight matrix SawpWeightArrayY. A specific method includes the following.

If the value of SwitchFlag is 0, the value of an element predMatrixSawp [x][y] in the prediction sample matrix predMatrixSawp of SAWP is ((predMatrix0[x][y] *AwpWeightArrayY[x][y]+predMatrix1[x][y]*(8−AwpWeightArrayY[x][y])+4)>>3).

Otherwise, that is, the value of SwitchFlag is 1, the value of an element predMatrixSawp [x][y] in the prediction sample matrix predMatrixSawp of SAWP is ((predMatrix1[x][y]*AwpWeightArrayY[x][y]+predMatrix0[x][y]*(8−AwpWeightArrayY[x][y])+4)>>3).

Manner II: it is determined according to the weight matrices whether to swap the weights of the two prediction blocks.

Specifically, when the intra prediction modes that may be selected by the first intra prediction mode are not limited, there are more intra prediction modes that may be selected by the first intra prediction mode, and the first intra prediction mode has a high prediction capability. Since the intra prediction modes that may be selected by the second intra prediction mode are limited, there are few selections available for the second intra prediction mode, and the second intra prediction mode has a low prediction capability. In this way, the weights may be automatically allocated according to the weight matrices. According to the allocation results, in the final prediction block, there are more points affected by the first intra prediction mode, and there are fewer points affected by the second intra prediction mode.

In this embodiment, description is further made by taking the method being applied to luma prediction as an example. If the current block CU uses the SAWP mode, the bitstream needs to be parsed to acquire the corresponding weight matrix derivation mode and two intra prediction modes.

A specific decoding process is illustrated in Table 16.

TABLE 16

```
......
if ((SawpFlag) {
  sawp_idx
  intra_luma_pred_mode0
  intra_luma_pred_mode1
}
......
```

The SAWP mode index sawp_idx is used for determining a weight matrix of SAWP, and the value of SawpIdx is equal to the value of sawp_idx. If there is no sawp_idx in the bitstream, the value of SawpIdx is equal to 0.

The first luma prediction mode intra_luma_pred_mode0 of SAWP is used for determining a first intra prediction mode IntraLumaPredMode0 of a luma block of SAWP.

The second luma prediction mode intra_luma_pred_mode1 of SAWP is used for determining a second intra prediction mode IntraLumaPredMode1 of the luma block of SAWP.

The first intra prediction mode IntraLumaPredMode0 and the second intra prediction mode IntraLumaPredMode1 are respectively determined according to intra_luma_pred_mode0 and intra_luma_pred_mode1. Intra prediction sample matrices predMatrix0 and predMatrix1 are respectively determined according to the first intra prediction mode IntraLumaPredMode0 and the second intra prediction mode IntraLumaPredMode1. The weight matrix SawpWeightArrayY is determined according to SawpIdx.

A new prediction sample matrix predMatrixSawp is determined according to the two intra prediction sample matrices predMatrix0 and predMatrix1, and the weight matrix SawpWeightArrayY. A specific method includes the following.

If SawpIdx belongs to a first set, the value of an element predMatrixSawp [x][y] in the prediction sample matrix predMatrixSawp of SAWP is ((predMatrix0[x][y] *AwpWeightArrayY[x][y]+predMatrix1[x][y]*(8−AwpWeightArrayY[x][y])+4)>>3).

Otherwise, SawpIdx belongs to a second set, the value of an element predMatrixSawp [x][y] in the prediction sample matrix predMatrixSawp of SAWP is ((predMatrix1[x][y] *AwpWeightArrayY[x][y]+predMatrix0[x][y]*(8−AwpWeightArrayY[x][y])+4)>>3).

The first set includes 0-27. The second set includes 28-55.

Manner III: it is determined, according to the mode number of the first intra prediction mode and/or the mode number of the second intra prediction mode, whether to swap the weights of the two prediction blocks.

Since there is a certain difference between prediction angles logically used by adjacent angular prediction modes, due to the impact of interpolation filtering and the sizes of the blocks, especially in smaller blocks, the difference between the prediction blocks made by the adjacent angular prediction modes is not particularly large. Therefore, the logic of whether to swap the weights of the two prediction blocks is set in the mode numbers of the intra prediction modes. For example, a certain intra prediction mode (the first intra prediction mode or the second intra prediction mode) uses the angular prediction mode with an even number to indicate that the weights of the two prediction blocks are not swapped, and uses the angular prediction mode with an odd number to indicate that the weights of the two prediction blocks are swapped.

Example 1

If the second intra prediction mode can only use a certain non-angular mode or several non-angular modes, for example, the second intra prediction mode can only use the DC mode, it may be determined according to the parity of the mode number of the first intra prediction mode whether to swap the weights of the two prediction blocks. If the mode number of the first intra prediction mode is an even number, the weights of the two prediction blocks are not swapped, otherwise (the mode number of the first intra prediction mode being an odd number), the weights of the two prediction blocks are swapped.

In this embodiment, description is further made by taking the method being applied to luma prediction as an example. If the current block CU uses the SAWP mode, the bitstream needs to be parsed to acquire the corresponding weight matrix derivation mode and the first intra prediction mode. Further, the second intra prediction mode only has one possible intra prediction mode, and thus the second intra prediction mode is a preset intra prediction mode by default.

A specific decoding process is illustrated in Table 17.

TABLE 17

......
if ((SawpFlag) {
    sawp_idx
    intra_luma_pred_mode0
}
......

The SAWP mode index sawp_idx is used for determining a weight matrix of SAWP, and the value of SawpIdx is equal to the value of sawp_idx. If there is no sawp_idx in the bitstream, the value of SawpIdx is equal to 0.

The first luma prediction mode intra_luma_pred_mode0 of SAWP is used for determining a first intra prediction mode IntraLumaPredMode0 of a luma block of SAWP.

The first intra prediction mode IntraLumaPredMode0 is determined according to intra_luma_pred_mode0. A second intra prediction mode IntraLumaPredMode1 is derived by default. Intra prediction sample matrices predMatrix0 and predMatrix1 are respectively determined according to the first intra prediction mode IntraLumaPredMode0 and the second intra prediction mode IntraLumaPredMode1. The weight matrix SawpWeightArrayY is determined according to SawpIdx.

A new prediction sample matrix predMatrixSawp is determined according to the two intra prediction sample matrices predMatrix0 and predMatrix1, and the weight matrix SawpWeightArrayY. A specific method includes the following.

If IntraLumaPredMode0 is an even number, the value of an element predMatrixSawp [x][y] in the prediction sample matrix predMatrixSawp of SAWP is ((predMatrix0[x][y]*AwpWeightArrayY[x][y]+predMatrix1[x][y]*(8−AwpWeightArrayY[x][y])+4)>>3).

Otherwise, that is, IntraLumaPredMode0 is an odd number, the value of an element predMatrixSawp [x][y] in the prediction sample matrix predMatrixSawp of SAWP is ((predMatrix1[x][y]*AwpWeightArrayY[x][y]+predMatrix0[x][y]*(8−AwpWeightArrayY[x][y])+4)>>3).

Example 2

If the second intra prediction mode can only use non-angular modes, it may be determined, according to the parity of the mode number of the first intra prediction mode or the second intra prediction mode, whether to swap the weight matrices of the two prediction blocks. For example, if the mode number of the second intra prediction mode is an even number, the weight matrices of the two prediction blocks are not swapped, otherwise (the mode number of the second intra prediction mode being an odd number), the weight matrices of the two prediction blocks are swapped.

In this embodiment, description is further made by taking the method being applied to luma prediction as an example. If the current block CU uses the SAWP mode, the bitstream needs to be parsed to acquire the corresponding weight matrix derivation mode and two intra prediction modes.

A specific decoding process is illustrated in Table 28.

TABLE 18

......
if ((SawpFlag) {
    sawp_idx
    intra_luma_pred_mode0
    intra_luma_pred_mode1
}
......

The SAWP mode index sawp_idx is used for determining a weight matrix of SAWP, and the value of SawpIdx is equal to the value of sawp_idx. If there is no sawp_idx in the bitstream, the value of SawpIdx is equal to 0.

The first luma prediction mode intra_luma_pred_mode0 of SAWP is used for determining a first intra prediction mode IntraLumaPredMode0 of a luma block of SAWP.

The second luma prediction mode intra_luma_pred_mode1 of SAWP is used for determining a second intra prediction mode IntraLumaPredMode1 of the luma block of SAWP.

The first intra prediction mode IntraLumaPredMode0 and the second intra prediction mode IntraLumaPredMode1 are respectively determined according to intra_luma_pred_mode0 and intra_luma_pred_mode1. Intra prediction sample matrices predMatrix0 and predMatrix1 are respectively determined according to the first intra prediction mode IntraLumaPredMode0 and the second intra prediction mode IntraLumaPredMode1. The weight matrix SawpWeightArrayY is determined according to SawpIdx.

A new prediction sample matrix predMatrixSawp is determined according to the two intra prediction sample matrices predMatrix0 and predMatrix1, and the weight matrix SawpWeightArrayY. A specific method includes the following.

If IntraLumaPredMode1 is an even number, the value of an element predMatrixSawp [x][y] in the prediction sample matrix predMatrixSawp of the SAWP mode is ((predMatrix0[x][y]*AwpWeightArrayY[x][y]+predMatrix1[x][y]*(8−AwpWeightArrayY[x][y])+4)>>3).

Otherwise, that is, IntraLumaPredMode1 is an odd number, the value of an element predMatrixSawp [x][y] in the prediction sample matrix predMatrixSawp of the SAWP mode is ((predMatrix1[x][y]*AwpWeightArrayY[x][y]+predMatrix0[x][y]*(8−AwpWeightArrayY[x][y])+4)>>3).

In one example of the present disclosure, the overheads for the weight matrix derivation mode may be reduced by decreasing the number of the weight matrix derivation modes possibly used by the current block. For example, in the AVS3, if 56 weight matrix derivation modes are used, a maximum of 6 bits is needed to decode one weight matrix derivation mode; and if only 32 weight matrix derivation modes are used, a maximum of 5 bits is needed to decode one weight matrix derivation mode. Further, the number of weight matrix derivation modes possibly used by the current block may also be compressed and limited (so as to identify and select the weight matrix or identify the weight matrix derivation mode with fewer flags), for example, only 16 weight matrix derivation modes are used, so as to finally achieve the fact that decoding is performed by only using 4 bits, such that the overheads are further reduced, thereby achieving better performance.

It is to be noted that, in this embodiment of the present disclosure, when the number of the weight matrix derivation modes is limited, the number of the weight matrix derivation modes of all prediction blocks may directly limited, and the dimension parameter of the current block may also be referred to, so as to use different limitation manners for the current blocks with different dimensions.

Exemplarily, in the present disclosure, with regard to a prediction block with a larger dimension parameter, for example, the prediction block of 64×64 or 32×32, all the weight matrix derivation modes may be used to determine the weight matrix derivation mode of the current block. With regard to a prediction block with a smaller dimension parameter, for example, a prediction block of 8×8, part of the weight matrix derivation modes may be used to determine the weight matrix derivation mode of the current block. That is to say, the number of the weight matrix derivation modes possibly used by the current block is limited. This is because, with regard to the prediction block with the smaller dimension parameter, the impact caused by small angular differences is not obvious.

It is to be understood that, in the present disclosure, a dimension threshold may be first set, for example, a first dimension threshold. If the dimension parameter of the current block is less than the first dimension threshold, it may be considered that the small angular differences do not cause a large impact, and thus the number of the weight matrix derivation modes that can be selected by the current block may be limited. Specifically, by limiting the index number of the weight matrix derivation mode of the current block, the number of the weight matrix derivation modes may be limited.

Exemplarily, in the present disclosure, if the dimension parameter of the current block is less than the first dimension threshold, the weight matrix derivation mode may be determined according to the first mode index range. The first mode index range is used for limiting the index number of the weight matrix derivation mode. Specifically, the first mode index range may include a first lower limit threshold and a first upper limit threshold. The index number of the weight matrix derivation mode may be compared with the first lower limit threshold and the first upper limit threshold. If the index number of the weight matrix derivation mode is less than the first lower limit threshold, the index number of the weight matrix derivation mode may be set as the first lower limit threshold. If the index number of the weight matrix derivation mode is greater than the first upper limit threshold, the index number of the weight matrix derivation mode may be set as the first upper limit threshold.

That is to say, in the present disclosure, the index number of the weight matrix derivation mode of the current block may be limited by means of the first mode index range, so as to complete the limitation of the number of the weight matrix derivation modes.

For example, in the AVS3, the first mode index range may be 0-32, that is, the index number of the weight matrix derivation mode may be limited within 0-32 by means of the first mode index range. Therefore, the current block may use the first 33 weight matrix derivation modes to determine the weight matrix derivation mode of the current block.

Example 1

The weight matrices available for the AWP include the weight matrices corresponding to No. 0-55. Details are illustrated in FIG. 2. In the present disclosure, only 32 weight matrices are used in SAWP, that is, the weight matrices that may be used by the SAWP correspond to 0-7, 16-23, 32-39 and 48-55 weight matrices of the AWP (weight matrices corresponding to corresponding numbers in FIG. 2). That is, the weight matrices 0-7 of the SAWP correspond to the weight matrices 0-7 of the AWP; the weight matrices 8-15 of the SAWP correspond to the weight matrices 16-23 of the AWP; the weight matrices 16-23 of the SAWP correspond to the weight matrices 32-39 of the AWP; and the weight matrices 24-31 of the SAWP correspond to the weight matrices 48-55 of the AWP. Assuming that the 32 weight matrices have equal probabilities, a flag sawp_idx of 5 bits is required.

In this example, description related to the derivation of the weight matrices of the AWP mode and the SAWP mode is provided.

M and N are recorded as the width and height of the current prediction unit PU. The method for deriving the weight matrices includes the following.

(1) stepIdx, angleIdx and subAngleIdx are derived:

If the weight matrix of the AWP mode is to be derived, AwpIdx is input, that is:

stepIdx=(AwpIdx>>3)−3, modAngNum=AwpIdx % 8;

otherwise, if the weight matrix of the SAWP mode is to be derived, SawpIdx is input, that is:

stepIdx=((SawpIdx>>3)<<1)−3, modAngNum=SawpIdx %8.

Further, a derivation process of subAngleIdx is illustrated in Table 19 below.

TABLE 19

```
if (modAngNum == 2) {
    angleIdx = 7
}
else if (modAngNum == 6) {
    angleIdx = 8
}
else {
    angleIdx = modAngNum % 2
}
subAngleIdx = modAngNum >> 1
```

(2) A derivation process of a reference weight list ReferenceWeight[x] is illustrated in Table 20 below.

TABLE 20

```
ValidLength_W = (M + (N >> angleIdx)) << 1
ValidLength_H = (N + (M >> angleIdx)) << 1
DeltaPos_W = stepIdx * ((ValidLength_W >> 3) − 1)
DeltaPos_H = stepIdx * ((ValidLength_H >> 3) − 1)
if (subAngleIdx == 0) {
    if (PhAwpRefineFlag == 0) {
        FirstPos = (ValidLength_H >> 1) − 6 + DeltaPos_H
        for (x=0; x<ValidLength_H; x++) {
            ReferenceWeights[x] = Clip3(0, 8, x − FirstPos)
        }
    }
    else {
        FirstPos = (ValidLength_H >> 1) − 3 + DeltaPos_H
        for (x=0; x<ValidLength_H; x++) {
            ReferenceWeights[x] = Clip3(0, 8, (x − FirstPos) << 1)
        }
    }
}
```

TABLE 20-continued

```
else if (subAngleIdx == 1) {
  if (PhAwpRefineFlag == 0) {
    FirstPos = (ValidLength_H >> 1) − 4 + DeltaPos_H − ((M << 1) >> angleIdx)
    for (x=0; x<ValidLength_H; x++) {
      ReferenceWeights[x] = Clip3(0, 8, x − FirstPos)
    }
  }
  else {
    FirstPos = (ValidLength_H >> 1) − 1 + DeltaPos_H − ((M << 1) >> angleIdx)
    for (x=0; x<ValidLength_H; x++) {
      ReferenceWeights[x] = Clip3(0, 8, (x − FirstPos) << 1
    }
  }
}
else if (subAngleIdx == 2) {
  if (PhAwpRefineFlag == 0) {
    FirstPos = (ValidLength_W >> 1) − 4 + DeltaPos_W − ((N << 1) >> angleIdx)
    for (x=0; x<ValidLength_W; x++) {
      ReferenceWeights[x] = Clip3(0, 8, x − FirstPos)
    }
  }
  else {
    FirstPos = (ValidLength_W >> 1) − 1 + DeltaPos_W − ((N << 1) >> angleIdx)
    for (x=0; x<ValidLength_W; x++) {
      ReferenceWeights[x] = Clip3(0, 8, (x − FirstPos) << 1)
    }
  }
}
else if (subAngleIdx == 3) {
  if (PhAwpRefineFlag == 0) {
    FirstPos = (ValidLength_W >> 1) − 6 + DeltaPos_W
    for (x=0; x<ValidLength_W; x++) {
      ReferenceWeights[x] = Clip3(0, 8, x − FirstPos)
    }
  }
  else {
    FirstPos = (ValidLength_W >> 1) − 3 + DeltaPos_W
    for (x=0; x<ValidLength_W; x++) {
      ReferenceWeights[x] = Clip3(0, 8, (x − FirstPos) << 1)
    }
  }
}
```

(3) A derivation process of a luma weight of the current pixel position is illustrated in Table 21 below.

TABLE 21

```
if (subAngleIdx == 0) {
  for (y=0; y<N; y++)
    for (x=0; x<M; x++) {
      WeightArrayY[x][y] = ReferenceWeights[(y << 1) + ((x << 1) >> angleIdx)]
    }
}
if (subAngleIdx == 1) {
  for (y=0; y<N; y++)
    for (x=0; x<M; x++) {
      WeightArrayY[x][y] = ReferenceWeights[(y << 1) − ((x << 1) >> angleIdx)]
    }
}
if (subAngleIdx == 2) {
  for (y=0; y<N; y++)
    for (x=0; x<M; x++) {
      WeightArrayY[x][y] = ReferenceWeights[(x << 1) − ((y << 1) >> angleIdx)]
    }
}
```

TABLE 21-continued

```
if (subAngleIdx == 3) {
  for (y=0; y<N; y++)
    for (x=0; x<M; x++) {
      WeightArrayY[x][y] = ReferenceWeights[(x << 1) + ((y << 1) >> angleIdx)]
    }
}
```

(4) A derivation process of a chroma weight of the current pixel position is illustrated in Table 22 below.

TABLE 22

```
for (y=0; y<N/2; y++)
  for (x=0; x<M/2; x++) {
    WeightArrayUV[x][y] = WeightArrayY[x << 1][y << 1]
  }
```

If the weight matrix of the AWP mode is to be derived, WeightArrayY is assigned to AwpWeightArrayY, and WeightArrayUV is assigned to AwpWeightArrayUV.

If the weight matrix of the SAWP mode is to be derived, WeightArrayY is assigned to SawpWeightArrayY, and WeightArrayUV is assigned to SawpWeightArrayUV.

Example 2: in this example, only 24 weight matrices are used in the SAWP, and the weight matrices that may be used by the SAWP correspond to 8-15, 24-31 and 40-47 weight matrices of the AWP as illustrated in FIG. 2. That is, the weight matrices 0-7 of the SAWP correspond to the weight matrices 8-15 of the AWP, the weight matrices 8-15 of the SAWP correspond to the weight matrices 24-31 of the AWP, and the weight matrices 16-23 of the SAWP correspond to the weight matrices 40-47 of the AWP, a flag sawp_idx of 4-5 bits is required.

In this example, description related to the derivation of the weight matrices of the AWP mode and the SAWP mode is provided.

M and N are recorded as the width and height of the current prediction unit PU. The method for deriving the weight matrices includes the following.

(1) stepIdx, angleIdx and subAngleIdx are derived:

If the weight matrix of the AWP mode is to be derived, AwpIdx is input, that is:

stepIdx=(AwpIdx>>3)−3, modAngNum=AwpIdx % 8.

Otherwise, if the weight matrix of the SAWP mode is to be derived, SawpIdx is input, that is:

stepIdx=((SawpIdx>>3)<<1)−2, modAngNum=SawpIdx % 8.

A derivation process of subAngleIdx is illustrated in Table 23.

TABLE 23

```
if (modAngNum == 2) {
  angleIdx =7
}
else if (modAngNum == 6) {
  angleIdx = 8
}
```

TABLE 23-continued

```
else {
    angleIdx = modAngNum % 2
}
subAngleIdx = modAngNum >> 1
```

(2) A derivation process of a reference weight list ReferenceWeight[x] is illustrated in Table 24.

TABLE 24

```
ValidLength_W = (M + (N >> angleIdx)) << 1
ValidLength_H = (N + (M >> angleIdx)) << 1
DeltaPos_W = stepIdx * ((ValidLength_W >> 3) - 1)
DeltaPos_H = stepIdx * ((ValidLength_H >> 3) - 1)
if (subAngleIdx == 0) {
    if (PhAwpRefineFlag == 0) {
        FirstPos = (ValidLength_H >> 1) - 6 + DeltaPos H
        for (x=0; x<ValidLength_H; x++) {
            ReferenceWeights[x] = Clip3(0, 8, x - FirstPos)
        }
    }
    else {
        FirstPos = (ValidLength_H >> 1) - 3 + DeltaPos_H
        for (x=0; x<ValidLength_H; x++) {
            ReferenceWeights[x] = Clip3(0, 8, (x - FirstPos) << 1)
        }
    }
}
else if (subAngleIdx == 1) {
    if (PhAwpRefineFlag == 0) {
        FirstPos = (ValidLength_H >> 1) - 4 + DeltaPos_H - ((M << 1) >> angleIdx)
        for (x=0; x<ValidLength_H; x++) {
            ReferenceWeights[x] = Clip3(0, 8, x - FirstPos)
        }
    }
    else {
        FirstPos = (ValidLength_H >> 1) - 1 + DeltaPos_H - ((M << 1) >> angleIdx)
        for (x=0; x<ValidLength_H; x++) {
            ReferenceWeights[x] = Clip3(0, 8, (x - FirstPos) << 1
        }
    }
}
else if (subAngleIdx == 2) {
    if (PhAwpRefineFlag == 0) {
        FirstPos = (ValidLength_W >> 1) - 4 + DeltaPos_W - ((N << 1) >> angleIdx)
        for (x=0; x<ValidLength_W; x++) {
            ReferenceWeights[x] = Clip3(0, 8, x - FirstPos)
        }
    }
    else {
        FirstPos = (ValidLength_W >> 1) - 1 + DeltaPos_W - ((N << 1) >> angleIdx)
        for (x=0; x<ValidLength_W; x++) {
            Reference Weights[x] = Clip3(0, 8, (x - FirstPos) << 1)
        }
    }
}
else if (subAngleIdx == 3) {
    if (PhAwpRefineFlag == 0) {
        FirstPos = (ValidLength_W >> 1) - 6 + DeltaPos_W
        for (x=0; x<ValidLength_W; x++) {
            ReferenceWeights[x] = Clip3(0, 8, x - FirstPos)
        }
    }
    else {
        FirstPos = (ValidLength_W >> 1) - 3 + DeltaPos_W
        for (x=0; x<ValidLength_W; x++) {
            ReferenceWeights[x] = Clip3(0, 8, (x - FirstPos) << 1)
        }
    }
}
```

(3) A derivation process of a luma weight of the current pixel position is illustrated in Table 25.

TABLE 25

```
if (subAngleIdx == 0) {
    for (y=0; y<N; y++)
        for (x=0; x<M; x++) {
            WeightArrayY[x][y] = ReferenceWeights[(y << 1) + ((x << 1) >> angleIdx)]
        }
}
if (subAngleIdx == 1) {
    for (y=0; y<N; y++)
        for (x=0; x<M; x++) {
            WeightArrayY[x][y] = ReferenceWeights[(y << 1) - ((x << 1) >> angleIdx)]
        }
}
if (subAngleIdx == 2) {
    for (y=0; y<N; y++)
        for (x=0; x<M; x++) {
            WeightArrayY[x][y] = ReferenceWeights[(x << 1) - ((y << 1) >> angleIdx)]
        }
}
if (subAngleIdx == 3) {
    for (y=0; y<N; y++)
        for (x=0; x<M; x++) {
            WeightArrayY[x][y] = ReferenceWeights[(x << 1) + ((y << 1) >> angleIdx)]
        }
}
```

(4) A derivation process of a chroma weight of the current pixel position is illustrated in Table 26.

TABLE 26

```
for (y=0; y<N/2; y++)
    for (x=0; x<M/2; x++) {
        WeightArrayUV[x][y] = WeightArrayY[x << 1][y << 1]
    }
```

If the weight matrix of the AWP mode is to be derived, WeightArrayY is assigned to AwpWeightArrayY, and WeightArrayUV is assigned to AwpWeightArrayUV.

If the weight matrix of the SAWP mode is to be derived, WeightArrayY is assigned to SawpWeightArrayY, and WeightArrayUV is assigned to SawpWeightArrayUV.

Further, since No. 10 and No. 14 in the 24 weight matrices of the SAWP respectively correspond to No. 26 and No. 30 in the 56 weight matrices of the AWP, which are similar to the horizontal and vertical modes in the binary tree partitioning (BT), the probability of actual selection is low, and longer binary symbol strings may be allocated to the weight matrices, and shorter binary symbol strings are allocated to the weight matrices with higher selection probability.

In 604, the predicted value of the current block is determined based on the first intra prediction mode, the second intra prediction mode and the weight matrix.

In this embodiment of the present disclosure, after determining the first intra prediction mode and the second intra prediction mode of the current block according to the weight matrix derivation mode, and simultaneously determining the weight matrix of the current block according to the weight matrix derivation mode, the decoder may further determine the predicted value of the current block based on the first intra prediction mode, the second intra prediction mode and the weight matrix.

It is to be understood that, in this embodiment of the present disclosure, when determining the predicted value of the current block based on the first intra prediction mode, the second intra prediction mode and the weight matrix, the decoder may first determine a first predicted value of the current block according to the first intra prediction mode, simultaneously determine a second predicted value of the current block according to the second intra prediction mode, then perform weighted average calculation on the first predicted value and the second predicted value by using the weight matrix, and finally obtain the predicted value of the current block.

Figure 27:
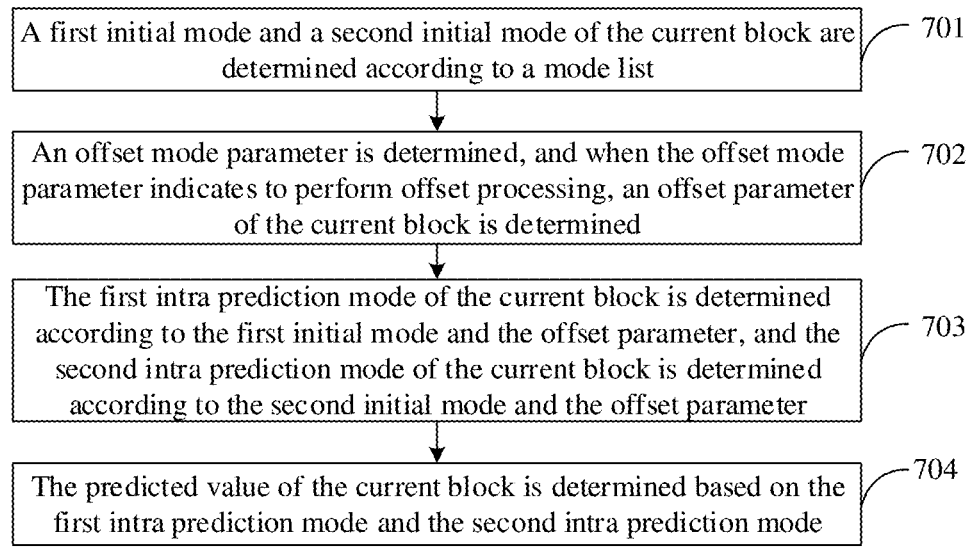
FIG. 27 is a schematic diagram of implementation processes of a decoding method according to an embodiment of the present disclosure.

In this embodiment of the present disclosure, further, if the intra prediction mode parameter indicates that the current block uses the SAWP mode to determine the intra predicted value of the current block, the decoding method performed by the decoder may include the following operations illustrated in FIG. 27.

In 701, a first initial mode and a second initial mode of the current block are determined according to a mode list.

In this embodiment of the present disclosure, after the intra prediction mode parameter of the current block is determined, if the intra prediction mode parameter indicates that the current block uses the SAWP mode to determine the intra predicted value of the current block, the decoder may further determine the mode list (MPM list) used by the current block. Then, the first initial mode and the second initial mode of the current block are determined according to the mode list.

It is to be noted that, in the present disclosure, the mode list is used for determining intra prediction modes used by the current block. Specifically, the decoder may construct the mode list by using several intra prediction modes with high probabilities of use, so as to determine the two intra prediction modes of the current block based on the mode list.

It is to be understood that, in this embodiment of the present disclosure, when determining the mode list, the decoder may use a common manner of constructing the MPM, such as constructing the MPM by using prediction modes of the neighbouring blocks, or the like. Alternatively, the method for constructing a mode list involved in the intra prediction method provided in the present disclosure may also be used, that is, the mode list is constructed by using the weight matrix derivation mode of the current block.

That is to say, in the present disclosure, the method for constructing a mode list may select to use the mode list construction method provided in the operation in 1102 in the above embodiment, and may also use other MPM construction method, which is not specifically limited in the present disclosure.

Further, in this embodiment of the present disclosure, after determining the mode list used by the current block, the decoder may first determine the first initial mode and the second initial mode of the current block according to the mode list.

Exemplarily, in the present disclosure, a mode list including N MPMs is constructed. If N is $2^n$, n bits (mpm_idx) may be used to indicate which MPM in the mode list is selected, that is, determining the first initial mode and the second initial mode, and then another bit is used to indicate whether offset is needed (offset_needed). For example, the mode list including 4 MPMs is constructed, when the intra prediction modes are selected in the mode list, 2 bits (mpm_idx) need to be used to indicate which MPM in the mode list is selected as an initial mode. The correspondence between the value of mpm_idx and a binary symbol string illustrated in FIG. 3 may be used for determining the prediction modes.

In 702, an offset mode parameter is determined, and when the offset mode parameter indicates to perform offset processing, an offset parameter of the current block is determined.

In this embodiment of the present disclosure, the decoder may further determine the offset mode parameter. The offset mode parameter is used for determining whether to perform offset. Specifically, when the offset mode parameter indicates to perform offset processing, the decoder may further determine the offset parameter of the current block.

It is to be noted that, in this embodiment of the present disclosure, one bit may be used to indicate whether to perform offset (offset_needed). That is to say, the offset mode parameter may be determined by parsing the bitstream, and further it may be determined whether the prediction mode (the first initial mode or the second initial mode) of the current block needs to be offset.

Further, in this embodiment of the present disclosure, if the offset mode parameter indicates to perform offset processing, the decoder may further determine the offset parameter of the current block by parsing the bitstream. The offset parameter may include an offset manner and an offset amount. By means of determining the offset parameter, the decoder may determine whether to perform offset processing on the first initial mode or the second initial mode of the current block.

It is to be noted that, in this embodiment of the present disclosure, the decoder may also parse the bitstream to determine the offset manner and the offset amount in the offset parameter. For example, one bit (sign) indicates whether the offset manner is "+" or "−"; and some bits (offset) indicate the offset amount.

In one example of the present disclosure, the offset manner and the offset amount may be set in advance. For example, only a certain amount can be offset by default, for example, 1 or 2 or 4.

In 703, the first intra prediction mode of the current block is determined according to the first initial mode and the offset parameter, and the second intra prediction mode of the current block is determined according to the second initial mode and the offset parameter.

In this embodiment of the present disclosure, after determining the offset parameter of the current block, the decoder may determine the first intra prediction mode of the current block according to the first initial mode and the offset parameter, and simultaneously determine the second intra prediction mode of the current block according to the second initial mode and the offset parameter.

Further, in this embodiment of the present disclosure, when determining the first intra prediction mode and the second intra prediction mode of the current block according to the mode list and the offset parameter, the decoder may perform offset processing on the first initial mode according to the offset manner and the offset amount to determine the first intra prediction mode, and may simultaneously perform offset processing on the second initial mode according to the offset manner and the offset amount to determine the second intra prediction mode.

That is to say, in this embodiment of the present disclosure, the decoder may first parse the bitstream to determine which prediction mode in the mode list is used. That is, the initial mode is first determined from the mode list, then the offset processing is performed on the initial mode according to the offset parameter, and finally the intra prediction mode used by the current block may be determined.

It is to be understood that, in the embodiments of the present disclosure, the same offset parameter may be used for the first initial mode and the second initial mode. That is, offset processing is performed on the first initial mode and the second initial mode according to the same offset manner and offset amount. Correspondingly, different offset parameters may also be used for the first initial mode and the second initial mode. That is, offset processing is performed based on the first initial mode in one offset manner, and at the same time, offset processing is performed based on the second initial mode in the other offset manner. The offset manners and offset amounts corresponding to the two offset manners may be not exactly identical.

That is to say, in the present disclosure, the offset manner and offset amount corresponding to the offset processing on the first initial mode may be the same as or different from the offset manner and offset amount corresponding to the offset processing on the second initial mode.

In one example of the present disclosure, the offset mode parameter corresponding to the first initial mode may also be different from the offset mode parameter corresponding to the second initial mode. That is, by respectively setting the offset mode parameters for the first initial mode and the second initial mode, several different processing modes are achieved as follows: performing offset processing on both the first initial mode and the second initial mode; or not performing offset processing on the first initial mode and the second initial mode; or performing offset processing on the first initial mode, and not performing offset processing on the second initial mode simultaneously; or not performing offset processing on the first initial mode, and performing offset processing on the second initial mode simultaneously.

Further, in this embodiment of the present disclosure, if the offset mode parameter indicates not to perform offset processing, the decoder may directly determine the first intra prediction mode and the second intra prediction mode according to the mode list.

In 704, the predicted value of the current block is determined based on the first intra prediction mode and the second intra prediction mode.

In this embodiment of the present disclosure, after determining the first intra prediction mode and the second intra prediction mode of the current block according to the mode list and the offset parameter, the decoder may determine the predicted value of the current block based on the first intra prediction mode and the second intra prediction mode.

It is to be noted that, in this embodiment of the present disclosure, when determining the predicted value of the current block, the decoder may first determine a first predicted value of the current block according to the first intra prediction mode, simultaneously determine a second predicted value of the current block according to the second intra prediction mode, then perform weighted average calculation on the first predicted value and the second predicted value by using the weight matrix of the current block, and finally obtain the predicted value of the current block.

In this embodiment of the present disclosure, further, by means of the intra prediction method illustrated in the operations in 701 to 704, the decoder may first select a prediction mode from the mode list, then determine, based on the prediction mode, whether offset is needed, and if so, further determine the offset manner and the offset amount. The offset amount may be understood as an offset mode index number.

It is to be noted that, in the embodiments of the present disclosure, the method for determining the prediction mode of the current block after performing offset processing on the mode list may not only be applied to the SAWP mode in the embodiments of the present disclosure, but also be applied to other intra prediction mode, and may also be applied to any inter prediction mode. The present disclosure is not specifically limited thereto.

Exemplarily, in the present disclosure, 4 MPMs are required to be constructed, and 2 bits may be used to determine which prediction mode is selected, and 1 bit is used to determine whether offset processing is performed. If the selected intra prediction mode is one of the MPMs, 2 bits (mpm_idx) are needed to indicate which MPM it is, and 1 bit (offset_needed) indicates that no offset is needed, with a total of 3 bits.

Further, in this embodiment of the present disclosure, if the offset mode parameter indicates to perform offset processing, the offset parameter may further be determined. The offset parameter may include an offset manner of one bit (sign), and may further include an offset amount of some bits (offset).

That is to say, in the present disclosure, if offset is needed, one bit (sign) may be used to indicate whether the offset manner is "+" or "−". Further, the method for setting the offset amount can only offset a certain amount by default, for example, 1 or 2 or 4, or may use some overheads to indicate the offset amount. For example, assuming that there are two available offset amounts, for example, 2 and 4, one bit may be used to indicate whether the offset amount is 2 or 4. Assuming that there are a plurality of available offset amounts, some bits (offset) may be used to indicate the offset amounts, and the correspondence between a value of offset and a binary symbol string illustrated in FIG. 4 may be applied to determine the offset amounts. Exemplarily, on the decoding side, by parsing the bitstream, the decoder may determine an initial mode (mpm_idx) of the current block, and may further determine the offset mode parameter (offset_needed). If the offset mode parameter offset_needed indicates to perform offset processing, the decoder may further determine the offset manner (sign) and the offset amount (offset). For example, the method for decoding the intra prediction mode is illustrated in Table 27 below.

TABLE 27 mpm_idx
offset_needed
If(offset_needed){
  sign
  offset
}

The order of sign and offset may be swapped. If there is only one possibility for offset, there is no offset in the above table.

Specifically, assuming that the mode number of the intra prediction mode is intra_pred_mode, the value of the variable offset_value is 0, if offset_needed is 1, the value of offset_value is equal to the value of offset; and if sign is 1, the value of offset_value is equal to the value of −offset_value, and the value of intra_pred_mode is equal to the value of MPM[mpm_idx] plus the value of offset_value.

Further, in the present disclosure, the intra prediction modes may be set to only use MPMs. In this case, when an intra prediction mode is decoded, only mpm_idx needs to be decoded, and the value of intra_pred_mode is equal to the value of MPM[mpm_idx].

According to the intra prediction method provided in the embodiments of the present disclosure, the encoder and the decoder may determine two different prediction blocks of the current block by means of two different intra prediction modes, and finally obtain a more complex prediction block by combining the prediction blocks using various weight matrices, such that the accuracy of prediction is improved. In addition, the encoder and the decoder may also construct an MPM list by means of a correlation between the weight matrices and the prediction modes, such that the complexity can be greatly reduced. That is to say, by means of the intra prediction methods provided in the present disclosure, the complexity can be reduced while the quality of intra prediction is improved, thereby improving compression performance.

Figure 19:
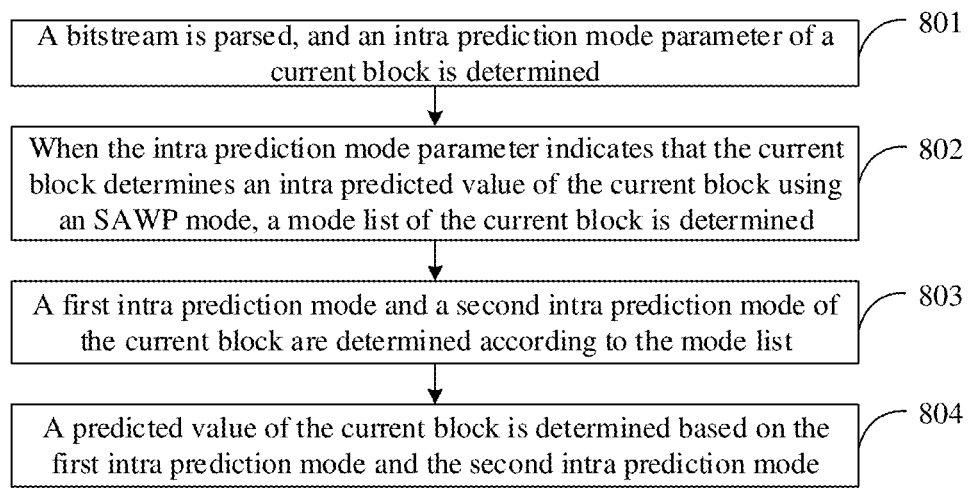
FIG. 19 is a fourth schematic diagram of implementation processes of an intra prediction method.

Based on the above embodiments, another embodiment of the present disclosure provides an intra prediction method, which is applied to a decoder. FIG. 19 is a fourth schematic diagram of implementation processes of an intra prediction method. As illustrated in FIG. 19, the method for intra prediction performed by the decoder may include the following operations.

In 801, a bitstream is parsed, and an intra prediction mode parameter of a current block is determined.

In 802, when the intra prediction mode parameter indicates that the current block determines an intra predicted value of the current block by using an SAWP mode, a mode list of the current block is determined.

In 803, a first intra prediction mode and a second intra prediction mode of the current block are determined according to the mode list.

In 804, a predicted value of the current block is determined based on the first intra prediction mode and the second intra prediction mode.

In this embodiment of the present disclosure, the decoder parses the bitstream and determines the intra prediction mode parameter of the current block. If the intra prediction mode parameter indicates that the current block determines the intra predicted value of the current block by using the SAWP mode, the decoder may further determine the mode list of the current block.

It is to be noted that, in this embodiment of the present disclosure, the SAWP mode is an intra prediction method. Specifically, the SAWP mode is to determine two different intra prediction modes for the current block; then two prediction blocks are respectively determined according to the two different intra prediction modes; next, a weight matrix may be determined, and the two prediction blocks are combined according to the weight matrix; and finally, a new prediction block may be obtained, i.e., the prediction block of the current block is obtained.

In one example of the present disclosure, the decoder may first determine a dimension parameter of the current block, and then determine, according to the dimension parameter, whether the current block uses the SAWP mode. Specifically, if the width is greater than a first threshold and the height is greater than a second threshold, it is determined that the current block uses the SAWP mode; or if the width is less than a third threshold and the height is greater than a fourth threshold, it is determined that the current block uses the SAWP mode.

In one example of the present disclosure, the decoder may first determine a pixel parameter of the current block, and then determine, according to the pixel parameter and a fifth threshold, whether the current block uses the SAWP mode.

In one example of the present disclosure, the decoder may first determine the intra prediction mode parameter of the current block, and then determine, according to the intra prediction mode parameter, whether the current block uses the SAWP mode.

It is to be noted that, in the present disclosure, a weight matrix derivation mode is used for determining the weight matrix used by the current block. Specifically, the weight matrix derivation mode may be a mode for deriving a weight matrix. For a prediction block with a given length and width, each weight matrix derivation mode may derive one weight matrix; and for prediction blocks with the same size, the weight matrices derived by different weight matrix derivation modes are different.

Exemplarily, in the present disclosure, the AWP in the AVS3 has 56 weight matrix derivation modes, and the GPM in the VVC has 64 weight matrix derivation modes.

Further, in this embodiment of the present disclosure, when using the weight matrix derivation mode to determine the mode list, the decoder may first determine intra prediction modes corresponding to neighbouring blocks of the current block, and then determine the intra prediction modes corresponding to the neighbouring blocks as modes to be added. After determining that the modes to be added meet a preset addition condition, the decoder may add the modes to be added into the mode list, that is, adding the intra prediction modes corresponding to the neighbouring blocks of the current block into the mode list; next, if the mode list does not meet a preset list length, the decoder may continue to determine the weight matrix derivation mode of the current block, determine a related intra prediction mode corresponding to the weight matrix derivation mode, and then determine the related intra prediction mode corresponding to the weight matrix derivation mode as a mode to be added; and when it is determined that the mode to be added meets the preset addition condition, the mode to be added is added into the mode list, that is, the related intra prediction mode corresponding to the weight matrix derivation mode is added into the mode list.

It is to be noted that, in this embodiment of the present disclosure, after the decoder adds the intra prediction modes corresponding to the neighbouring blocks of the current block into the mode list, or the decoder adds the related intra prediction mode corresponding to the weight matrix derivation mode into the mode list, if the mode list does not meet the preset list length, that is, the mode list is not filled, the decoder may continue to determine a preset prediction mode as a mode to be added, and then adds the mode to be added into the mode list after determining that the mode to be added meets the preset addition condition, that is, adding the preset prediction mode into the mode list.

It is to be understood that, in the present disclosure, the preset prediction mode may include one or more of various different modes such as a DC mode, a Bilinear mode and a Planar mode.

Further, in this embodiment of the present disclosure, after the decoder separately adds the intra prediction modes corresponding to the neighbouring blocks of the current block, the related intra prediction mode corresponding to the weight matrix derivation mode, and the preset prediction mode into the mode list, if the mode list still does not meet the preset list length, that is, the mode list is still not filled, the decoder may select a prediction mode in the mode list to determine an associated intra prediction mode, then determines the associated intra prediction mode as a mode to be added, and adds the mode to be added into the mode list after determining that the mode to be added meets the preset addition condition, that is, adding the associated intra prediction mode corresponding to the mode list into the mode list.

That is to say, in the present disclosure, after the intra prediction modes corresponding to the neighbouring blocks of the current block, the related intra prediction mode corresponding to the weight matrix derivation mode, and the preset prediction mode are successively added into the mode list, if the mode list is still not filled, the decoder may select to determine the corresponding associated intra prediction modes based on existing prediction modes in the mode list, and then adds these associated intra prediction modes into the mode list.

It is to be noted that, in the embodiments of the present disclosure, either using an intra prediction mode corresponding to a neighbouring block of the current block as the mode to be added, or using the related intra prediction mode corresponding to the weight matrix derivation mode as the mode to be added, or using the preset prediction mode as the mode to be added, or using the associated intra prediction mode as the mode to be added, the decoder needs to determine whether the mode to be added meets the preset addition condition. Specifically, if the mode to be added exists and is different from all prediction modes in the mode list, it may be determined that the mode to be added meets the preset addition condition, such that the mode to be added may be added into the mode list.

Correspondingly, if the mode to be added does not exist or is the same as (coincides with) a prediction mode in the mode list, it may be determined that the mode to be added does not meet the preset addition condition, and the mode to be added cannot be added into the mode list, but is directly discarded.

It is to be understood that, in the present disclosure, since the current block needs to use two intra prediction modes for intra prediction, when the MPM is constructed, the intra prediction modes at more positions may be referred to or the intra prediction modes of more neighbouring blocks may be referred to. Correspondingly, in the present disclosure, the length of the mode list used by the current block may be different from the length of the mode list of other intra prediction modes, because code words during binaryzation of the MPM are shorter than that of other modes, the probability that two intra prediction modes are both MPMs is increased, which facilitates the improvement of the coding and decoding efficiency.

Further, in this embodiment of the present disclosure, when using the weight matrix derivation mode to determine the mode list, the decoder may first determine a list construction strategy corresponding to the weight matrix derivation mode, and then further determine the mode list according to the list construction strategy.

That is to say, in the present disclosure, for different weight matrices, that is, for different weight matrix derivation modes, the decoder may use different construction strategies to construct the mode list. For example, based on the construction strategy, if the boundary line of the weight matrix is 0 degrees or 90 degrees, that is, under a horizontal or vertical situation, the decoder may select to take the intra prediction mode corresponding to the weight matrix into consideration during the construction of the mode list, and does not take the intra prediction mode corresponding to the weight matrix into consideration under other situations.

In this embodiment of the present disclosure, after constructing the mode list of the current block, the decoder may determine the first intra prediction mode and the second intra prediction mode of the current block according to the mode list.

It is to be understood that, in the present disclosure, the two intra prediction modes used by the current block for intra prediction are different, that is, the first intra prediction mode and the second intra prediction mode are different, and the first intra prediction mode may be eliminated when the second intra prediction mode is decoded. That is to say, information of the first intra prediction mode may be used for the decoding of the second intra prediction mode.

In this embodiment of the present disclosure, further, during the construction of the mode list, the decoder may set a candidate intra prediction mode. The candidate intra prediction mode is different from all intra prediction modes in the mode list.

Specifically, in the present disclosure, in order to ensure that the first intra prediction mode and the second intra prediction mode used by the current block are different, the determination of the second intra prediction mode may be dependent on the first intra prediction mode. When determining the first intra prediction mode and the second intra prediction mode based on the mode list, the decoder may first determine one prediction mode in the mode list as the first intra prediction mode, and then determine the second intra prediction mode according to the first intra prediction mode and the mode list.

Further, in this embodiment of the present disclosure, after determining one prediction mode in the mode list as the first intra prediction mode, the decoder may delete the prediction mode from the mode list, and then adds the candidate intra prediction mode to the mode list to obtain an updated mode list. Then, the decoder may select one prediction mode from the updated mode list and determined as the second intra prediction mode. The selection manner may be arbitrary.

Exemplarily, in the present disclosure, assuming that there are N MPMs available for the first intra prediction mode and the second intra prediction mode, when the mode list is constructed, N MPMs and one candidate MPM may be first constructed, and the MPMs available for the first intra prediction mode are the N MPMs. If the first intra prediction mode selects one of the MPMs, for the second intra prediction mode, the MPM selected by the first intra prediction mode is eliminated, and then the candidate MPM is added into the mode list, such that the second intra prediction mode may still select from N MPMs.

In this embodiment of the present disclosure, further, during the construction of the mode list, the decoder may set a length parameter of the mode list to (N+1), where N is a positive integer.

Specifically, in the present disclosure, in order to ensure that the first intra prediction mode and the second intra prediction mode used by the current block are different, the determination of the second intra prediction mode may be dependent on the first intra prediction mode. When the decoder determines the first intra prediction mode and the second intra prediction mode based on the mode list, if the mode list is used to determine the first intra prediction mode, one of the first N prediction modes in the mode list may be determined as the first intra prediction mode, and then the second intra prediction mode is determined according to the first intra prediction mode and the mode list.

Further, in this embodiment of the present disclosure, if the mode list is used to determine the first intra prediction mode, after determining one of the first N prediction modes in the mode list as the first intra prediction mode, the decoder determines the second intra prediction mode by using other N prediction modes in the mode list other than the first intra prediction mode.

It is to be noted that, in this embodiment of the present disclosure, when the decoder determines the first intra prediction mode and the second intra prediction mode based on the mode list, if the mode list is not used to determine the first intra prediction mode, the decoder may directly determine one of the first N prediction modes in the mode list as the second intra prediction mode.

In one embodiment of the present disclosure, if it only ensures that the first intra prediction mode and the second intra prediction mode used by the current block are different, but the number of the MPMs that may be selected for the first intra prediction mode and the second intra prediction mode is not limited, the candidate intra prediction modes may not be set, or the length of the mode list may not be increased.

Exemplarily, in the present disclosure, for example, the number N of the MPMs is 4, the first bit is used to indicate whether it is an MPM. For example, "1" indicates that it is an MPM, and "0" indicates that it is not an MPM. If the first intra prediction mode is an MPM, since there are 4 MPMs, 2 bits are used to indicate which MPM it is, that is, "00, 01, 10 and 11" respectively represent the first MPM, the second MPM, the third MPM and the fourth MPM. If the first intra prediction mode and the second intra prediction mode both are MPMs, there are only 3 MPMs available for the second intra prediction mode, and 1-2 bits may be used to indicate which MPM it is, for example, "00, 01 and 10" respectively represent the remaining first MPM, second MPM and third MPM. It can be seen that, since one possibility is excluded, an inverse binaryzation method may be changed to save overheads.

In 503, the predicted value of the current block is determined based on the first intra prediction mode and the second intra prediction mode.

In this embodiment of the present disclosure, after determining the first intra prediction mode and the second intra prediction mode of the current block according to the mode list, the decoder may determine the predicted value of the current block based on the first intra prediction mode and the second intra prediction mode.

It is to be understood that, in this embodiment of the present disclosure, when determining the predicted value of the current block based on the first intra prediction mode and the second intra prediction mode, the decoder may first determine a first predicted value of the current block according to the first intra prediction mode, simultaneously determine a second predicted value of the current block according to the second intra prediction mode, then perform weighted average calculation on the first predicted value and the second predicted value, and finally obtain the predicted value of the current block. For example, the decoder may perform weighted average calculation on the first predicted value and the second predicted value by using the weight matrix, so as to obtain the predicted value of the current block.

In this embodiment of the present disclosure, further, after determining the mode list of the current block, the decoder may first determine a first initial mode and a second initial mode of the current block according to the mode list, then determine an offset mode parameter, and when the offset mode parameter indicates to perform offset processing, determine the offset parameter of the current block. Next, the decoder may determine the first intra prediction mode of the current block according to the first initial mode and the offset parameter, and determine the second intra prediction mode of the current block according to the second initial mode and the offset parameter. Finally, the decoder may determine the predicted value of the current block based on the first intra prediction mode and the second intra prediction mode.

It is to be understood that, in this embodiment of the present disclosure, when determining the mode list, the decoder may use a common manner of constructing the MPM, such as constructing the MPM by using prediction modes of the neighbouring blocks, and may also use the method for constructing a mode list involved in the intra prediction method provided in the present disclosure, that is, constructing the mode list by using the weight matrix derivation mode of the current block.

That is to say, in the present disclosure, the method for constructing a mode list may select to use the mode list construction method described in the above embodiments, and may also use other MPM construction method, which is not specifically limited in the present disclosure.

Further, in this embodiment of the present disclosure, after determining the mode list used by the current block, the decoder may first determine the first initial mode and the second initial mode of the current block according to the mode list.

Exemplarily, in the present disclosure, a mode list including N MPMs is constructed. If N is $2^n$, n bits (mpm_idx) may be used to indicate which MPM in the mode list is selected, that is, determining the first initial mode and the second initial mode, and then another bit is used to indicate whether offset is needed (offset_needed). For example, the mode list including 4 MPMs is constructed, when the intra prediction modes are selected in the mode list, 2 bits (mpm_idx) need to be used to indicate which MPM in the mode list is selected as an initial mode. The correspondence between the value of mpm_idx and a binary symbol string illustrated in Table 3 may be used for determining the prediction modes.

It is to be noted that, in this embodiment of the present disclosure, one bit may be used to indicate whether offset needs to be performed (offset_needed). That is to say, the decoder may determine an offset mode parameter by parsing the bitstream, and further determine whether the prediction mode (the first initial mode or the second initial mode) of the current block needs to be offset.

Further, in this embodiment of the present disclosure, if the offset mode parameter indicates to perform offset processing, the decoder may further determine an offset parameter of the current block. The offset parameter may include an offset manner and an offset amount. That is, by determining the offset parameter, the decoder may determine whether to perform offset processing on the first initial mode or the second initial mode of the current block.

It is to be noted that, in this embodiment of the present disclosure, the bits obtained through parsing the bitstream by the decoder may indicate the offset manner and the offset amount in the offset parameter. For example, one bit (sign) indicates whether the offset manner is "+" or "−", and some bits (offset) indicate the offset amount.

In one example of the present disclosure, the offset manner and the offset amount may be set in advance. For example, only a certain amount can be offset by default, for example, 1 or 2 or 4.

Further, in this embodiment of the present disclosure, when determining the first intra prediction mode and the second intra prediction mode of the current block according to the mode list and the offset parameter, the decoder may perform offset processing on the first initial mode according to the offset manner and the offset amount, so as to determine the first intra prediction mode, and may simultaneously perform offset processing on the second initial mode according to the offset manner and the offset amount, so as to determine the second intra prediction mode.

That is to say, in this embodiment of the present disclosure, the decoder may first determine, according to several bits determined by parsing, which prediction mode in the mode list is used. That is, the initial mode is first determined from the mode list, then offset processing is performed on the initial mode according to the offset parameter, and finally the intra prediction mode used by the current block may be determined.

It is to be understood that, in the embodiments of the present disclosure, the same offset parameter may be used for the first initial mode and the second initial mode. That is, offset processing is performed on the first initial mode and the second initial mode according to the same offset manner and offset amount. Correspondingly, different offset parameters may also be used for the first initial mode and the second initial mode. That is, offset processing is performed based on the first initial mode in one offset manner, and at the same time, offset processing is performed based on the second initial mode in the other offset manner. The offset manners and offset amounts corresponding to the two offset manners may be not exactly identical.

That is to say, in the present disclosure, the offset manner and the offset amount corresponding to offset processing on the first initial mode may be the same as or different from the offset manner and the offset amount corresponding to offset processing on the second initial mode.

In one example of the present disclosure, the offset mode parameter corresponding to the first initial mode may also be different from the offset mode parameter corresponding to the second initial mode. That is, by respectively setting the offset mode parameters for the first initial mode and the second initial mode, several different processing modes are achieved as follows: performing offset processing on both the first initial mode and the second initial mode; or not performing offset processing on the first initial mode and the second initial mode; or performing offset processing on the first initial mode, and not performing offset processing on the second initial mode simultaneously; or not performing offset processing on the first initial mode, and performing offset processing on the second initial mode simultaneously.

Further, in this embodiment of the present disclosure, if the offset mode parameter indicates not to perform offset processing, the decoder may directly determine the first intra prediction mode and the second intra prediction mode according to the mode list.

It is to be noted that, in this embodiment of the present disclosure, when determining the predicted value of the current block, the decoder may first determine a first predicted value of the current block according to the first intra prediction mode, simultaneously determine a second predicted value of the current block according to the second intra prediction mode, then perform weighted average calculation on the first predicted value and the second predicted value, and finally obtain the predicted value of the current block.

According to the intra prediction method provided in the embodiments of the present disclosure, the encoder and the decoder may determine two different prediction blocks of the current block by means of two different intra prediction modes, and finally obtain a more complex prediction block by combining the prediction blocks using various weight matrices, such that the accuracy of prediction is improved. In addition, the encoder and the decoder may also construct an MPM list by means of a correlation between the weight matrices and the prediction modes, such that the complexity can be greatly reduced. That is to say, by means of the intra prediction method provided in the present disclosure, the complexity can be reduced while the quality of intra prediction is improved, thereby improving compression performance.

Figure 20:
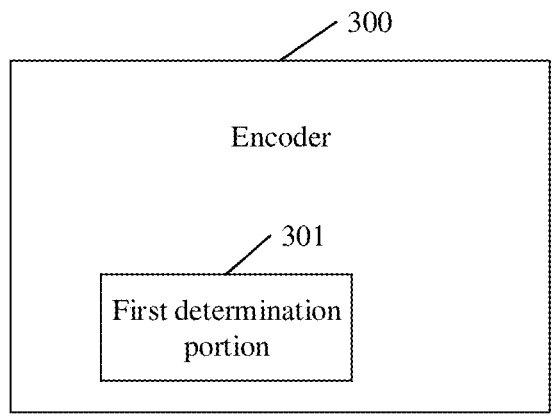
FIG. 20 is a first schematic diagram of a composition structure of an encoder according to an embodiment of the present disclosure.

Based on the above embodiments, in another embodiment of the present disclosure, FIG. 20 is a first schematic diagram of a composition structure of an encoder according to an embodiment of the present disclosure. As illustrated in FIG. 20, the encoder 300 provided in this embodiment of the present disclosure may include a first determination portion 301.

The first determination portion 301 is configured to: when a current block determines an intra predicted value of the current block by using an SAWP mode, determine a weight matrix derivation mode of the current block; determine a first intra prediction mode and a second intra prediction mode of the current block according to the weight matrix derivation mode; determine a weight matrix of the current block according to the weight matrix derivation mode; and determine a predicted value of the current block based on the first intra prediction mode, the second intra prediction mode and the weight matrix.

Alternatively, the first determination portion 301 is configured to: when a current block determines an intra predicted value of the current block by using an SAWP mode, determine a mode list of the current block; determine a first intra prediction mode and a second intra prediction mode of the current block according to the mode list; and determine a predicted value of the current block based on the first intra prediction mode and the second intra prediction mode.

Figure 21:
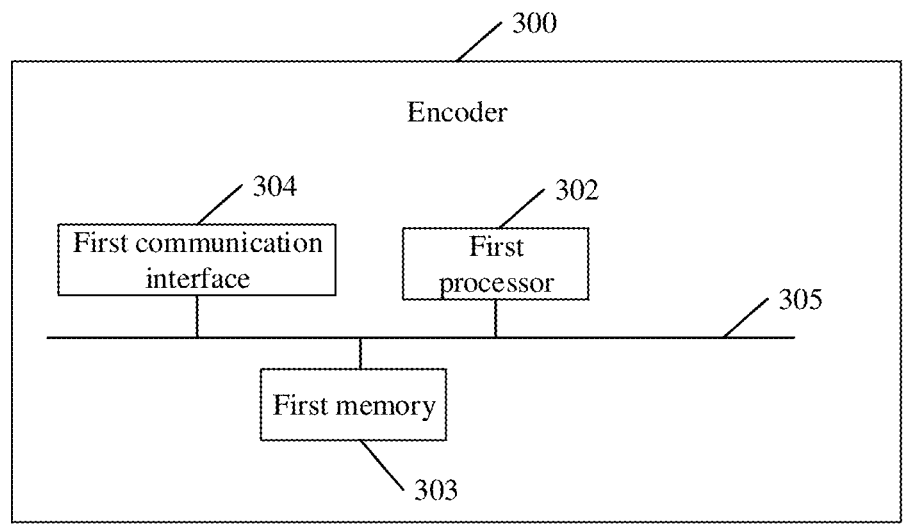
FIG. 21 is a second schematic diagram of a composition structure of an encoder according to an embodiment of the present disclosure.

FIG. 21 is a second schematic diagram of a composition structure of an encoder according to an embodiment of the present disclosure. As illustrated in FIG. 21, the encoder 300 provided in this embodiment of the present disclosure may further include a first processor 302, a first memory 303 storing an instruction executable by the first processor 302, a first communication interface 304, and a first bus 305 used to connect the first processor 302, the first memory 303 and the first communication interface 304.

Further, in this embodiment of the present disclosure, the first processor 302 is configured to: when a current block determines an intra predicted value of the current block by using an SAWP mode, determine a weight matrix derivation mode of the current block; determine a first intra prediction mode and a second intra prediction mode of the current block according to the weight matrix derivation mode; determine a weight matrix of the current block according to the weight matrix derivation mode; and determine a predicted value of the current block based on the first intra prediction mode, the second intra prediction mode and the weight matrix.

Alternatively, the first processor 302 is configured to: when a current block determines an intra predicted value of the current block by using an SAWP mode, determine a mode list of the current block; determine a first intra prediction mode and a second intra prediction mode of the current block according to the mode list; and determine a predicted value of the current block based on the first intra prediction mode and the second intra prediction mode.

Figure 22:
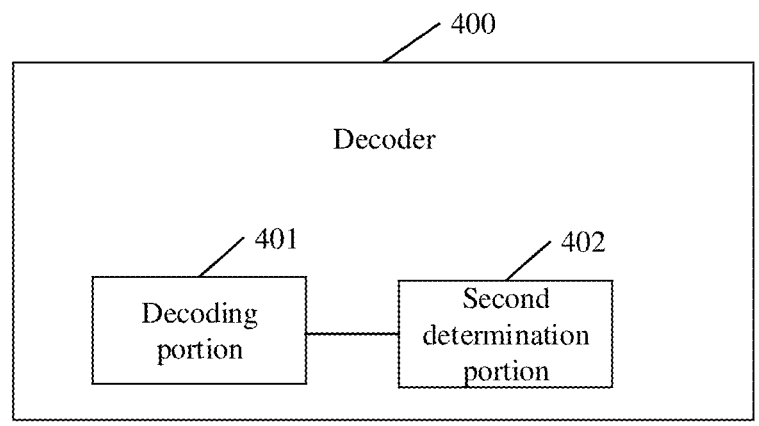
FIG. 22 is a first schematic diagram of a composition structure of a decoder according to an embodiment of the present disclosure.

FIG. 22 is a first schematic diagram of a composition structure of a decoder according to an embodiment of the present disclosure. As illustrated in FIG. 22, the decoder 400 provided in this embodiment of the present disclosure may include a decoding portion 401 and a second determination portion 402.

The decoding portion 401 is configured to parse a bitstream.

The second determination portion 402 is configured to: determine an intra prediction mode parameter of the current block; when the intra prediction mode parameter indicates that the current block uses an SAWP mode to determine an intra predicted value of the current block, determine a weight matrix derivation mode of the current block; determine a first intra prediction mode and a second intra prediction mode of the current block according to the weight matrix derivation mode; determine a weight matrix of the current block according to the weight matrix derivation mode; and determine a predicted value of the current block based on the first intra prediction mode, the second intra prediction mode and the weight matrix.

Alternatively, the second determination portion 402 is configured to: determine an intra prediction mode parameter of the current block; when the intra prediction mode parameter indicates that the current block uses an SAWP mode to determine an intra predicted value of the current block, determine a mode list of the current block; determine a first intra prediction mode and a second intra prediction mode of the current block according to the mode list; and determine a predicted value of the current block based on the first intra prediction mode and the second intra prediction mode.

Figure 23:
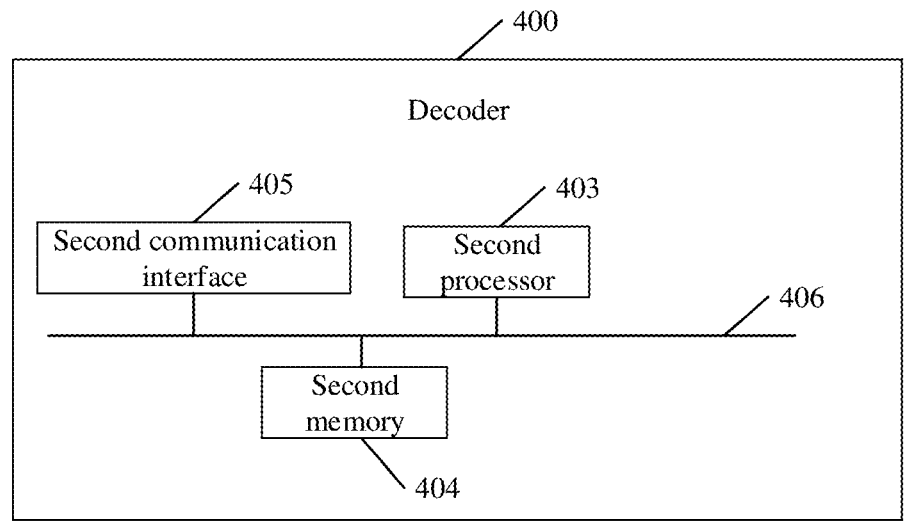
FIG. 23 is a second schematic diagram of a composition structure of a decoder according to an embodiment of the present disclosure.

FIG. 23 is a second schematic diagram of a composition structure of a decoder according to an embodiment of the present disclosure. As illustrated in FIG. 23, the decoder 400 provided in this embodiment of the present disclosure may further include a second processor 403, a second memory 404 storing an instruction executable by the second processor 403, a second communication interface 405, and a second bus 406 used to connect the second processor 403, the second memory 404 and the second communication interface 405.

Further, in this embodiment of the present disclosure, the second processor 403 is configured to: parse a bitstream, and determine an intra prediction mode parameter of the current block; when the intra prediction mode parameter indicates that the current block uses an SAWP mode to determine an intra predicted value of the current block, determine a weight matrix derivation mode of the current block; determine a first intra prediction mode and a second intra prediction mode of the current block according to the weight matrix derivation mode; determine a weight matrix of the current block according to the weight matrix derivation mode; and determine a predicted value of the current block based on the first intra prediction mode, the second intra prediction mode and the weight matrix.

Alternatively, the second processor 403 is configured to: parse a bitstream, and determine an intra prediction mode parameter of the current block; when the intra prediction mode parameter indicates that the current block uses an SAWP mode to determine an intra predicted value of the current block, determine a mode list of the current block; determine a first intra prediction mode and a second intra prediction mode of the current block according to the mode list; and determine a predicted value of the current block based on the first intra prediction mode and the second intra prediction mode.

In addition, each functional unit in each embodiment of the disclosure may be integrated into a processing unit, each unit may also physically exist independently, and two or more than two units may also be integrated into a unit. The above integrated unit may be implemented in form of hardware, or may be implemented in form of software functional module.

When being realized in form of software functional module and not sold or used as an independent product, the integrated unit may be stored in a computer-readable storage medium. Based on such an understanding, the technical solutions of embodiments of the disclosure substantially or parts making contributions to the conventional art or all or part of the technical solutions may be embodied in form of software product, and the computer software product is stored in a storage medium, including a plurality of instructions configured to enable a computer device (which may be a personal computer, a server, a network device or the like) or a processor to execute all or part of the operations of the method in each embodiment of the disclosure. The above-mentioned storage medium includes: various media capable of storing program codes such as a U disk, a mobile hard disk, a Read-Only Memory (ROM), a Random Access Memory (RAM), a magnetic disk or an optical disk.

The embodiments of the present disclosure provide an encoder and a decoder (codec). On the one hand, when a current block determines an intra predicted value of the current block by using an SAWP mode, a weight matrix derivation mode of the current block is determined; a first intra prediction mode and a second intra prediction mode of the current block are determined according to the weight matrix derivation mode; a weight matrix of the current block is determined according to the weight matrix derivation mode; and a predicted value of the current block is determined based on the first intra prediction mode, the second intra prediction mode and the weight matrix. On the other hand, when the current block determines the intra predicted value of the current block by using the SAWP mode, a mode list of the current block is determined; a first intra prediction mode and a second intra prediction mode are determined according to the mode list; and a predicted value of the current block is determined based on the first intra prediction mode and the second intra prediction mode. That is to say, in the embodiments of the present disclosure, the encoder and the decoder (codec) may determine two different prediction blocks of the current block by means of two different intra prediction modes, and finally obtain a more complex prediction block by combining the prediction blocks using various weight matrices, such that the accuracy of prediction is improved. In addition, the encoder and the decoder (codec) may also construct an MPM list by means of a correlation between the weight matrices and the prediction modes, such that the complexity can be greatly reduced. That is to say, by means of the intra prediction methods provided in the present disclosure, the complexity can be reduced while the quality of intra prediction is improved, thereby improving compression performance.

An embodiment of the present disclosure provides a computer-readable storage medium. The computer-readable storage medium stores a program. The program, when executed by a processor, implements the methods described in the above embodiments.

Specifically, a program instruction corresponding to the intra prediction method in the embodiments may be stored in a storage medium such as an optical disk, a hard disk or a U disk. When the program instruction corresponding to the intra prediction method in the storage medium is read or executed by an electronic device, the method includes following operations.

When a current block determines an intra predicted value of the current block by using an SAWP mode, a weight matrix derivation mode of the current block is determined.

A first intra prediction mode and a second intra prediction mode of the current block are determined according to the weight matrix derivation mode, and a weight matrix of the current block is determined according to the weight matrix derivation mode.

A predicted value of the current block is determined based on the first intra prediction mode, the second intra prediction mode and the weight matrix.

The method includes the following operations.

When a current block determines an intra predicted value of the current block by using an SAWP mode, a mode list of the current block is determined.

A first intra prediction mode and a second intra prediction mode of the current block are determined according to the mode list.

A predicted value of the current block is determined based on the first intra prediction mode and the second intra prediction mode.

The method includes the following operations.

A bitstream is parsed, and an intra prediction mode parameter of a current block is determined.

When the intra prediction mode parameter indicates that the current block uses determines an intra predicted value of the current block by using an SAWP mode, a weight matrix derivation mode of the current block is determined.

A first intra prediction mode and a second intra prediction mode of the current block are determined according to the weight matrix derivation mode, and a weight matrix of the current block is determined according to the weight matrix derivation mode.

A predicted value of the current block is determined based on the first intra prediction mode, the second intra prediction mode and the weight matrix.

The method includes the following operations.

A bitstream is parsed, and an intra prediction mode parameter of a current block is determined.

When the intra prediction mode parameter indicates that the current block uses determines an intra predicted value of the current block by using an SAWP mode, a mode list of the current block is determined.

A first intra prediction mode and a second intra prediction mode of the current block are determined according to the mode list.

A predicted value of the current block is determined based on the first intra prediction mode and the second intra prediction mode.

Those skilled in the art may realize that the embodiments of the disclosure may be provided as a method, a system or a computer program product. Therefore, the disclosure may adopt a form of hardware embodiments, software embodiments or combined software and hardware embodiments. Moreover, the disclosure may adopt a form of computer program product implemented on one or more computer-available storage media (including, but not limited to, a disk memory, an optical memory and the like) including computer-available program codes.

The disclosure is described with reference to implementation flowcharts and/or block diagrams of the method, device (system) and computer program product according to the embodiments of the disclosure. It is to be understood that each flow and/or block in the flowcharts and/or the block diagrams and combinations of the flows and/or blocks in the implementation flowcharts and/or the block diagrams may be implemented by computer program instructions. These computer program instructions may be provided for a universal computer, a dedicated computer, an embedded processor or a processor of another programmable data processing device to generate a machine, so as to generate a device for realizing a function specified in one flow or multiple flows in the implementation flowcharts and/or one block or multiple blocks in the block diagrams through the instructions executed through the computer or the processor of another programmable data processing device.

These computer program instructions may also be stored in a computer-readable memory capable of guiding the computer or another programmable data processing device to operate in a specific manner, so as to generate a product including an instruction device by the instructions stored in the computer-readable memory. The instruction device realizes the function specified in one flow or multiple flows in the implementation flowcharts and/or one block or multiple blocks in the block diagrams.

These computer program instructions may further be loaded onto the computer or the other programmable data processing device, so that a series of operations are executed on the computer or the other programmable data processing device to generate computer-implemented processing, and operations for realizing the function specified in one flow or multiple flows in the implementation flowcharts and/or one block or multiple blocks in the block diagrams are provided by the instructions executed on the computer or the other programmable data processing device.

The above is only the preferred embodiments of the disclosure and not intended to limit the scope of protection of the disclosure.

INDUSTRIAL APPLICABILITY

The embodiments of the present disclosure provide intra prediction methods, an encoder, a decoder and a storage medium. On the one hand, when a current block determines an intra predicted value of the current block by using an SAWP mode, a weight matrix derivation mode of the current block is determined; a first intra prediction mode and a second intra prediction mode of the current block are determined according to the weight matrix derivation mode; a weight matrix of the current block is determined according to the weight matrix derivation mode; and a predicted value of the current block is determined based on the first intra prediction mode, the second intra prediction mode and the weight matrix. On the other hand, when the current block determines the intra predicted value of the current block by using the SAWP mode, a mode list of the current block is determined; the first intra prediction mode and the second intra prediction mode are determined according to the mode list; and the predicted value of the current block is determined based on the first intra prediction mode and the second intra prediction mode. That is to say, in the embodiments of the present disclosure, the encoder and the decoder may determine two different prediction blocks of the current block by means of two different intra prediction modes, and finally obtain a more complex prediction block by combining the prediction blocks using various weight matrices, such that the accuracy of prediction is improved. In addition, the encoder and the decoder may also construct an MPM list by means of a correlation between the weight matrices and the prediction modes, such that the complexity can be greatly reduced. That is to say, by means of the intra prediction methods provided in the present disclosure, the complexity can be reduced while the quality of intra prediction is improved, thereby improving compression performance.

The invention claimed is:

1. An intra prediction method, applicable to an encoder and comprising:
   determining an intra prediction mode parameter of a current block, the intra prediction mode parameter indicating whether an intra predicted value of the current block is determined using a Spatial Angular Weighted Prediction (SAWP) mode;
   determining, when the intra predicted value of the current block is determined using the SAWP mode according to the intra prediction mode parameter, a weight matrix derivation mode of the current block;
determining, according to the weight matrix derivation mode, a first intra prediction mode and a second intra prediction mode of the current block;
determining a weight matrix of the current block according to the weight matrix derivation mode; and
determining a predicted value of the current block based on the first intra prediction mode, the second intra prediction mode and the weight matrix;
wherein determining, according to the weight matrix derivation mode, the first intra prediction mode and the second intra prediction mode of the current block comprises:
determining a mode list by using the weight matrix derivation mode;
determining one prediction mode in the mode list as the first intra prediction mode; and
determining the second intra prediction mode according to the first intra prediction mode and the mode list.

2. The method of claim 1, wherein determining the mode list by using the weight matrix derivation mode comprises:
determining intra prediction modes corresponding to neighbouring blocks of the current block, and determining the intra prediction modes corresponding to the neighbouring blocks as modes to be added;
if the modes to be added meet a preset addition condition, adding the modes to be added into the mode list;
if the mode list does not meet a preset list length, determining a related intra prediction mode corresponding to the weight matrix derivation mode, and determining the related intra prediction mode corresponding to the weight matrix derivation mode as a mode to be added; and
if the mode to be added meets the preset addition condition, adding the mode to be added into the mode list.

3. The method of claim 1, further comprising:
determining the first intra prediction mode and the second intra prediction mode according to a second mode index range, wherein the second mode index range is used for restricting an index number of an intra prediction mode.

4. The method of claim 3, wherein the second mode index range comprises a second lower limit threshold and a second upper limit threshold, and the method further comprises:
determining a first index number of the first intra prediction mode, and determining a second index number of the second intra prediction mode; and
setting the first index number and the second index number to be both greater than the second lower limit threshold, and setting the first index number and the second index number to be both less than the second upper limit threshold.

5. The method of claim 1, wherein determining the predicted value of the current block based on the first intra prediction mode, the second intra prediction mode and the weight matrix comprises:
determining a first predicted value of the current block according to the first intra prediction mode, and determining a second predicted value of the current block according to the second intra prediction mode; and
performing weighted average calculation on the first predicted value and the second predicted value by using the weight matrix, to obtain the predicted value of the current block.

6. An intra prediction method, applicable to a decoder and comprising:
decoding a bitstream, and determining an intra prediction mode parameter of a current block, the intra prediction mode parameter indicating whether an intra predicted value of the current block is determined using a Spatial Angular Weighted Prediction (SAWP) mode;
determining, when the intra prediction mode parameter indicates that the intra predicted value of the current block is determined using the SAWP mode according to the intra prediction mode parameter, a weight matrix derivation mode of the current block;
determining, according to the weight matrix derivation mode, a first intra prediction mode and a second intra prediction mode of the current block;
determining a weight matrix of the current block according to the weight matrix derivation mode; and
determining a predicted value of the current block based on the first intra prediction mode, the second intra prediction mode and the weight matrix;
wherein determining, according to the weight matrix derivation mode, the first intra prediction mode and the second intra prediction mode of the current block comprises:
determining a mode list by using the weight matrix derivation mode;
determining one prediction mode in the mode list as the first intra prediction mode; and
determining the second intra prediction mode according to the first intra prediction mode and the mode list.

7. The method of claim 6, wherein determining the mode list by using the weight matrix derivation mode comprises:
determining intra prediction modes corresponding to neighbouring blocks of the current block, and determining the intra prediction modes corresponding to the neighbouring blocks as modes to be added;
if the modes to be added meet a preset addition condition, adding the modes to be added into the mode list;
if the mode list does not meet a preset list length, determining a related intra prediction mode corresponding to the weight matrix derivation mode, and determining the related intra prediction mode corresponding to the weight matrix derivation mode as a mode to be added; and
if the mode to be added meets the preset addition condition, adding the mode to be added into the mode list.

8. The method of claim 6, further comprising:
determining the first intra prediction mode and the second intra prediction mode according to a second mode index range, wherein the second mode index range is used for restricting an index number of an intra prediction mode.

9. The method of claim 8, wherein the second mode index range comprises a second lower limit threshold and a second upper limit threshold, and the method further comprises:
determining a first index number of the first intra prediction mode, and determining a second index number of the second intra prediction mode; and
setting the first index number and the second index number to be both greater than the second lower limit threshold, and setting the first index number and the second index number to be both less than the second upper limit threshold.

10. The method of claim 6, wherein determining the predicted value of the current block based on the first intra prediction mode, the second intra prediction mode and the weight matrix comprises:

determining a first predicted value of the current block according to the first intra prediction mode, and determining a second predicted value of the current block according to the second intra prediction mode; and performing weighted average calculation on the first predicted value and the second predicted value by using the weight matrix, to obtain the predicted value of the current block.

11. A decoder, comprising a processor, configured to:

decoding a bitstream, and determine an intra prediction mode parameter of a current block, the intra prediction mode parameter indicating whether an intra predicted value of the current block is determined using a Spatial Angular Weighted Prediction (SAWP) mode;

determine, when the intra prediction mode parameter indicates that the intra predicted value of the current block is determined using the SAWP mode according to the intra prediction mode parameter, a weight matrix derivation mode of the current block;

determine, according to the weight matrix derivation mode, a first intra prediction mode and a second intra prediction mode of the current block;

determine a weight matrix of the current block according to the weight matrix derivation mode; and determine a predicted value of the current block based on the first intra prediction mode, the second intra prediction mode and the weight matrix;

wherein the processor is further configured to:

determine a mode list by using the weight matrix derivation mode;

determine one prediction mode in the mode list as the first intra prediction mode; and determine the second intra prediction mode according to the first intra prediction mode and the mode list.

* * * * *